US012689571B2

(12) United States Patent
Petla et al.

(10) Patent No.: US 12,689,571 B2
(45) Date of Patent: Jul. 21, 2026

(54) IDENTIFYING DEVICE TYPE USING MACHINE LEARNING ON SPARSELY POPULATED LOG DATA

(71) Applicant: Zscaler, Inc., San Jose, CA (US)

(72) Inventors: Sai Kishore Petla, Leander, TX (US); Thomas James Geisler, Fort Myers, FL (US); Scott Andrew Hankins, Cupertino, CA (US); Edward G. Bruck, Kelowna (CA)

(73) Assignee: Zscaler, Inc., San Jose, CA (US)

( * ) Notice: Subject to any disclaimer, the term of this patent is extended or adjusted under 35 U.S.C. 154(b) by 66 days.

(21) Appl. No.: 18/625,059

(22) Filed: Apr. 2, 2024

(65) Prior Publication Data

US 2024/0275701 A1     Aug. 15, 2024

Related U.S. Application Data

(63) Continuation-in-part of application No. 17/554,327, filed on Dec. 17, 2021, now Pat. No. 12,107,875, which is a continuation-in-part of application No. 16/441,880, filed on Jun. 14, 2019, now Pat. No. 11,212,183.

(60) Provisional application No. 63/494,443, filed on Apr. 5, 2023.

(51) Int. Cl.
| | |
|---|---|
| *H04L 43/065* | (2022.01) |
| *H04L 41/16* | (2022.01) |
| *H04L 43/16* | (2022.01) |

(52) U.S. Cl.
CPC ............ *H04L 43/065* (2013.01); *H04L 41/16* (2013.01); *H04L 43/16* (2013.01)

(58) Field of Classification Search
CPC ... H04L 63/1425; H04L 43/065; H04L 41/16; H04L 43/16
See application file for complete search history.

(56) References Cited

U.S. PATENT DOCUMENTS

| | | | |
|---|---|---|---|
| 7,957,319 B2 | 6/2011 | Deshpande et al. | |
| 9,118,495 B1 | 8/2015 | Hankins et al. | |
| 10,187,353 B2 | 1/2019 | Muppala et al. | |
| 10,389,583 B2 | 8/2019 | Hankins et al. | |
| 10,764,110 B2 | 9/2020 | Hankins et al. | |
| 10,819,569 B2 | 10/2020 | Hankins et al. | |
| 10,880,162 B1 | 12/2020 | Hankins et al. | |
| 11,115,823 B1 * | 9/2021 | Heiland .................. | G06F 18/24 |
| 11,178,184 B2 | 11/2021 | Hankins et al. | |
| 11,184,230 B2 | 11/2021 | Hankins et al. | |
| 11,212,183 B1 | 12/2021 | Hankins et al. | |
| 11,424,995 B1 | 8/2022 | Cartsonis et al. | |
| 2007/0058681 A1 * | 3/2007 | Bettis ...................... | H04L 47/38 |
| | | | 375/E7.198 |
| 2012/0079101 A1 | 3/2012 | Muppala et al. | |

(Continued)

*Primary Examiner* — Raqiul A Choudhury

(74) *Attorney, Agent, or Firm* — Baratta Law PLLC; Lawrence A. Baratta, Jr.; Ryan Odessa

(57) ABSTRACT

Systems and methods for identifying device type within a network include receiving data associated with monitoring network communication traffic associated with a plurality of devices; analyzing the data of the plurality of devices, wherein the analyzing includes identifying one or more features of the data of each of the plurality of devices; and labeling each of the plurality of devices as one of a user device and a non-user device based on the one or more features.

20 Claims, 38 Drawing Sheets

(56) References Cited

U.S. PATENT DOCUMENTS

| | | | |
|---|---|---|---|
| 2013/0133068 A1* | 5/2013 | Jiang ................... | H04L 63/1458 |
| | | | 726/23 |
| 2015/0113626 A1 | 4/2015 | Bocanegra Alvarez et al. | |
| 2015/0310352 A1 | 10/2015 | Kyaw et al. | |
| 2016/0323186 A1 | 11/2016 | Dillon | |
| 2016/0371045 A1* | 12/2016 | Munn ..................... | G06F 21/55 |
| 2017/0164378 A1* | 6/2017 | Gunasekara ............ | H04W 4/08 |
| 2018/0302296 A1* | 10/2018 | Yu ......................... | H04L 41/147 |
| 2019/0132205 A1* | 5/2019 | Du ........................ | H04L 41/069 |
| 2020/0137115 A1 | 4/2020 | Janakiraman et al. | |
| 2020/0382527 A1* | 12/2020 | Mitelman ............. | G06N 20/20 |
| 2022/0109685 A1 | 4/2022 | Hankins et al. | |

* cited by examiner

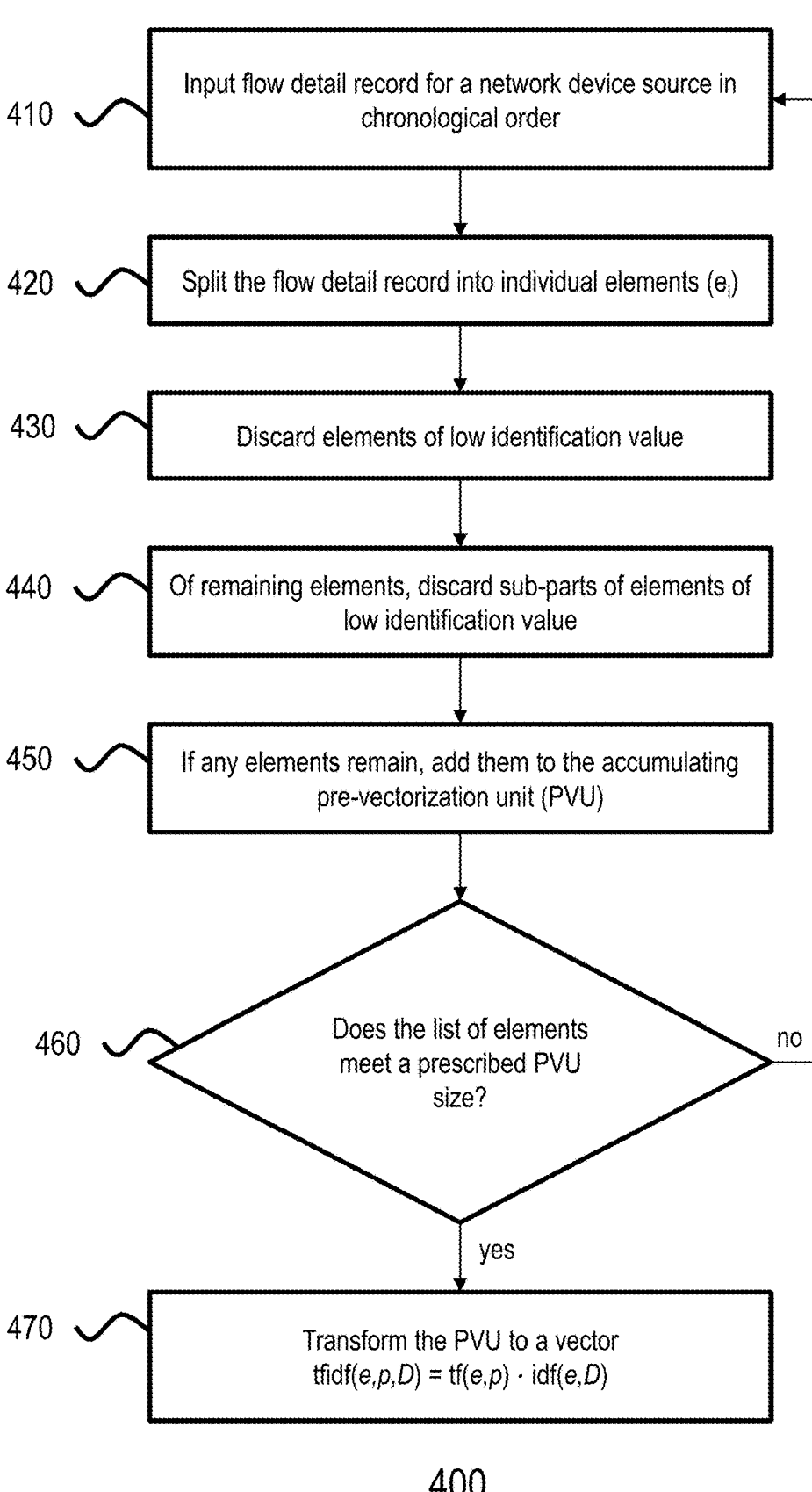

410 — Input flow detail record for a network device source in chronological order 420 — Split the flow detail record into individual elements ($e_i$)

430 — Discard elements of low identification value

440 — Of remaining elements, discard sub-parts of elements of low identification value 450 — If any elements remain, add them to the accumulating pre-vectorization unit (PVU)

460 — Does the list of elements meet a prescribed PVU size?

no yes

470 — Transform the PVU to a vector
$$tfidf(e,p,D) = tf(e,p) \cdot idf(e,D)$$

Input Layer    Hidden Layer 1    Hidden Layer 2    Hidden Layer 3    Output Layer

500

700

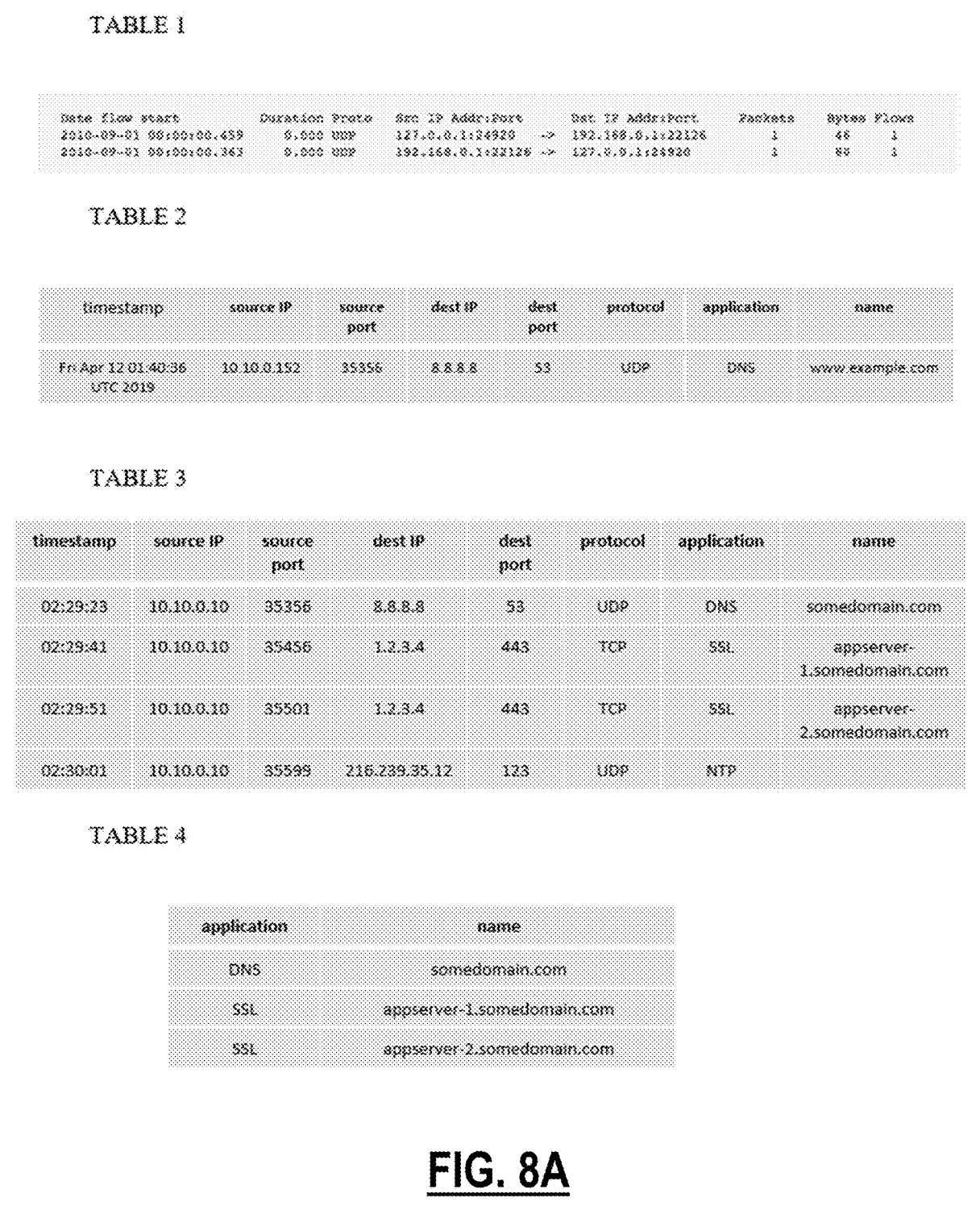

TABLE 1

| Date flow start | Duration Proto | Src IP Addr:Port | Dst IP Addr:Port | Packets | Bytes Flows |
|---|---|---|---|---|---|
| 2010-09-01 00:00:00.459 | 0.000 UDP | 127.0.0.1:24920 -> | 192.168.0.1:22128 | 1 | 46 | 1 |
| 2010-09-01 00:00:00.363 | 0.000 UDP | 192.168.0.1:22128 -> | 127.0.0.1:24920 | 1 | 80 | 1 |

TABLE 2

| timestamp | source IP | source port | dest IP | dest port | protocol | application | name |
|---|---|---|---|---|---|---|---|
| Fri Apr 12 01:40:36 UTC 2019 | 10.10.0.152 | 35356 | 8.8.8.8 | 53 | UDP | DNS | www.example.com |

TABLE 3

| timestamp | source IP | source port | dest IP | dest port | protocol | application | name |
|---|---|---|---|---|---|---|---|
| 02:29:23 | 10.10.0.10 | 35356 | 8.8.8.8 | 53 | UDP | DNS | somedomain.com |
| 02:29:41 | 10.10.0.10 | 35456 | 1.2.3.4 | 443 | TCP | SSL | appserver-1.somedomain.com |
| 02:29:51 | 10.10.0.10 | 35501 | 1.2.3.4 | 443 | TCP | SSL | appserver-2.somedomain.com |
| 02:30:01 | 10.10.0.10 | 35599 | 216.239.35.12 | 123 | UDP | NTP | |

TABLE 4

| application | name |
|---|---|
| DNS | somedomain.com |
| SSL | appserver-1.somedomain.com |
| SSL | appserver-2.somedomain.com |

FIG. 8A

TABLE 5

| application | name |
|---|---|
| DNS | somedomain |
| SSL | appserver somedomain |
| SSL | appserver somedomain |

TABLE 6

DNS somedomain SSL appserver somedomain

TABLE 7

DNS somedomain SSL appserver somedomain SSL appserver somedomain

TABLE 8

```
from sklearn.linear_model import LogisticRegression
v_train = transformed_training_vectors
l_train = lables_for_transformed_training_vectors
clf = LogisticRegression()
clf.fit(v_train, l_train)
```

TABLE 9

```
from sklearn.linear_model import LogisticRegression
v_train = transformed_training_vectors
l_train = lables_for_transformed_training_vectors
v_test  = transformed_test_vectors
l_test  = lables_for_transformed_test_vectors clf = LogisticRegression()
clf.fit(v_train, l_train)

accuracy = clf.score(v_test, l_test)
```

TABLE 10

```
v = single_transformed_data_vector
prediction_value = clf.predict_proba(v)
```

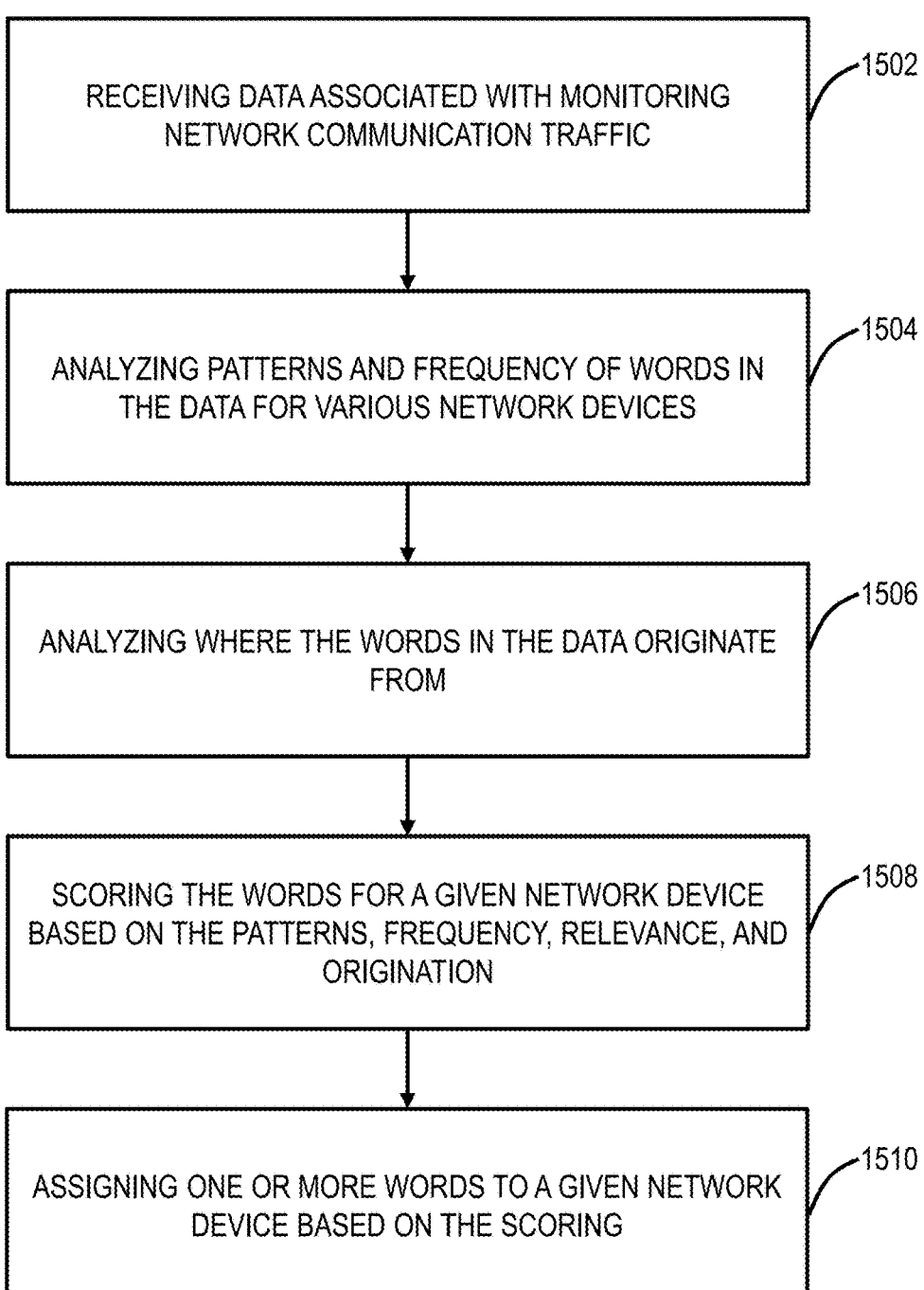

RECEIVING DATA ASSOCIATED WITH MONITORING NETWORK COMMUNICATION TRAFFIC ⌐1502

ANALYZING PATTERNS AND FREQUENCY OF WORDS IN THE DATA FOR VARIOUS NETWORK DEVICES ⌐1504

ANALYZING WHERE THE WORDS IN THE DATA ORIGINATE FROM ⌐1506

SCORING THE WORDS FOR A GIVEN NETWORK DEVICE BASED ON THE PATTERNS, FREQUENCY, RELEVANCE, AND ORIGINATION ⌐1508

ASSIGNING ONE OR MORE WORDS TO A GIVEN NETWORK DEVICE BASED ON THE SCORING ⌐1510

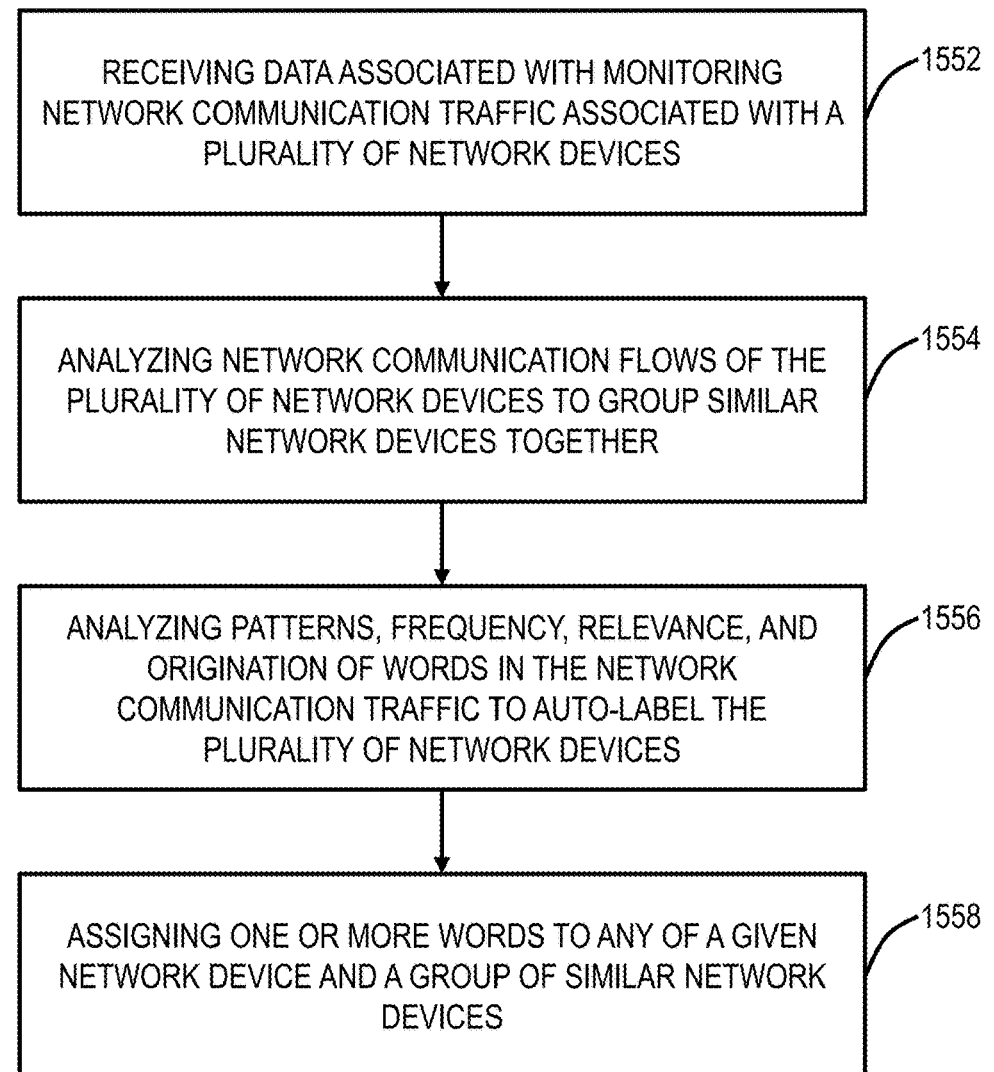

RECEIVING DATA ASSOCIATED WITH MONITORING NETWORK COMMUNICATION TRAFFIC ASSOCIATED WITH A PLURALITY OF NETWORK DEVICES — 1552

ANALYZING NETWORK COMMUNICATION FLOWS OF THE PLURALITY OF NETWORK DEVICES TO GROUP SIMILAR NETWORK DEVICES TOGETHER — 1554

ANALYZING PATTERNS, FREQUENCY, RELEVANCE, AND ORIGINATION OF WORDS IN THE NETWORK COMMUNICATION TRAFFIC TO AUTO-LABEL THE PLURALITY OF NETWORK DEVICES — 1556

ASSIGNING ONE OR MORE WORDS TO ANY OF A GIVEN NETWORK DEVICE AND A GROUP OF SIMILAR NETWORK DEVICES — 1558

FIG. 16

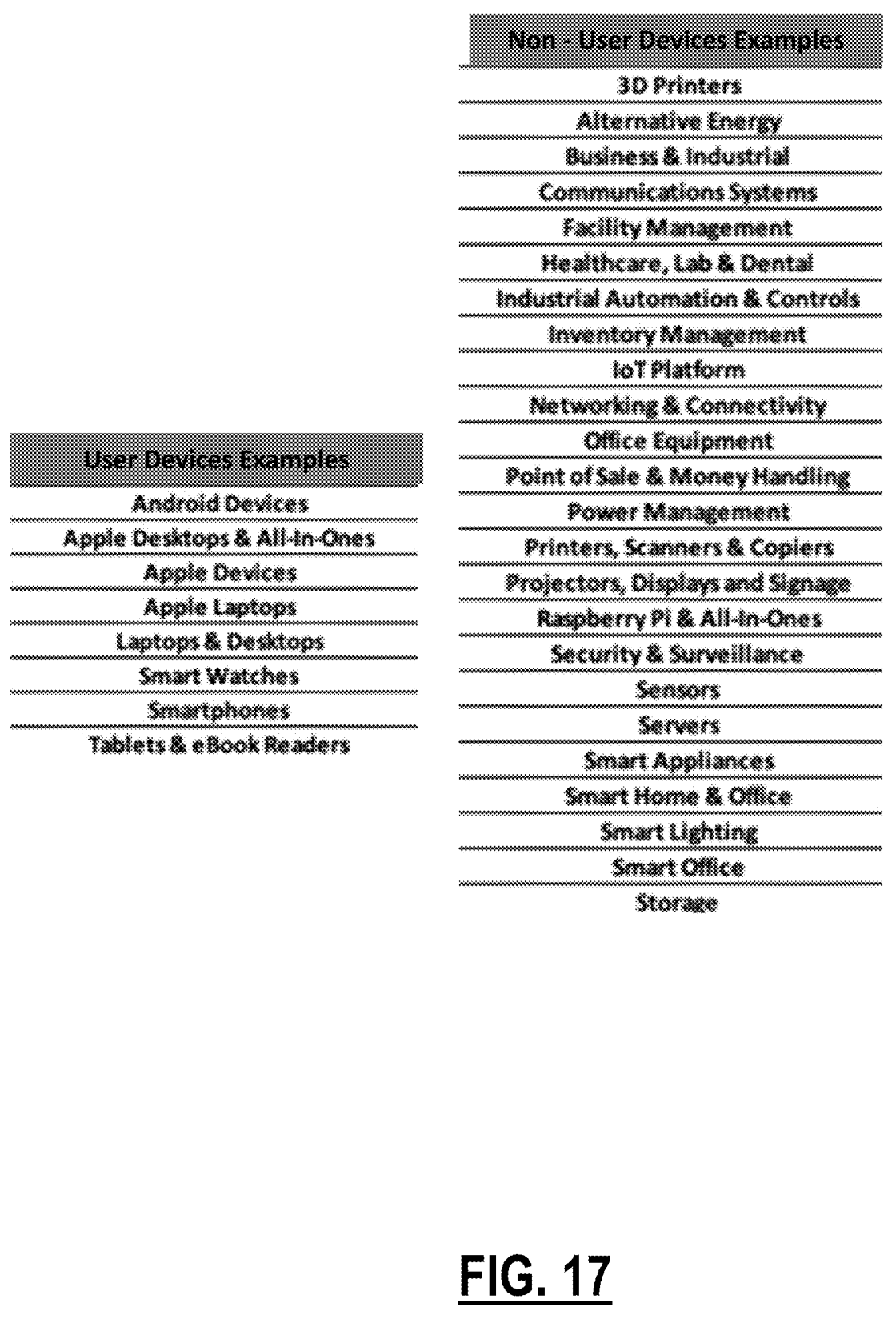

Non - User Devices Examples

3D Printers

Alternative Energy

Business & Industrial

Communications Systems

Facility Management

Healthcare, Lab & Dental

Industrial Automation & Controls

Inventory Management

IoT Platform

Networking & Connectivity

Office Equipment

Point of Sale & Money Handling

Power Management

Printers, Scanners & Copiers

Projectors, Displays and Signage

Raspberry PI & All-In-Ones

Security & Surveillance

Sensors

Servers

Smart Appliances

Smart Home & Office

Smart Lighting

Smart Office

Storage

User Devices Examples

Android Devices

Apple Desktops & All-In-Ones

Apple Devices

Apple Laptops

Laptops & Desktops

Smart Watches

Smartphones

Tablets & eBook Readers

FIG. 17

SAMPLE OF
NON-USER
DEVICES
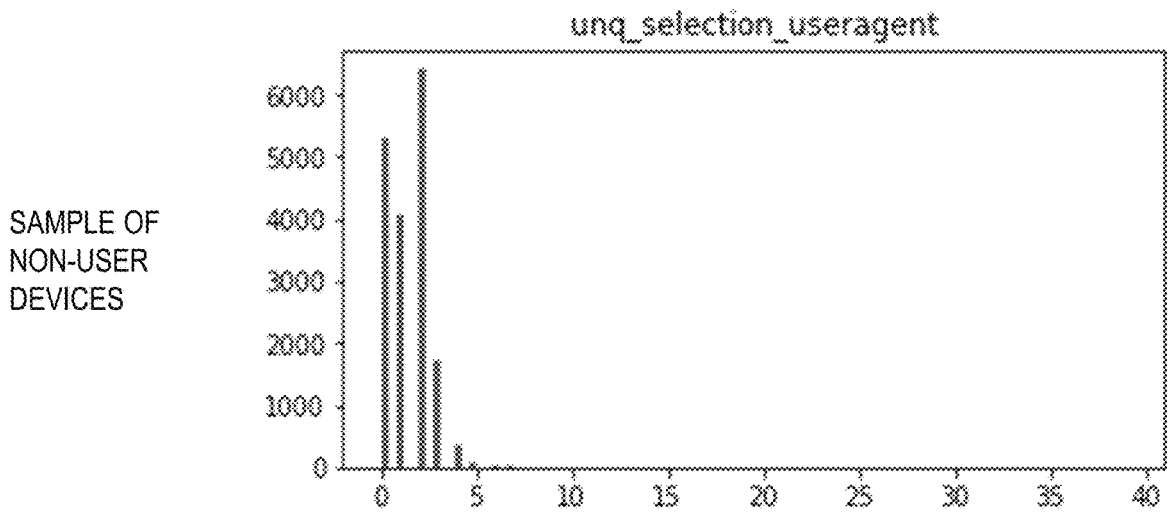
SAMPLE OF
USER
DEVICES
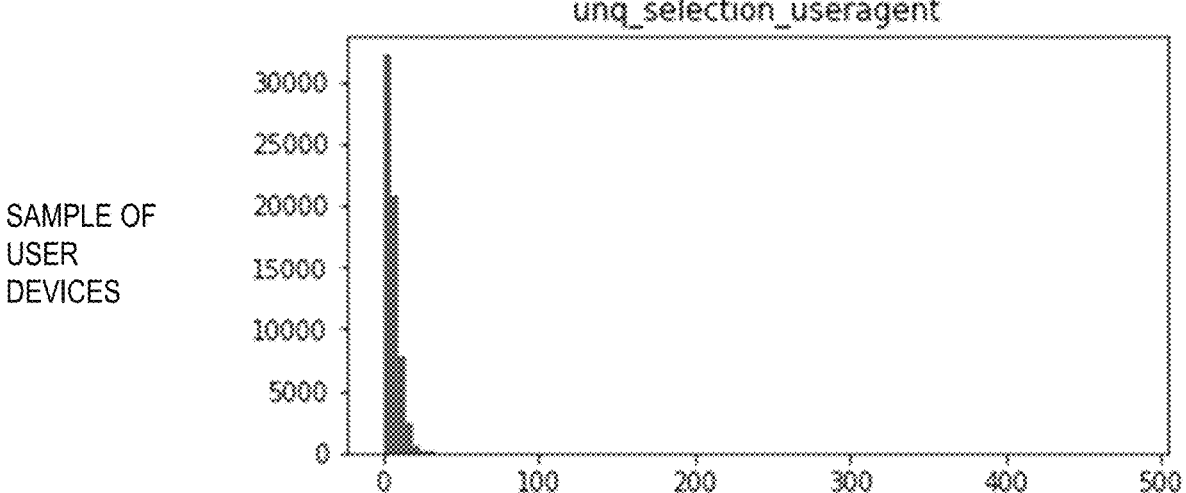
FIG. 23

3000

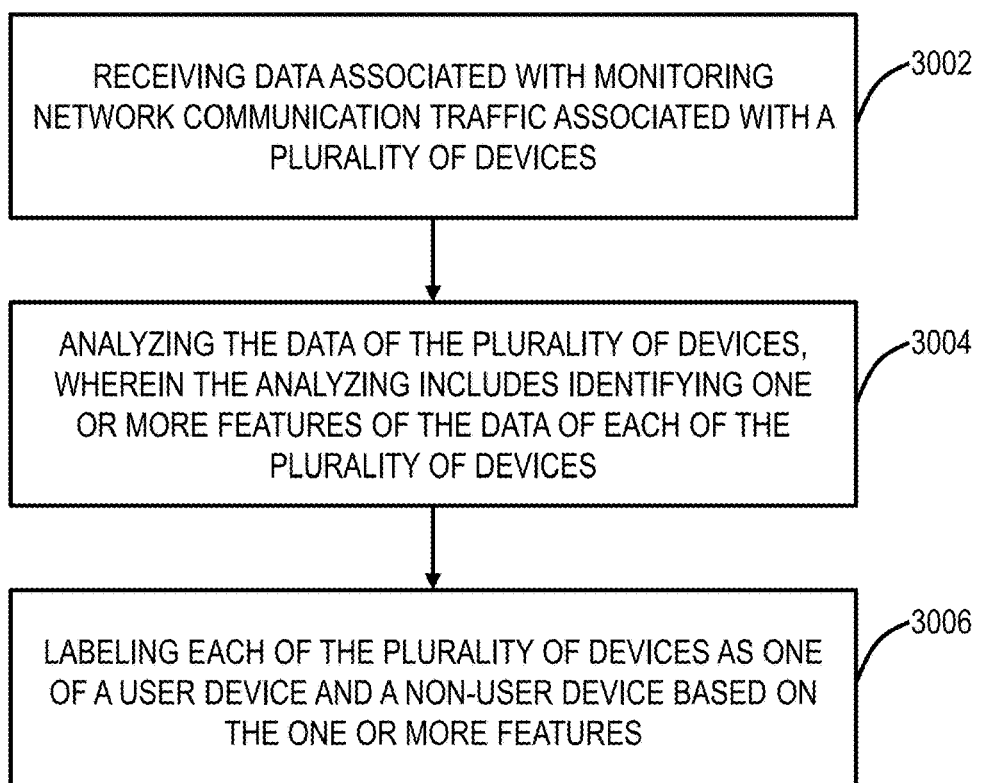

RECEIVING DATA ASSOCIATED WITH MONITORING NETWORK COMMUNICATION TRAFFIC ASSOCIATED WITH A PLURALITY OF DEVICES ⌐3002

ANALYZING THE DATA OF THE PLURALITY OF DEVICES, WHEREIN THE ANALYZING INCLUDES IDENTIFYING ONE OR MORE FEATURES OF THE DATA OF EACH OF THE PLURALITY OF DEVICES ⌐3004

LABELING EACH OF THE PLURALITY OF DEVICES AS ONE OF A USER DEVICE AND A NON-USER DEVICE BASED ON THE ONE OR MORE FEATURES ⌐3006

FIG. 30

IDENTIFYING DEVICE TYPE USING MACHINE LEARNING ON SPARSELY POPULATED LOG DATA

CROSS-REFERENCE TO RELATED APPLICATION(S)

The present disclosure is a continuation-in-part of U.S. patent application Ser. No. 17/554,327, filed Dec. 17, 2021, which is a continuation-in-part of U.S. patent application Ser. No. 16/441,880, filed Jun. 14, 2019, the contents of each are incorporated by reference in their entirety.

FIELD OF THE DISCLOSURE

The present disclosure relates generally to networking and computing. More particularly, the present disclosure relates to systems and methods for identifying device type using machine learning on sparsely populated log data.

BACKGROUND OF THE DISCLOSURE

There is an Information Technology (IT) problem of volume, variety, and vulnerability. Volume—Gartner recently reported, "by 2023, the average CIO will be responsible for more than three times as many endpoints as this year." Variety—Internet-connected devices are built for many purposes with little commonality, no management, and no way to run agents. Vulnerability—There is no way to ensure that all devices are behaving as expected and not as compromised points for enterprise access, vehicles for data theft, or weaponized for network attacks.

As is known, malware and/or security breaches continue to be an issue for networks, such as private networks that include network devices that form the private network and which also engage in communications via the internet, for example. Thus, various security protocols for organizations have been introduced. Likewise, software for desktops, laptops and even tablets also exist to assist in reducing the risk of security breaches. However, as the internet grows in importance and use of networking technology becomes mainstream for businesses, these risks continue to increase. Thus, approaches to address security risks continue to be sought, including techniques to identify and classify network connected devices. As described herein, such devices can include computing devices (laptops, desktops, tablets, etc.), smart phones, Internet of Things (IoT) devices, Operational Technology (OT) devices, and any network capable device. Of note, these devices may not have agents or management capabilities, such as with IoT, OT, etc. Also, there is little commonality between devices. As such, there is a need for identifying these devices to ensure they do not pose a security risk.

BRIEF SUMMARY OF THE DISCLOSURE

The present disclosure relates to systems and methods for identifying device type using machine learning on sparsely populated log data. In particular, the present disclosure includes techniques to discover, classify, and protect network connected devices, in an agentless manner, via the cloud, and via classification techniques that i) analyze similarity of operation and ii) that seek to perform auto-labeling of devices. The assumption is there is a massive explosion on the types of devices connecting to enterprise networks. These devices include countless operating systems, no ability to run software agents, leading to difficulty in IT management. The present disclosure includes various embodiments which include receiving data associated with monitoring network communication traffic associated with a plurality of devices; analyzing the data of the plurality of devices, wherein the analyzing includes identifying one or more features of the data of each of the plurality of devices; and labeling each of the plurality of devices as one of a user device and a non-user device based on the one or more features.

The steps can further include wherein a user device is a device with an end user, and wherein a non-user device is one of an Internet-of-Things (IoT) device and a server. The monitoring can be via a cloud-based system having a plurality of nodes, and wherein the one or more processors are in one of the plurality of nodes. The one or more features can include an application class ratio, wherein the steps further comprise responsive to the application class ratio of a device being above a threshold value, labeling the device as a non-user device. The one or more features can include a top Uniform Resource Locator (URL) ratio, wherein the steps further comprise responsive to the top URL ratio of a device being above a threshold value, labeling the device as a non-user device. The one or more features can include a stop Uniform Resource Locator (URL) ratio, wherein the steps further comprise responsive to the stop URL ratio of a device being below a threshold value, labeling the device as a non-user device. The analyzing can include determining a top Uniform Resource Locator (URL), wherein the steps further comprise responsive to the top URL of a device being a stop URL, labeling the device as a user device. The analyzing can include identifying, within network communication traffic associated with a device of the plurality of devices, traffic to an application within a user application class, wherein the labeling includes labeling the device as a user device based thereon. The analyzing can be performed by a trained machine learning model. The steps can further include training the machine learning model with historical network communication traffic data based on the one or more features.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a flowchart of one embodiment of a process to vectorize flow detail records in accordance with claimed subject matter.

FIGS. 8A-8B illustrate Tables 1-10, described in the specification in connection with various embodiments of claimed subject matter.

FIG. 15 is a flowchart of a process for auto-labeling of network devices based on monitoring their network communications.

FIG. 16 is a flowchart of a process for identifying network devices via similarity of operation and auto-labeling.

FIG. 17 are tables listing examples of user devices and non-user devices, with such examples being used to train a machine learning model for identifying device type on sparsely populated log data.

FIGS. 18-26 are graphs of feature data illustrating the data distribution between IoT/servers and user devices.

FIG. 30 is a flowchart of a process for identifying device type.

DETAILED DESCRIPTION OF THE DISCLOSURE

Figure 1:
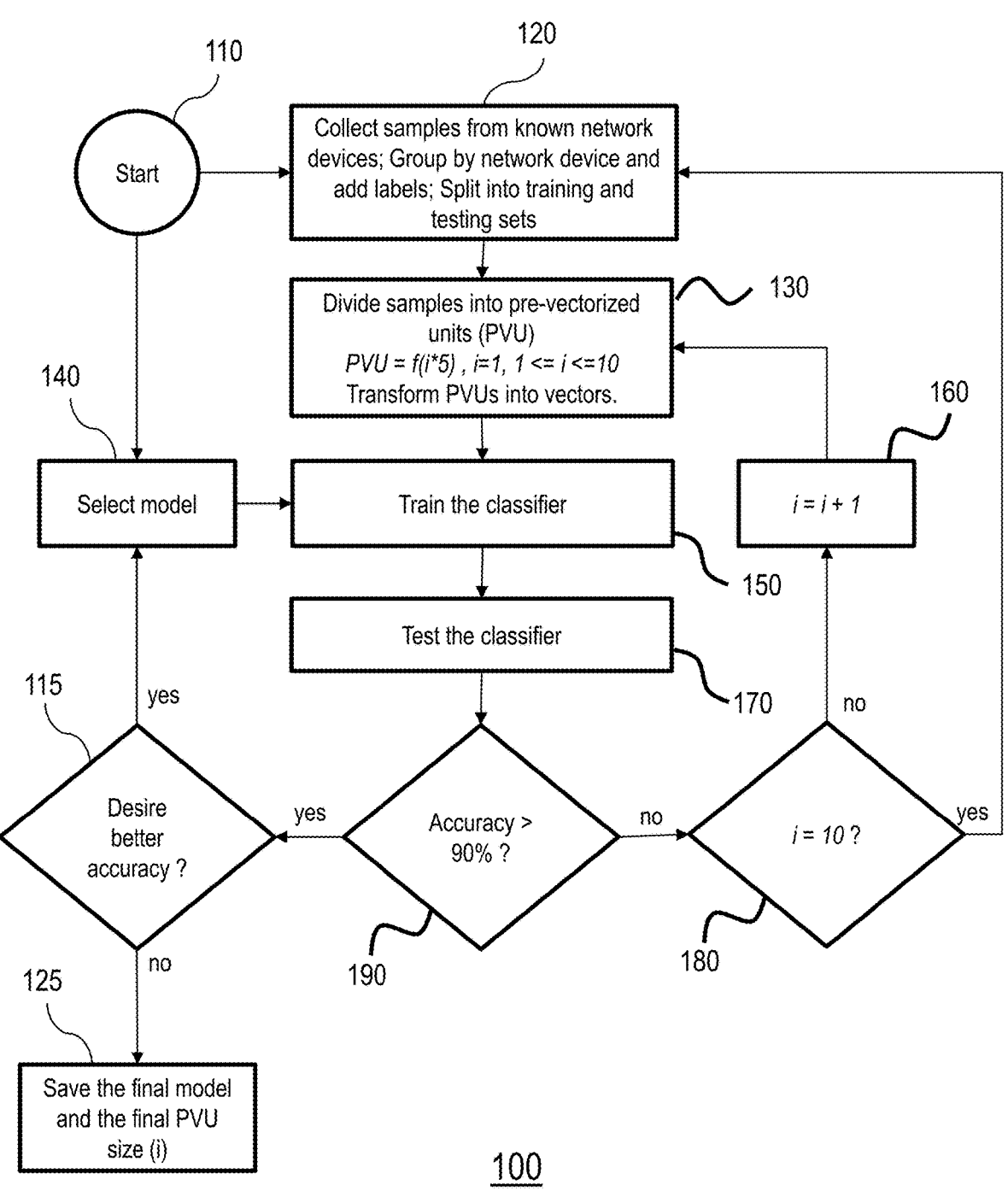
FIG. 1 is a flowchart of one embodiment in accordance with claimed subject matter.

Again, as is known, malware and/or security breaches continue to be an issue for networks, such as private networks that include network devices that form the private network and which also engage in communications via the internet, for example. Thus, various security protocols for organizations have been introduced. Likewise, software for desktops, laptops and even tablets also exist to assist in reducing the risk of security breaches. However, as the internet grows in importance and use of networking technology becomes mainstream for businesses, these risks continue to increase. Thus, approaches to address security risks continue to be sought.

Likewise, with advancement of network technology and the ubiquitous nature of the world wide web, so called "smart devices," that couple or connect to a network, have been introduced into the marketplace and are being employed. In this context, the term smart device refers to an electronic device, able to connect or couple to one or more other electronic devices and/or to a network, which may include a wireless network, such as via any of a variety of potential protocols, such as Bluetooth, NFC, Wi-Fi, LiFi, and/or 5G, as a few illustrations. It is understood that reference to these protocols, such as Bluetooth, NFC, Wi-Fi, LiFi, and/or 5G is intended to reference any and all previous or future versions of these protocols. A smart device may operate to some extent interactively and/or autonomously. Several notable illustrations of types of smart devices include smartphones, smart cars, smart thermostats, smart doorbells, smart locks, smart refrigerators, smartwatches, smart bands, smart key chains, and/or smart speakers, among others. A smart device may also exhibit aspects and/or features related to the so-called Internet of Things (IOT) and/or pervasive computing, including, for example, although not necessarily, use of artificial intelligence. It is noted that a smart device is a network device, as later defined.

Since smart devices attach (e.g., couple or connect) to a network, such as a private network, for example, smart devices may present risks with respect to network security; however, due at least in part to the nature of these devices, these risks may not currently be fully addressed by state of the art technology, including state of the art network technology. While security software and/or security protocols to address, for example, malware and/or security breach risks associated with more complex platforms, such as desktop or laptop computers, a smart device may have a sufficiently smaller "footprint" (e.g., available processing power and/or memory resources) that such traditional approaches to network security, such as via software, for example, may not be readily applicable. Thus, another approach is desirable.

§ 1.0 Monitoring Network Communications for Similarity

In an embodiment in accordance with claimed subject matter, one approach involves monitoring network communications (e.g., network traffic) for a network, such as for a private network. Via monitoring, one or more network devices communicating over a particular network may be identified. Thus, by identifying the network devices communicating over a particular network, network devices that present acceptable risks to security, such as devices from reputable manufacturers, for example, are able to be identified. Likewise, network devices that appear to be engaged in unusual (e.g., suspicious) network communication activity, which may present risks, may be identified and may potentially be isolated and/or blocked from communicating over the particular network, for example.

In this context, it is noted that identifying a network device, including identifying a particular network device, in general, refers to identifying a particular type of network device. For example, as a simple illustration, without intending to limit claimed subject matter scope, if a particular type of nest thermostat joined a network, it is capable of being identified by monitoring network communications, as later described. Thus, while one particular nest thermostat, in this example, joined the network, and, thus, a particular network device is identified in this example, any nest thermostat of that type is capable of being identified. However, it is likewise noted that the foregoing is not intended to exclude a situation where a single particular network device is identified, rather than a particular type of network device, since that situation is also capable of being handled in accordance with claimed subject matter.

Traditionally, network administrators (e.g., human operators who may be experienced in networking technology) perform services that included monitoring network communications (e.g., network traffic) to look for suspicious network device activity. However, that approach tends to be labor intensive and relatively inefficient, especially as networks grow in size. Furthermore, it involves having individuals with deep networking expertise. Limited experiential knowledge of a specific network administrator may therefore potentially represent a risk because that individual may inadvertently overlook suspicious network device communications as a result of that individual's limited experience, for example.

Instead, an approach that employs use of technology, rather than human judgement, is proposed. Such an approach may both be more cost efficient and may reduce risks associated with relying on the judgement of a single individual who may have limited experience, thus, making it potentially more reliable.

In one embodiment of claimed subject matter, as an illustration, a method of identifying a particular network device is described, such as, for a particular network device engaging in network communications via a network. Thus, for a period of time, respective network communication flows engaged in by a particular network device are monitored. It is noted that for a particular network device, a network communication flow may include network communications from the particular network device and network communications to the particular network device. A respective monitored network communication flow comprises flow detail records that include a set of network flow communication parameters. Selected network flow communication parameters for the respective monitored network communication flows with respect to the particular network device over the period of time are processed in a time sequenced order, after having monitored a particular number of respective network communication flows for the period of time with respect to the particular network device. A count of the processed network flow communication parameters captured over the period of time is vectorized. Based at least in part on the vectorized count for the particular network device, the particular network device is identified. Of course, it is noted that claimed subject matter is not intended to be limited to particular embodiments described primarily for purposes of illustration, such as described previously and/or hereinafter.

As shall be described in greater detail, for an embodiment, machine learning classification, for example, may be employed in connection with identification of a particular network device as a result of monitoring network device communications. Of course, claimed subject matter is not necessarily intended to be limited in scope in this respect. Nonetheless, in this context, classification refers to identifying to which of a set of categories (e.g., sub-categories) a "new" observation (e.g., sample) belongs, on the basis of a training set of "previous" observations (e.g., samples) whose category membership is known. Machine learning refers to the scientific study of processes that computing systems use to perform a specific task effectively without using explicit programming instructions, instead relying on patterns and/or inference. Supervisory machine learning processes build a model based at least in part on known samples, which are employed to "train" a process, in order to make predictions and/or decisions without being explicitly programmed to perform the task. In an illustrative embodiment, a model may comprise a matrix of weights and a vector of biases or offsets, (e.g., a linear model) as shall be explained in more detail; however, in other embodiments, a model may be more complex, such as including higher order terms. Likewise, as another example, a model may comprise a vector of weights and a single offset or bias value, as shown later, for example. A process that performs classification is referred to in this context as a classifier. Here, therefore, specifically, in one embodiment, identification of a particular network device may be possible via classification of network communications that have taken place with respect to that particular network device.

In the terminology of machine learning, classification is considered an instance of supervised machine learning. An unsupervised machine learning procedure, meaning that known samples are not available for use, is sometimes also referred to as clustering, and involves grouping or categorizing based at least in part on some measure of similarity. However, for ease of discussion, we use the term classification or classifier in this context for both supervisory and un-supervisory machine learning. Other types of classifiers, such as in un-supervisory machine learning, for example, typically work by comparing observations to previous, but unknown, observations using a similarity operation.

In supervised machine learning, as mentioned, a process is used to build a model from a set of known samples. For example, if a task were determining whether an image contained a certain object, training samples for a supervised machine learning process would include images with and without that object, and the images (e.g., samples) would have a label designating whether the particular image contained the object. In unsupervised machine learning, a process builds a model without a set of known samples. Unsupervised machine learning processes seek to find structural and/or other measurable similarities of samples, like grouping or clustering of unknown samples, again, as was mentioned.

Of course, a variety of approaches to classification, including machine learning classification, are available and it is not intended that claimed subject matter necessarily be limited to a particular approach. Thus, while several approaches are discussed in detail as illustrative examples, again, it is not intended that claimed subject matter be limited in scope to examples provided for illustration purposes. For example, machine learning classification, as discussed above, includes both supervised machine learning and unsupervised machine learning. While the detailed examples provided below primarily involve supervised machine learning, it is noted that unsupervised machine learning may alternately or additionally be employed and is intended to be included within claimed subject matter. Likewise, while supervised machine learning approaches are discussed, again, for purposes of illustration, other machine learning approaches may be employed and provide satisfactory results.

The present patent application details an example embodiment of a process to identify network devices by monitoring network communication flows for the network devices to be identified. As suggested previously, in a particular illustrative embodiment, a machine learning approach may be employed, although claimed subject matter is not necessarily limited in scope in this respect. As mentioned previously, this context, it is noted that identifying a network device, including identifying a particular network device, in general, refers to identifying a particular type of network device. For example, as a simple illustration, without intending to limit claimed subject matter scope, if a particular type of nest thermostat joined a network, it is capable of being identified by monitoring network communications, as later described. Thus, while one particular nest thermostat, in this example, joined the network, and, thus, a particular network device is identified in this example, any nest thermostat of that type is capable of being identified. However, it is likewise noted that the foregoing is not intended to exclude a situation where a single particular network device is identified, rather than a particular type of network device, since that situation is also capable of being handled in accordance with claimed subject matter.

Continuing with this illustration, as shown in FIG. 1, for embodiment 100, an illustrative process may entail:

collecting and organizing flow detail records (e.g., samples), shown by 120;

transforming the flow detail records (e.g., samples) into a vector form, shown by 130;

selecting a machine learning model, shown by 140;

training the machine learning model, shown by 150;

testing the machine learning model, shown by 170; and tuning the machine learning model, shown by 115, 160, 180, and 190.

For example, as previously mentioned, in one embodiment of claimed subject matter, as an illustration, a method of identifying a particular network device is described for a particular network device engaging in network communications via a network. Thus, for a period of time, respective network communication flows engaged in by the particular network device are monitored. Thus, network communications, referred to here as network communication flows, in an embodiment, may be collected for a target network device (e.g., a network device to be identified) and other network devices that are not the target network device.

Figure 2:
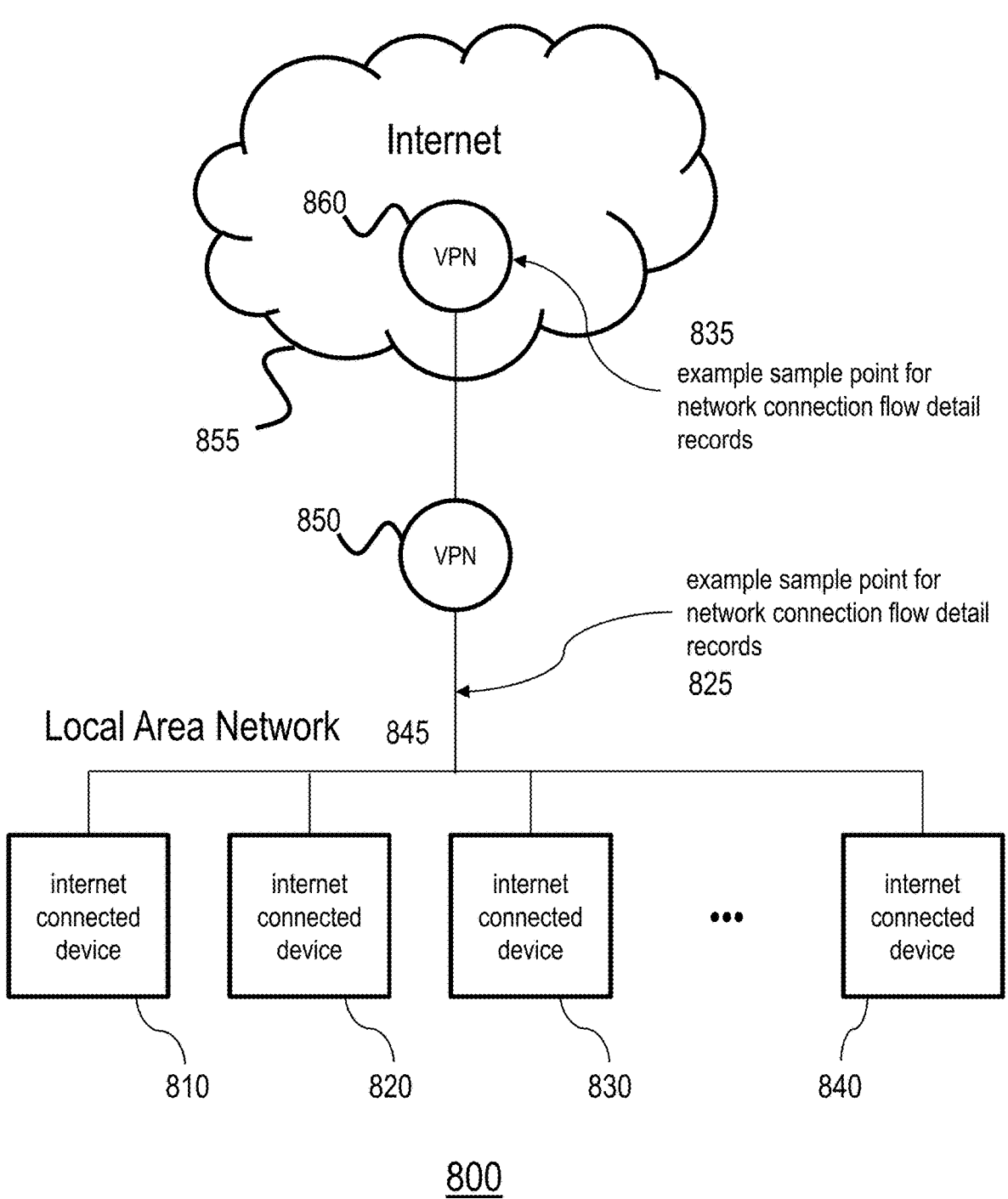
FIG. 2 is a schematic diagram illustrating an embodiment of a known environment for monitoring network communications, such as network communication flows.

For example, network communication flows may be gathered in known environments and labeled as collected. As an example, a router or other network equipment may be employed to capture network flow detail records, which may be labelled, such as by those gathering the flow detail records. Such flow detail records, for example, may be gathered at locations providing access to communications to and from the network devices being monitored, as illustrated in FIG. 2 by 825, for example. It is noted that network communication flows are gathered outside a virtual private network (VPN) which may otherwise be employed, for example, as shown in FIG. 2 by 850 and 860; however, 835 illustrates a location that is integrated with the VPN endpoint and, therefore, is also able to gather flow detail records without VPN encryption.

Specifically, in this context, referring to network communication flows, Internet Protocol (IP)-type network devices communicate over a network by a series of network communications or network transactions referred to in this context as network communication flows. As an illustrative example, a network communication flow may comprise a "five-tuple" of network communication flow parameters that includes:

Source Internet Protocol (IP) Address;

Source Port Number;

Destination IP Address;

Destination Port Number; and

Protocol

Likewise, additional network flow communication parameters may also be collected in connection with a network communication flow to augment the five-tuple above. For example, timestamp, application name, and/or host name may be associated with a network communication flow. A signal sample representation of a network communication flow, in this context, is referred to as a flow detail record. It is likewise noted that the term sample and the term flow detail record are used interchangeably throughout this specification unless otherwise indicated. Thus, flow detail records (e.g., samples) may be captured in connection with a process in which network communication flows are monitored.

Various methods to capture flow detail records are available, such as utilizing a network router to capture network flow communication parameters provided substantially in accordance with an augmentation of Cisco Standard Net- Flow, version 5, version 7, version 8 or version 9, where the augmentation at least includes an identifier, such as server name and/or domain name, for example. In this context, the term identifier refers to a character sequence (e.g., character string) used for purposes of identification of a network attribute related to a network communication flow, such as, for example, an application name, a host name, a server name, a domain name, etc., etc. It is noted that relevant versions of Cisco Standard NetFlow are available from the Internet Engineering Task Force (IETF), such as at tools.ietf.org/html/including, for example, RFC 3954—Cisco Systems NetFlow Services Export Version 9. (The NetFlow protocol itself has been superseded by Internet Protocol Flow Information export (IPFIX). Version 9 implementation of NetFlow suggests that IPFIX is on the IETF standards track with RFC 5101 (obsoleted by RFC 7011), RFC 5102 (obsoleted by RFC 7012), etc., which were published in 2008). Likewise, a device that collects connection logs, such as a web-proxy device, may alternatively or additionally be used to capture flow detail records, for example, as records enter or exit network interfaces for the network devices being monitored. Table 1, for example, illustrates an example of a typical NetFlow flow detail record without augmentation; Table 2, likewise, as another example, illustrates a typical NetFlow flow detail record with augmentation. It is noted that these tables and the other tables mentioned throughout this specification are shown in FIGS. 8A-8B.

In another embodiment, the captured flow detail records can be based on monitoring via a cloud-based system such as described herein.

A series of flow detail records are collected with respect to a particular network device, the records, for example, to be used for training a classifier. The number of records collected may comprise an amount of records feasible within storage space and/or processing time constraints. More records typically generate more precise classifiers.

As flow detail records are collected for a known environment, the records may be sorted based at least in part on the particular network device that generated the records. A label that represents the particular network device may be included with a stored file. During a training phase, stored labels may be used to select sets of flow detail records representing the particular target network device and a mix of non-target network devices. Records as labeled may also be separated into a training group and a testing group. A typical distribution, for example, may comprise selecting 75% of target network device records for training and 25% of target network device records for testing, and may comprise selecting 75% of non-target network device records for training and 25% of non-target network device records for testing. Of course, this is simply an illustrative example of an approach to splitting collected samples for training and testing and claimed subject matter is not limited in scope to this particular approach or even to necessarily splitting a collection of samples between training and testing.

In an illustrative embodiment, labeled samples (e.g., flow detail records) may be transformed into vectors to be processed using a classifier. Respective samples in an embodiment may additionally be labeled with a 1 or 0 for a target network device or non-target network device, respectively. For more effective training, thousands of samples (e.g., flow detail records) may be processed.

A respective monitored network communication flow comprises flow detail records that include a set of network flow communication parameters. Thus, selected network flow communication parameters for the respective monitored network communication flows with respect to a particular network device over a period of time are processed in a time sequenced order, after having monitored a particular number of respective network communication flows for the period of time with respect to the particular network device. A count of the processed network flow communication parameters captured over the period of time is vectorized. Based at least in part on the vectorized count for the particular network device, the particular network device is identified. Of course, again, it is noted that claimed subject matter is not intended to be limited to particular embodiments described primarily for purposes of illustration.

In an illustrative embodiment, processing, in a time sequenced order, selected network flow communication parameters for the respective monitored network communication flows comprises: accumulating and sorting the monitored network flow detail records for the particular network device and other network devices over the particular period of time; and processing the selected network flow communication parameters of the monitored network flow detail records for the particular network device and other network devices over the particular period of time.

Figure 3:
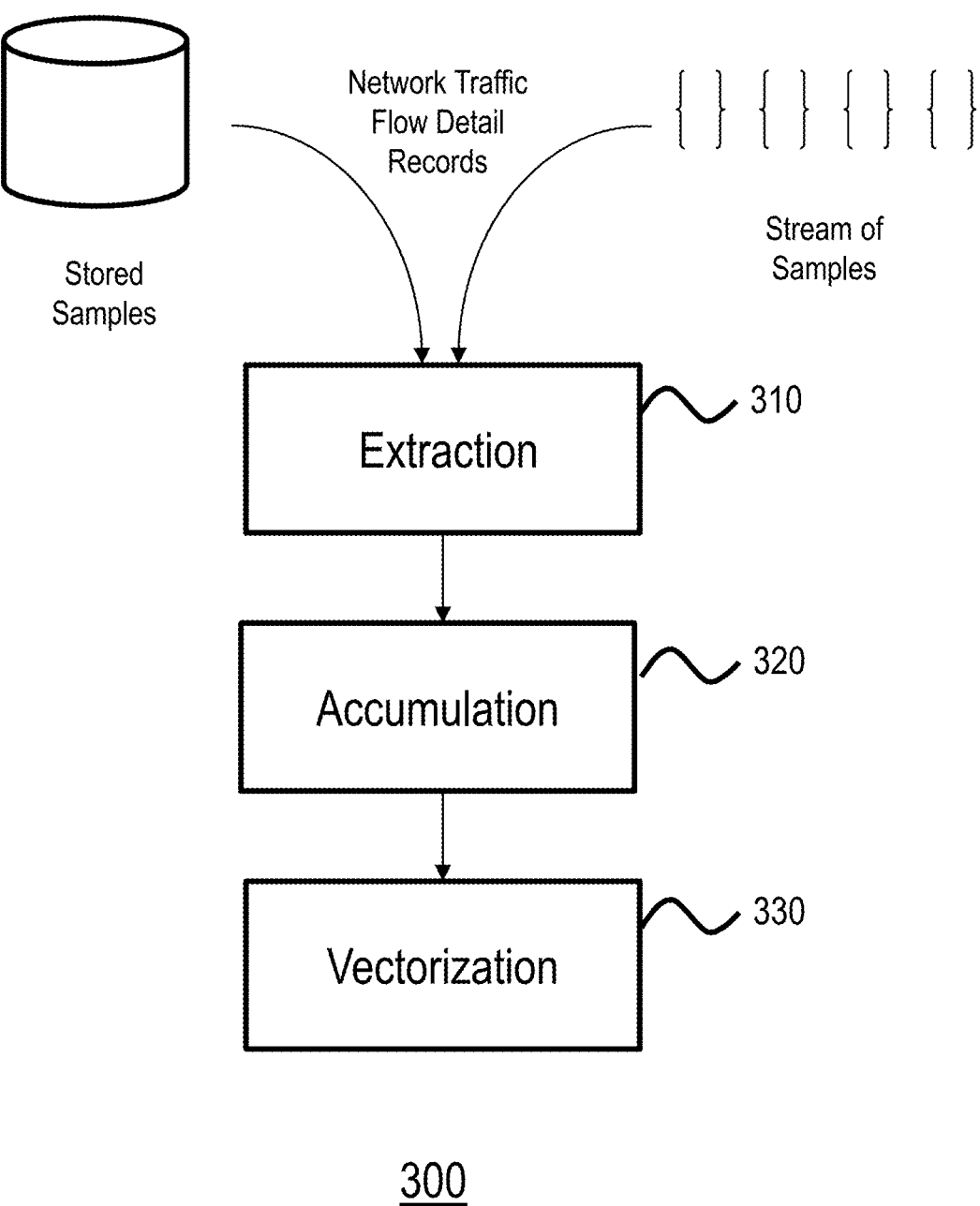
FIG. 3 is a schematic diagram of a portion of one embodiment capable of element extraction, accumulation and vectorization in accordance with claimed subject matter.

Likewise, in an illustrative embodiment, processing which includes transformation of flow detail records may be represented by three stages, as shown in FIG. 3. For example, elements are extracted, as shown by 310, which may include parsing and filtering raw flow detail records down to more concentrated elements. The term element refers to one or more particular character features of a particular communication flow parameter. Thus, an element may comprise one or more characters, such as one or more Unicode characters, one or more UTF-8 characters or any combinations, including any features, thereof. Likewise, groups of remaining elements may be accumulated, shown by 320, into pre-vectorization units (PVUs) and, as shown by 330, PVUs may be transformed into vectors (e.g., vectorized) so that resulting vectors may be processed via machine learning, as shall be described further later. Of course, claimed subject matter is not necessarily limited in scope in this respect. Rather, again, FIG. 3 provides an example for purposes of illustration. For example, other operations may be included in other embodiments. Likewise, some aspects of this illustration may be omitted in other embodiments and/or a particular order of operations may be modified for some embodiments.

Table 3 is an illustrative example after arranging records in chronological order. Elements in a flow detail record may vary depending at least in part on the type of network communications taking place. Likewise, particular elements for network communication flow parameters may vary, for example, by network, by network device under evaluation, and/or set of network devices under evaluation. Thus, some elements may be more meaningful than others for training a classifier to identify a network device. In general, however, relative usefulness of an element to train a classifier to identify a network device typically may be related to its frequency with respect to network communications involving the particular network device relative to its frequency with respect to network communications amongst a large variety of network devices in a large variety of networks.

For example, a flow detail record may include an IP address, as described in the RFC1918 specification address space for private IP addresses. This, however, implies that IP address is likely to vary from one environment to another. Therefore, it may be, relatively speaking, less meaningful for identifying a particular network device across a variety of potentially different networking environments. Another example may be a domain name commonly used. If a record contains a domain name, such as "somedomain.com," the ".com" component may be relatively less meaningful for purposes of identifying a particular network device because it may not be sufficiently distinctive within general network communications. Thus, for the present illustration of an implementation, for example, neither IP addresses nor port numbers and protocols are considered sufficiently meaningful or distinctive for use in identifying a particular network device. In contrast, however, applications may, relatively speaking, be more meaningful or distinctive in terms of assisting in identifying a particular network device. Generally, specific names assist in identifying a particular network device and typically are employed; however, network time protocol (NTP) is generally not sufficiently distinctive so, for the present illustrative example, it is not employed. While timestamps are useful for sorting, timestamps generally do not provide features that make them meaningful with respect to identification of a particular network device. In an embodiment, therefore, such as the foregoing example, elements that provide qualitatively less value with respect to identification are filtered so that remaining elements qualitatively provide greater value with respect to identification. In this context, a low or a relatively low qualitative value for identification of a particular network device with respect to elements or sub-elements of network communication flow parameters refers to a relatively small marginal increase, if any, in accuracy of an otherwise satisfactorily performing classifier by including the particular element or particular sub-element relative to omitting the particular element or particular sub-element. As simply an illustration, for an embodiment, an example of a small marginal increase, if any, may comprise an increase from no marginal increase up at about a 5% marginal increase, although claimed subject matter is not necessarily intended to be limited in scope in this respect. As an illustration of element extraction (e.g., filtering), Table 4 shows the flow detail records from above after employing filtering, as described above.

As elements are processed further, substrings may also be assessed to ascertain a degree of meaningfulness with respect to identification, such as numbers, dashes or other special characters, relative to other characters or elements around them, for example, that may otherwise be relatively more meaningful. For example, if network communication flow parameters show communication with multiple Domain Name System (DNS) names, such as appserver-1.somedomain.com, appserver-2.somedomain.com, and appserver-3.somedomain.com, then the numerical components "1", "2", "3" and the "-" marginally appear to be less meaningful relative to the "appserver" component of the communication flow parameter. Therefore, again, elements and/or sub-elements that qualitatively provide less meaning at least regarding identification of a particular network device (including ".com", for example) may be removed resulting in "appserver somedomain."

In general, as more records are processed, those elements and/or sub-elements that are less meaningful with respect to identification of a particular network device may become more certain and may be extended. As more samples of various types are used for generating additional machine-learning classifiers, results may be examined to continue to evaluate elements and/or sub-elements that appear in network communication flow parameters. Those that appear to be relatively common, such as ".com," or highly variable, such as RFC1918 address, may be added for filtering of network communication flow parameters so that processing excludes such additional elements and/or sub-elements. Likewise, this approach may be repeated several times, for an embodiment.

In an embodiment, processing selected network flow communication parameters comprises processing remaining selected network communication flow parameters after removing at least one of the following from the selected network communication flow parameters: .com, .net, .org, www, example, time, ntp, pool, digits 0-9, dashes, or any combination thereof. In this illustrative implementation, therefore, we have specifically filtered out:

.com, .net, .org, www, example, time, NTP, pool
digits 0-9
dashes

Table 5 is an illustration of further filtering reduction as described above, for an embodiment.

In an embodiment, processing selected network flow communication parameters of monitored network flow detail records for a particular network device and other network devices over a particular period of time includes: identifying in the flow detail records any characters or other elements that occur with a relatively high-frequency compared with remaining characters or other elements of the flow detail records; iteratively evaluating the effect on accuracy of a classifier of filtering from selected network flow communication parameters the identified characters or other elements; and extracting from selected network flow parameters identified characters or other elements for which evaluation of filtering thereof indicates an improvement in accuracy. As simply an illustration, for an embodiment, an example of a relatively high frequency compared with remaining elements or characters may comprise three-to-five times more frequent or even higher, although claimed subject matter is not necessarily intended to be limited in scope in this respect. Thus, identifying elements and/or sub-elements to be extracted may, in an embodiment, be performed without human intervention, for example, by searching a large set of flow detail records for elements that occur with a high frequency across all network devices that have been sampled. A loop could be employed to iteratively test effects of filtering the candidate elements and/or sub-elements. If removing the elements and/or sub-elements results in better classification accuracy, those candidate elements and/or sub-elements are included in a list of elements and/or sub-elements that are to be extracted before further processing.

Accumulation, shown in FIG. 3 as 320, may, for an implementation, include tracking how many records have been processed and combining elements that remain after other elements and sub-elements have been extracted to form one or more "Pre-Vectorizer Units" or "PVUs", perhaps of a prescribed size, for example, in an embodiment. Thus, after being filtered, flow detail records may be concatenated together. The number of flow detail records to concatenate for a single PVU comprises a tunable parameter with respect to a classifier to potentially improve performance. An objective, for example, may include to reduce a number of flow detail records in a PVU (referred to as PVU size) while improving accuracy of a classifier during testing. Table 6 illustrates a PVU size of 2 and Table 7 illustrates a PVU size of 3. For the present illustration, PVU size typically was between about 5 and about 50.

Vectorizing a count of processed network flow communication parameters comprises vectorizing one or more formed pre-vectorization units (PVUs). After being sorted, filtered and grouped into PVUs of a specified size, as suggested for an embodiment, vectorization may take place.

In an embodiment, for example, vectorizing one or more formed PVUs comprises: identifying within the one or more formed PVUs for a particular network device and other network devices, over a particular period of time, a number of instances of respective selected network flow communication parameters; counting within the one or more formed PVUs for the particular network device and the other network devices over the particular period of time the number of instances of the respective selected network flow communication parameters; and weighting the count of the number of instances of the respective selected network flow communication parameters within the one or more formed PVUs for the particular network device and the other network devices over the particular period of time.

Thus, during a training process, flow detail records may be collected and processed to produce PVUs for a large number and variety of devices, limited primarily by storage and/or processing time. By grouping text segments (e.g., character strings) into PVUs, a "bag of words" type situation has been constructed, in an embodiment. Thus, for example, in an implementation, a term-frequency-inverse-document-frequency (tfidf) process may be used to convert PVUs into a vector of normalized, floating point signal sample values.

For example, for an embodiment, a term-frequency operation comprises counting the number of times a distinct element appears within a PVU. For purposes of illustration, a computation for an embodiment may be substantially in accordance with the following relation:

$$tf(e, p) = f_{e,p}$$

and where the following nomenclature is employed:
e: element
p: PVU
$f_{e,p}$: count Likewise, a process may further weigh elements by a function of frequency across the PVUs for a training set, so to speak. In an embodiment, weights may be computing using a logarithmically scaled inverse fraction of PVUs that contain the particular element substantially in accordance with the following relation:

$$idf(e, D) = \log \frac{N}{|\{p \in D : e \in p\}|}$$

and where the following nomenclature is employed:
e: element
p: PVU
D: training set of PVUs
N: number of PVUs in the training set N=|D|
$\{p \in D: e \in p\}$: number of PVUs where element e appears One interpretation may be that this provides a measure of distinctiveness. Thus, a normalized, weighted signal sample value may, therefore, in an implementation, be computed substantially in accordance with the following relation:

$$tfidf(e, p, D) = tf(e, p) \cdot idf(e, D)$$

FIG. 4 is a flowchart showing the previously described illustrative embodiment, 400, which includes operations

410, 420, 430, 440, 450, 460 and 470, such as previously described. It is noted, of course, that other forms of term weighting may also be used, which may, for example, be combined with the foregoing in an embodiment to potentially improve accuracy.

In an alternate embodiment, for example, the following methods may be included together or separately, although, again, claimed subject matter is not limited in scope to these illustrations. In an embodiment, for example, a method may involve creation and maintenance of a database of device and manufacturer names with correspondingly assigned factors or multipliers. Names in the database may be sourced through market research, for example, and factors may be calibrated manually based at least in part upon training accuracy results. Thus, in an embodiment, for an element appearing in the database, weighting may be scaled by a multiplier associated with the name in the database. Likewise, in another embodiment, publicly available search engines, for example, may be employed with respect to elements embedded within websites of known device manufacturers or known device marketers to estimate a measure of potential relevance of a given element with respect to devices manufactured by that known device manufacturer or with respect to devices marketed by that known device marketer. For example, the word "Nest" is prominent on the website for nest.com. Therefore, the element "nest" would be scaled by a weight to reflect a more likely association (e.g., assigned a multiplier greater than 1) as a possible indicator of a device manufactured by the company Nest Labs, Inc.

As previously alluded to, sample sets (here, a vectorized PVU), in an embodiment, may tend towards linear approaches, such as, for example, linear support vector machines, described, for example, at https://en.wikipedia.org/wiki/Support-vector_machine, or logistics regression, described, for example, at https://en.wikipedia.org/wiki/Logistic_regression. Likewise, in another embodiment, one could also implement a tensor flow representation for a neural network approach, illustrated later. However, for the present illustration, logistic regression is employed, having features that typically should include relative simplicity and relative effectiveness with respect to results.

In general, linear models attempt to form a separation between two clusters of processed sample sets and produce a matrix of weights and a vector of biases to be employed with respect to a processed sample set, as shown below, to predict a preferred fit vis-à-vis the clusters. It is noted, here, that a processed sample set comprises a vectorized PVU. Logistic regression is similar to a linear support vector machine; however, a logistic function curve (e.g., log) rather than a linear curve is employed to compute a probability score on the range of 0.0 to 1.0. It is noted, again, that this is an illustrative example and it is not intended that claimed subject matter necessarily be limited in this respect.

Likewise, for an embodiment, the scikit-learn python libraries for Logistic Regression may be employed, as documented at https://scikit-learn.org/stable/modules/generated/sklearn.linear_model.LogisticRegression.html; however, again, claimed subject matter is not intended to be limited in this respect. For purposes of illustration, a Logistic Regression scikit class was implemented with existing default parameters and without any customization, such as tuning of a regularization parameter, for example. Thus, for this illustrative example, a linear computation may take place substantially in accordance with the following:

$$\omega = [\omega_1, \omega_2, \omega_3, \ldots \omega_n]$$

$$x = [x_1, x_2, x_3, \ldots x_n]$$

$$y = \sum_{i=1}^{n} \omega_i x_i + \beta$$

and where the following nomenclature is employed:

γ: prediction
x: vectorized PVU
ω: computed coefficient weights
β: computed bias
n: number of elements
$x_i$: $i^{th}$ element
$\omega_i$: $i^{th}$ element weight After flow detail records have been converted to vectors, grouped with respect to target network device and non-target network devices, separated into a training set and a test set, and a machine learning approach has been selected, then training a classifier may occur. A training process is intended to train a classifier in a "one vs the rest" approach in which sample sets (e.g., vectorized PVUs) from many different sources are labeled either as 1 (designating the target network device) or 0 (designating a network device that is not the target network device). In general, it is desirable for non-target network device vectorized PVUs to include a large variety of network devices to represent situations that might be encountered following deployment in an operational environment. Thus, for training, labeled vectors are passed to a classifier, which results in a matrix of weights and a vector of biases, referred to as a model, as previously described.

With use of the scikit-learn libraries, transformed vectors and associated labels may be passed into a "fit" operation and a trained classifier may be tested to determine classifier accuracy. For example, Table 8 includes sample pseudo-code for classifier testing. Likewise, after a model is trained, it is desirable to also test it to assess effectiveness. As was described, we use a subset of 25% of the initial collection for testing by transforming sets of samples into vectors as had been done previously to train the classifier. Likewise, the classifier is employed to get prediction results from the transformed vectors. Prediction results are then compared to expected labels for the transformed vectors. A ratio of correct results to incorrect results is employed to measure accuracy for the trained classifier. Thus, using the scikit-learn libraries, a test set and labels are passed to a "score" operation to compute accuracy of the trained classifier. Table 9 provides sample pseudo-code for such a computation.

For an implementation, for example, an accuracy score greater than 90% is considered acceptable, although claimed subject matter is not intended to be limited in this respect. If it is less than 90% then, for this illustrative embodiment, process tuning takes place to improve accuracy.

Several options exist to improve an accuracy score, if, for example, it falls below 90%, including:

increase PVU size;
collect more samples; and/or
employ a different model.

Insufficient accuracy may be interpreted to mean that a wider separation of the two clusters is desirable.

Larger PVU sizes result in vectors that contain more samples for an individual vector. In operation, however, smaller PVU sizes are appealing because, for a larger PVU size, it may take more time to collect sufficient samples to generate a PVU. For the example described, a PVU size of 5 was tried and then increased in increments of 5 up to 50.

Based on experimentation, PVU sizes beyond 50 appear to produce limited improvements to accuracy.

If increasing PVU size does not produce satisfactory results, another option may be to train a classifier with more sample variety (e.g., more records from a wider variety of network devices) in order to improve accuracy. However, if a higher accuracy score remains desired despite the two previous ways to attempt to improve accuracy, different machine learning approaches may be used as another way to attempt to improve prediction accuracy. Notably, vectorized PVUs do not change in this situation because different models are to be used for comparison to a known result. Thus, results between different models may be compared to select an approach that results with a better accuracy than alternatives.

As suggested previously, a logistic regression classifier is not the only possible approach. One could also use a Deep Neural Network (DNN) implemented with the Tensor Flow library, for example. A DNN model would employ samples, as before, such as using a common source, and employ vectorization of the samples, but then, process vectorized PVUs with a multi-layer Tensor Flow Perceptron to produce classification results, as shown, for example, by embodiment 500 in FIG. 5.

An embodiment of one specific configuration, known to produce a functional classifier, comprises a 3-Layer network with rectified linear unit (ReLU) activators at respective layers with dimensions, as provided below, for example. A gradient descent process with 2000 training iterations may be employed to produce a trained DDN classifier.

Figure 5:
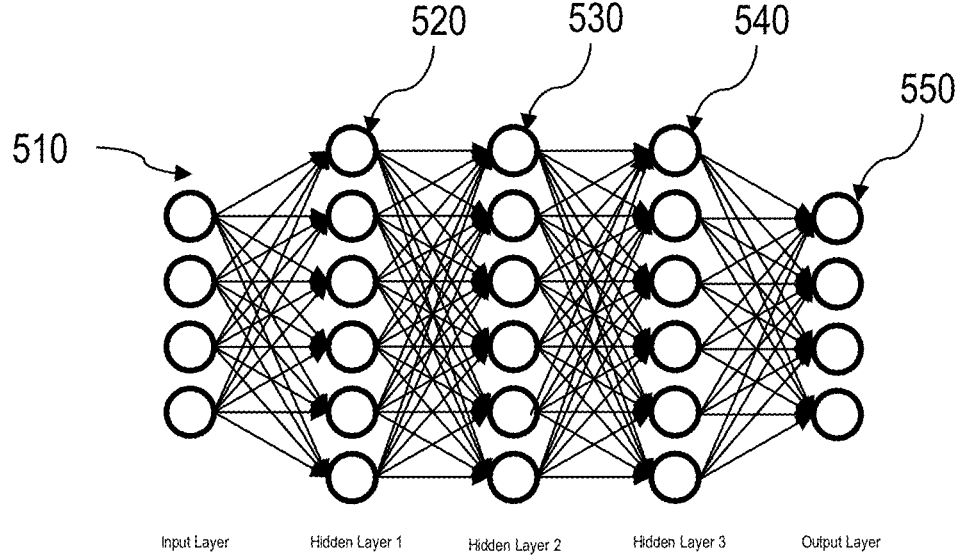
FIG. 5 is a diagram of an embodiment of a multi-layer deep neural network (DNN) in accordance with claimed subject matter.

As shown in FIG. 5, embodiment 500 includes a first layer, 510, sized, for example, for an input vector. A second layer, 520, comprises Hidden Layer 1 with 1200 neurons. A third layer, 530, comprises Hidden Layer 2 with 800 neurons. A fourth layer, 540, comprises Hidden Layer 3 with 400 neurons. Likewise, a fifth layer, 550, is sized for the number of classifications being trained.

After a classifier, whether a logistic regression classifier, a support vector machine or a DNN model, is tuned to an acceptable level of accuracy, it may be used in operation for real-time identification of unknown network devices. For example, in an embodiment, communications of a network (e.g., communication network flows) may be monitored for an addition to a network of a network device. A system, therefore, may collect flow detail records as samples, transform the records, employ a set of trained operational classifiers and determine labels based at least in part on classifier results.

As is the case for collecting training samples, evaluation samples may be collected from locations in a network that provide access to communications to and from network devices, as was shown in FIG. 2. Typically, real-time network communications are collected, as opposed to stored samples; however, either or both may be employed. Operational flow detail records may be collected in the format specified previously; although claimed subject matter is not limited in scope in this respect.

In this example, as samples (e.g., real-time flow detail records) are collected, PVU segments are created and accumulated over time. It is noted that respective operational classifiers may employ a specified PVU size, as discussed previously. Thus, as accumulated PVUs meet or exceed a size for a particular trained classifier, those PVUs may be converted to a vector, as previously described, for this illustration.

After PVUs for an unknown network device have been processed (e.g., transformed) a prediction may be made.

Again, continuing with the previously described illustration, the scikit-learn Logistic Regression classifier has two options for making a classification prediction. One is called "predict" and the other is called "predict_proba". The "predict_proba" operation provides an estimate of certainty along with a classification. Table 10 illustrates an implementation of a prediction with a previously trained classifier (clf).

A prediction value is the result of a process for identifying a network device, such as the illustrative example previously described. A prediction value of 0.5 or greater means that the classifier has concluded that the sample set (e.g., vectorized PVU) is from a network device for which the classifier was trained and a value below 0.5 means that it is concluded to not be from a network device for which the classifier was trained. A result may range from a value of 0.0 to 1.0, where the greater the value, the more likely the sample set (e.g., vectorized PVU) is from the target network device, and conversely, the lower the value, the more likely the sample set (e.g., vectorized PVU) is not from the target network device. Thus, a set of classifiers that have been trained for a variety of network devices shall all process the sample set (e.g., vectorized PVU) and make a prediction as to whether the sample set (e.g., vectorized PVU) is from a network device for which the respective classifiers were trained.

Collection, transformation, and prediction processes continue until all classifiers have made a prediction. Results of respective predictions are compared to find the largest prediction. If the largest prediction is greater than 0.90 (90%), then the prediction is accepted. If more than one classifier is greater than 90%, then the classifier with the highest value is used and the network device is labeled by that classifier and the result is saved in a database for future reference. If none of the classifiers reach a prediction value greater than 0.90, then the collection process begins again and repeats until at least one classifier successfully identifies the network device with a prediction value greater than 0.90. It is noted that at a time in which computational load is detrimental, a timer may be inserted into the repeating process to delay restart of collection and reduce computation load. After a certain number of repeated attempts, if still no classifier identified the network device with a prediction value greater than 0.90, the process may be halted. This may indicate that a network device for which no classifier has been trained has joined the network. For an alternate embodiment, perhaps, for example, unsupervised learning may then be employed using a database of results to look for similarities between vectorized PVUs from the unidentified network device and vectorized PVUs for network devices that are known.

Periodically and/or a-periodically retraining one or more machine learning classifiers may also occur while a set of classifiers is operational. For example, in an embodiment, retraining of one or more machine learning classifiers comprises: monitoring for a period of time respective network communication flows engaged in by a selected particular network device and other network devices. A respective monitored network communication flow may comprise flow detail records that include a set of network flow communication parameters, as before. Processing may take place, in a time sequenced order, of selected network flow communication parameters for respective monitored network communication flows with respect to a selected particular network device and other network devices for the period of time. Likewise, vectorizing make take place of a count of processed network flow communication parameters captured over the period of time, after having monitored a particular number of respective network communication flows for the period of time with respect to the selected particular network device and the other network devices. Thus, for an embodiment, in operation, training and testing phases may be repeated, without human intervention, as more flow detail records are collected. If additional testing and training results in more accurate classifiers, then current classifiers may be updated in place, thereby potentially continually improving accuracy for discovering new network devices.

Figure 7:
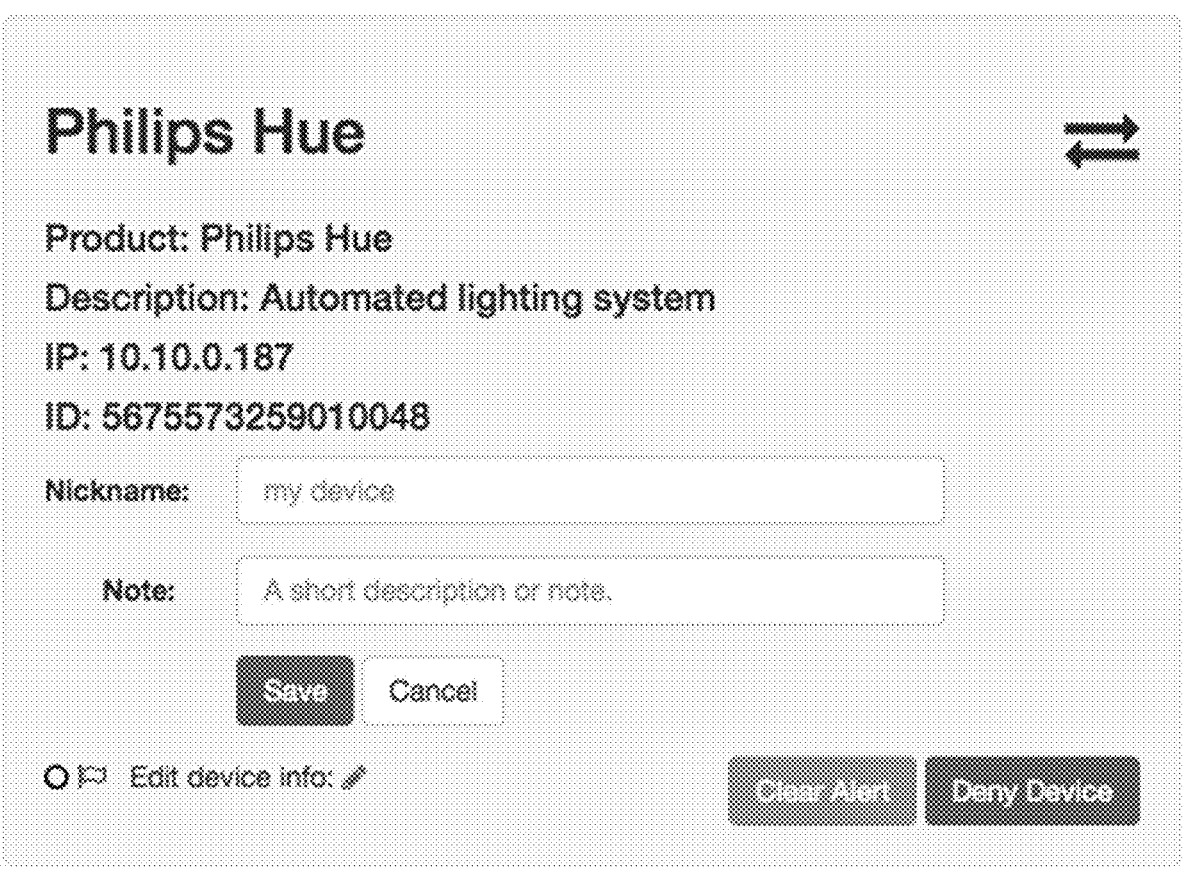
FIG. 7 is an example of a graphical user interface (GUI) that may be employed in connection with an embodiment of claimed subject matter.

In an embodiment, operational classifiers may also collect content from customers to enhance classification. For example, customers may have an opportunity to provide custom labels and descriptions for any network device, such as via a user interface, such as the example embodiment shown in FIG. 7. These labels and descriptions may provide further details in the form of character strings (e.g., text) capable of being processed during later training and testing phases, in an embodiment, for example. Labels, such as provided by customers, for example, may be used to improve accuracy of an existing classifier by indicating that some character strings should be given a higher weighting. For example, assume a customer labels a device with the character string "rachio." It is noted that future versions of a classifier may look for that character string within a PVU and amplify a weighting to be assigned to a PVU that includes the character sting. In another example, a network device may be unrecognized by the current classifiers. Thus, a customer label may then be used to identify the particular network device, which shall, in an embodiment now be trained at least in part based on labels and description from the customer.

Figure 9:
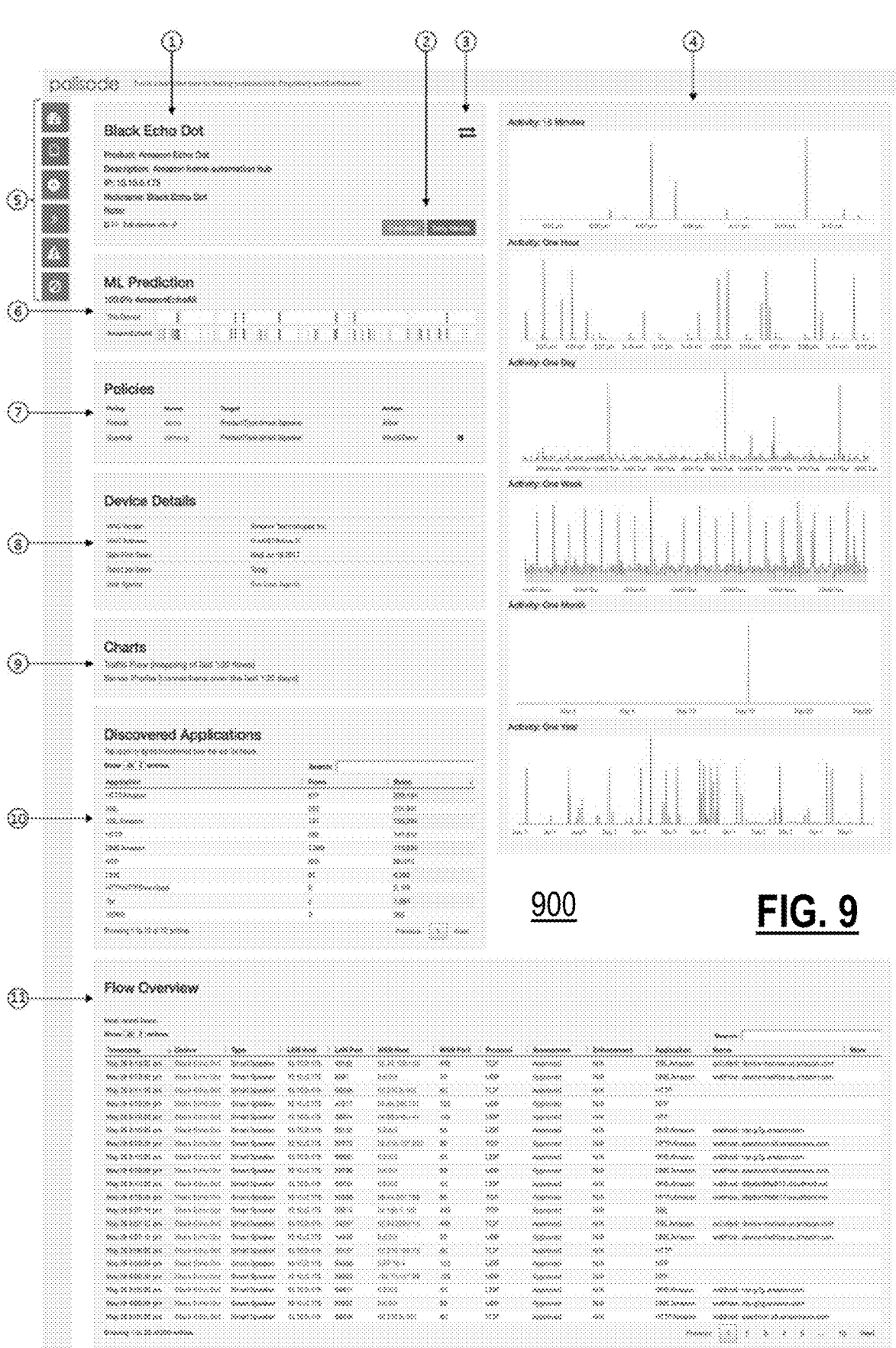
FIG. 9 is another example of a graphical user interface (GUI) that may be employed in connection with another embodiment of claimed subject matter.

FIG. 9 illustrates an example embodiment 900 of a graphical user interface (GUI) that may be employed in connection with an embodiment of claimed subject matter. Of course, this is simply an illustrative example and claimed subject matter is not limited in scope to this particular example. Section 1 illustrates a device identification portion that may display common identifiers for a network device and is intended to provide a user with easily recognizable aspects of a network device, such as type of device, description, IP address and/or user-provided nickname. A user may add or modify a nickname and/or provide a note regarding a network device. Section 2 illustrates quick action buttons for possible actions with respect a network device that may be frequently used and/or for which easy or quick access may be desirable. The two buttons shown include a button to clear an alert state if a network device is in an alert state and a "Deny Device" button to set up a firewall policy to deny access for a network device. Section 3 illustrates a policy state indicator capable of changing to reflect a currently active policy, such as to allow or deny internet access for a network device. Section 4 illustrates real-time activity charts to indicate for a user volume of traffic between a network device and the internet. Multiple charts with different time spans may be provided so that a user is able to see, at one time, details of current traffic and context over time. Section 5 illustrates user interface (UI) navigation tabs on the left side for a user to navigate to other features that may be included with a product offering. Section 6 illustrates a prediction resulting from classifiers, as previously described. The section also illustrates a visualization of vectorizations calculated for a network device, described in more detail below. Likewise, this section may illustrate similarity of a network device to other known network devices via a comparison of visualizations. As explained below also, darkness of vertical lines in the visualization corresponds to relative significance of characteristics that the vertical line represents. Section 7 illustrates that a user may be permitted to configure. policies to control if a network device has access to the internet. The policies are configured on a different tab (not shown) but are summarized in this section for the particular network device being displayed. Section 8 illustrates some additional details about a network device, such as date first detected on the network, mac address, and vendor associated with the mac address, as examples. Section 9 provides links to more detailed charts and tables related to the particular network device being displayed. Section 10 illustrates that applications and protocols that have been observed for a particular network device may be displayed. Section 11 illustrates a flow overview table that is able to list most recent flows recorded for a particular network device being displayed, along with augmentation about the flow, such as if it was considered normal traffic or if it was considered abnormal.

Figure 10A:
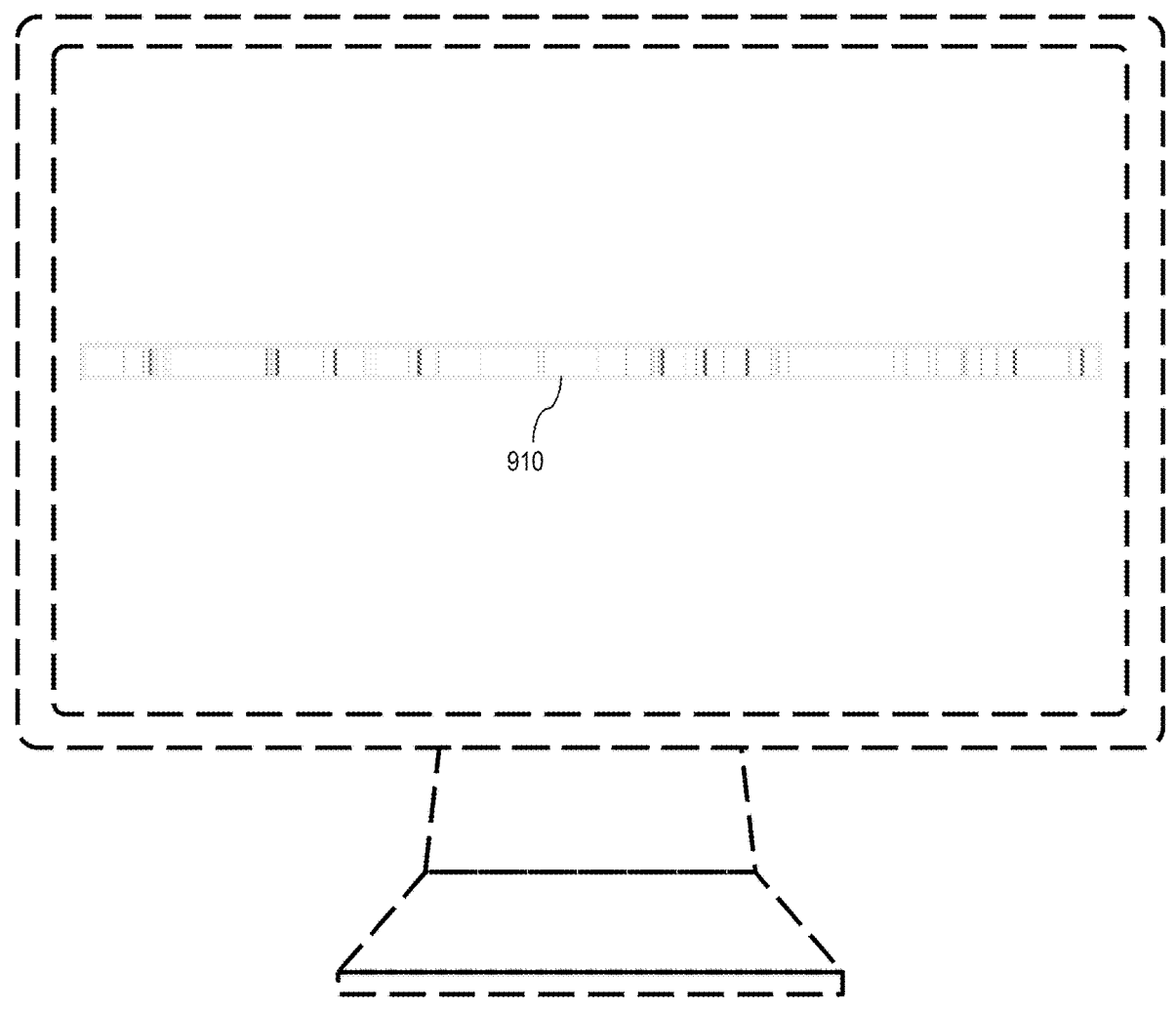
FIGS. 10A-10H are examples or illustrations of sample network device communication flow visualizations on a display screen capable of being produced by an embodiment in accordance with claimed subject matter.
Figure 10B:
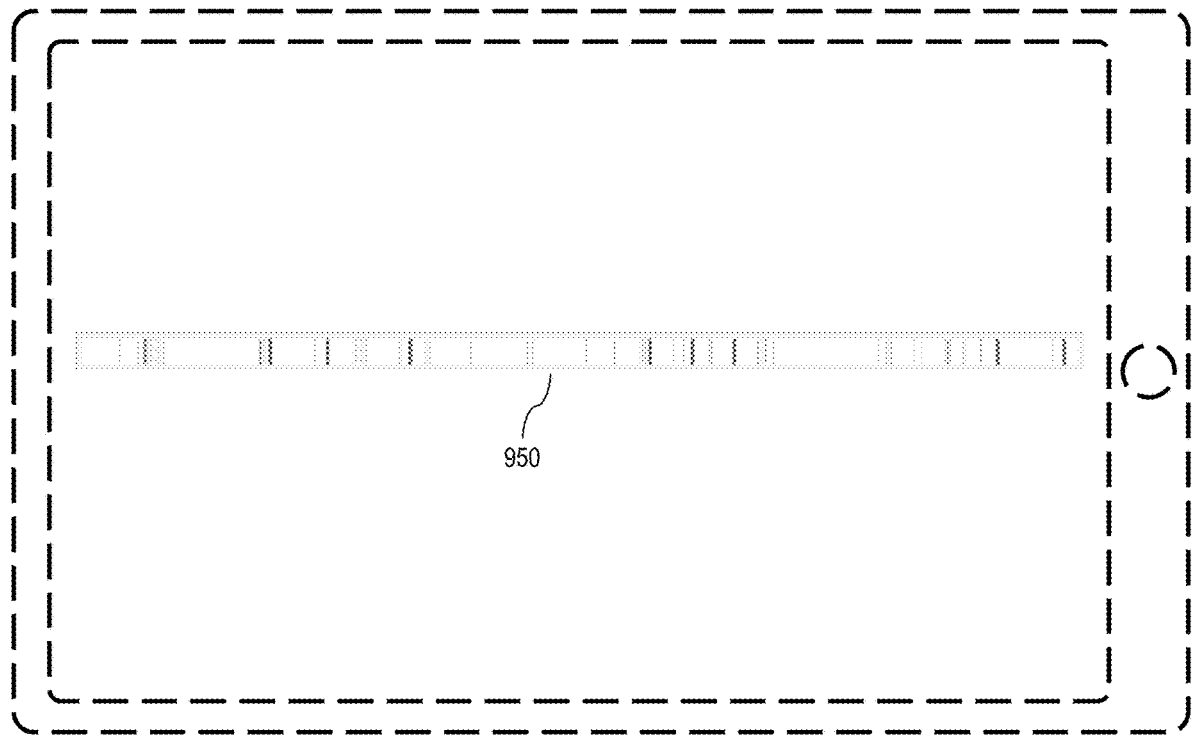
Figure 10C:
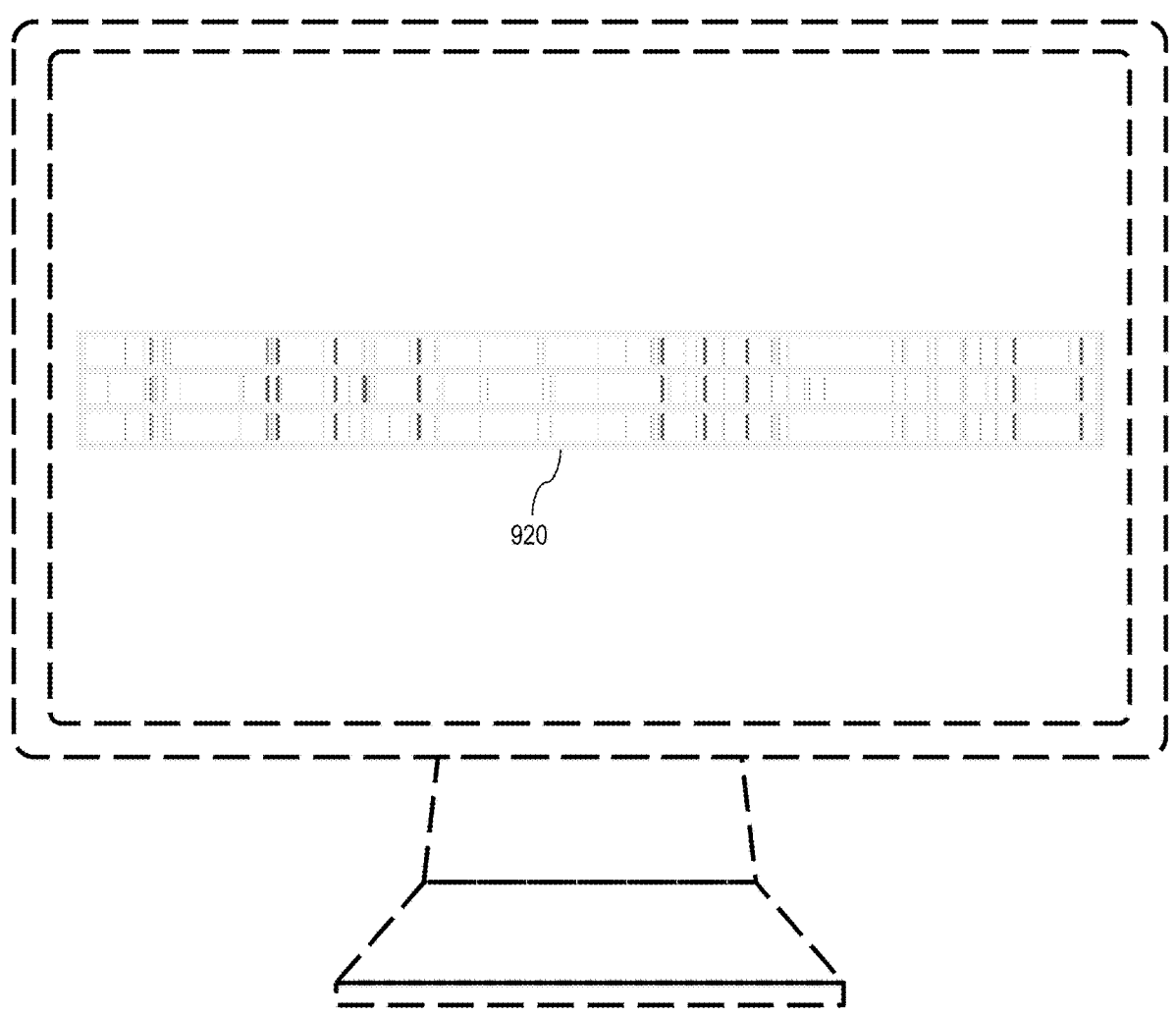
Figure 10D:
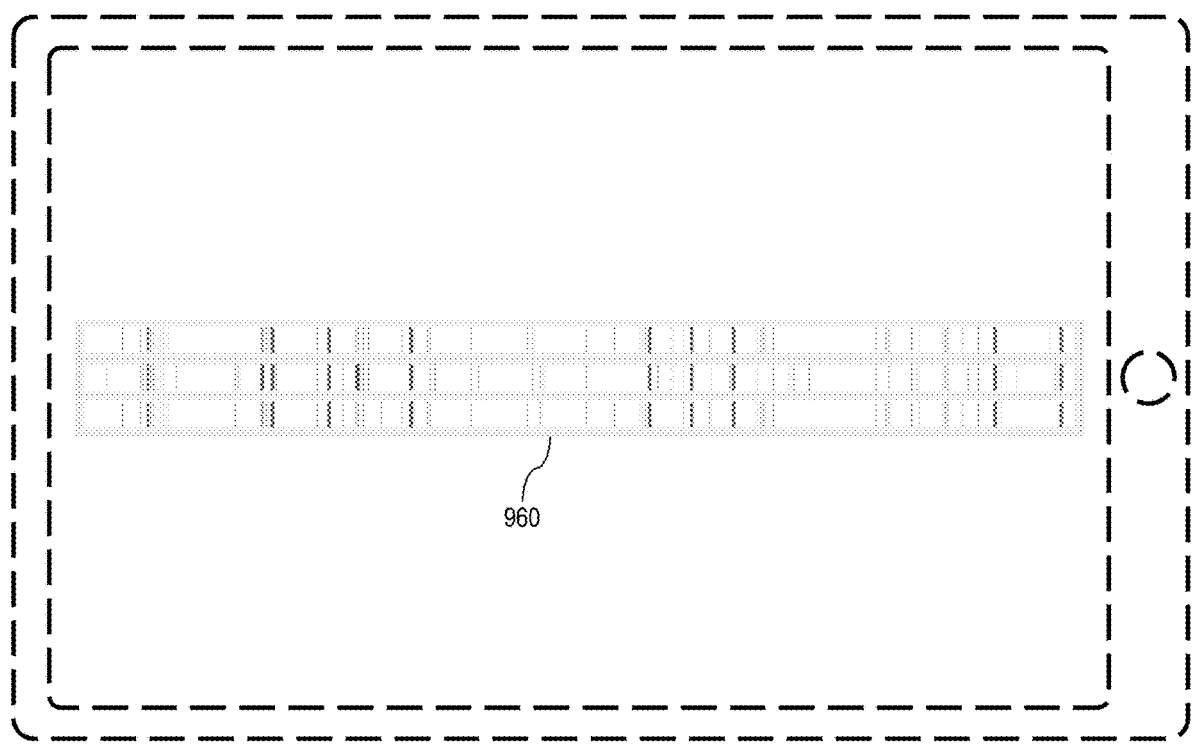
Figure 10E:
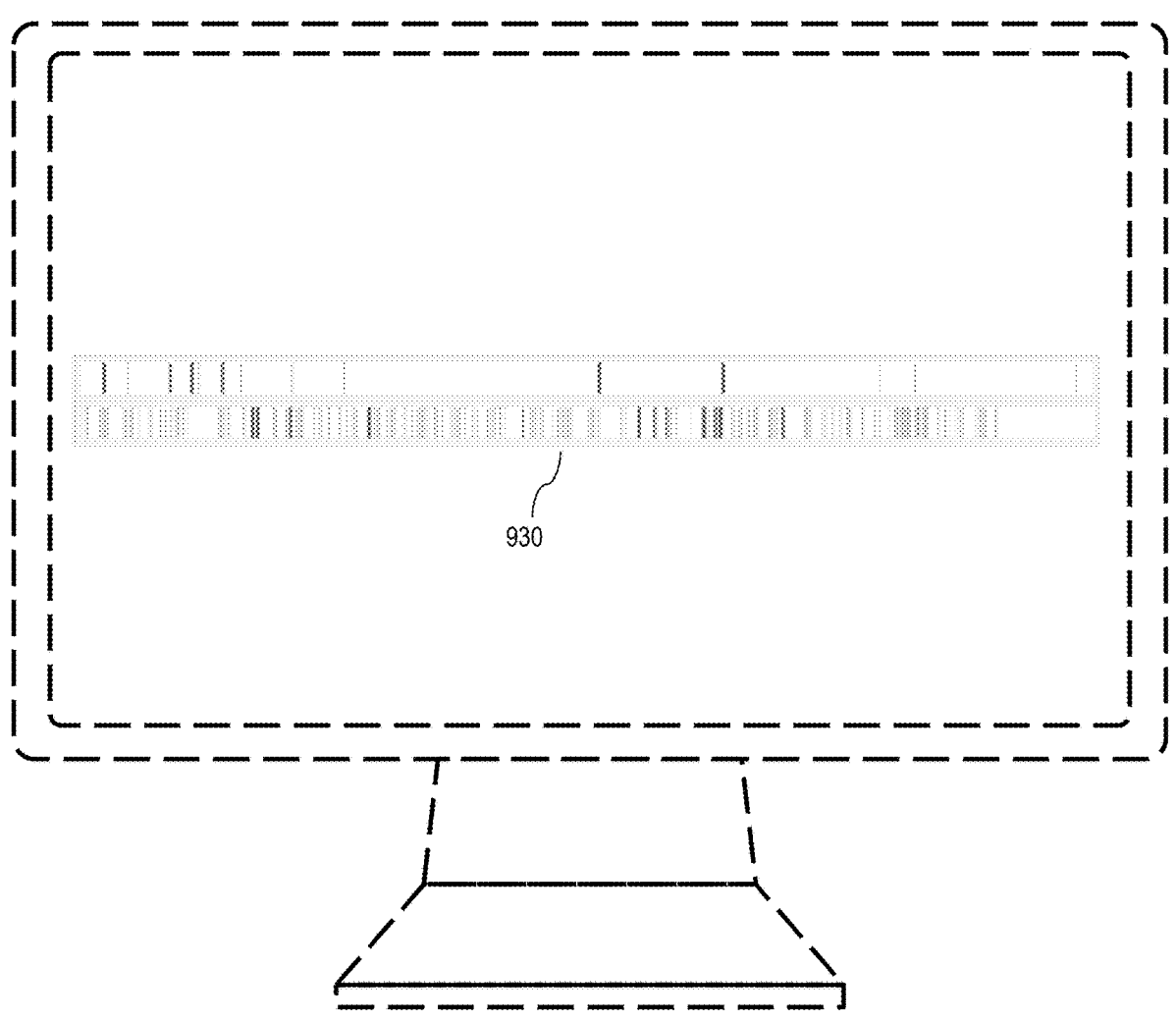
Figure 10F:
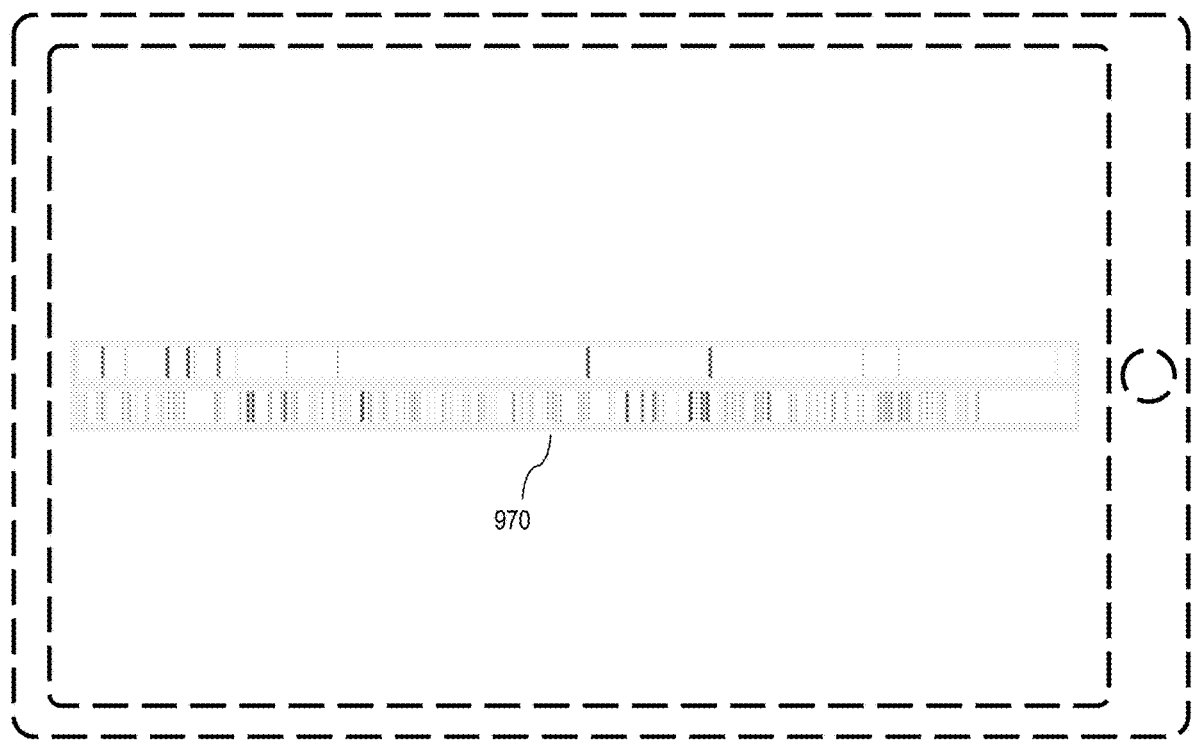
Figure 10G:
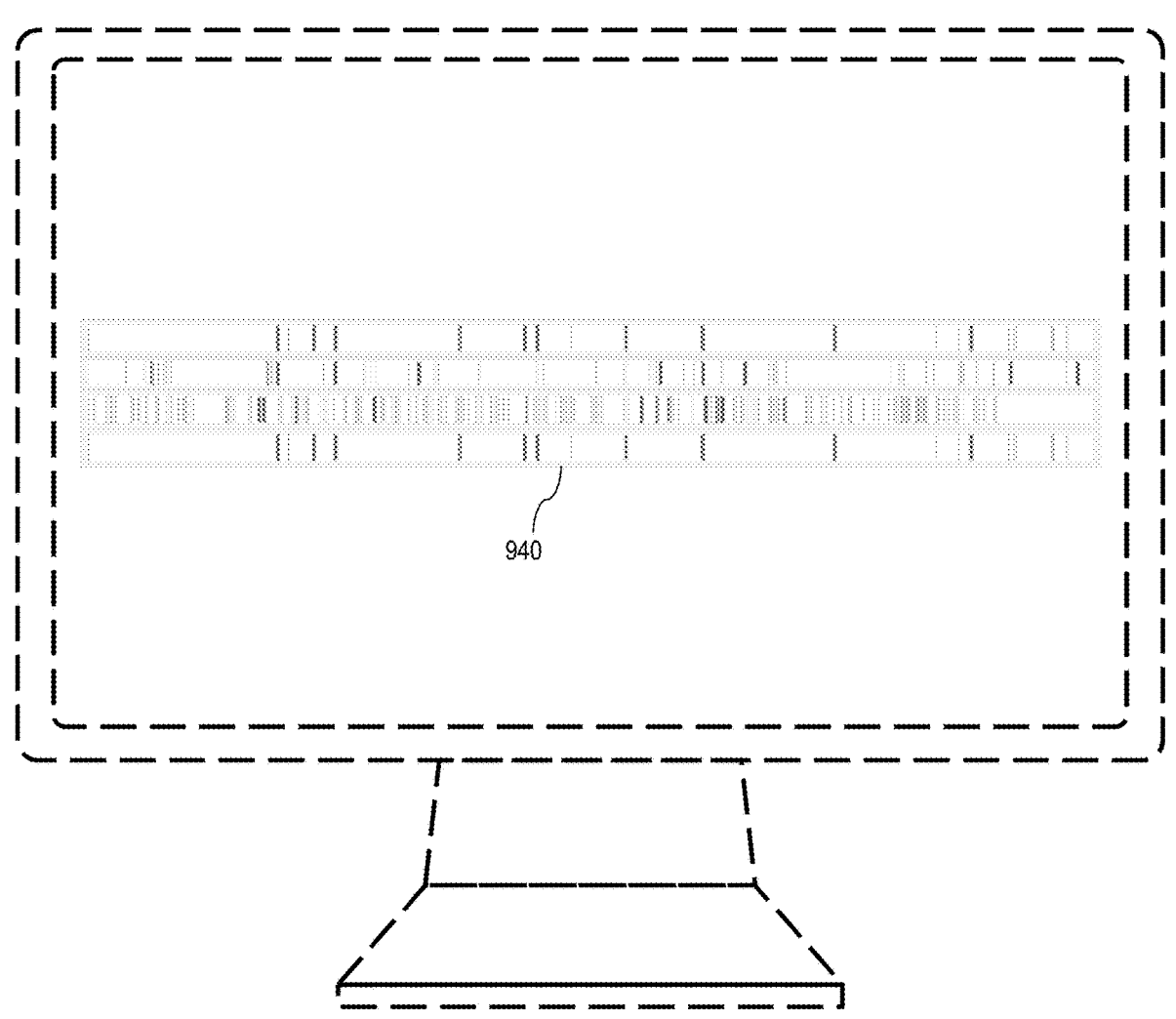
Figure 10H:
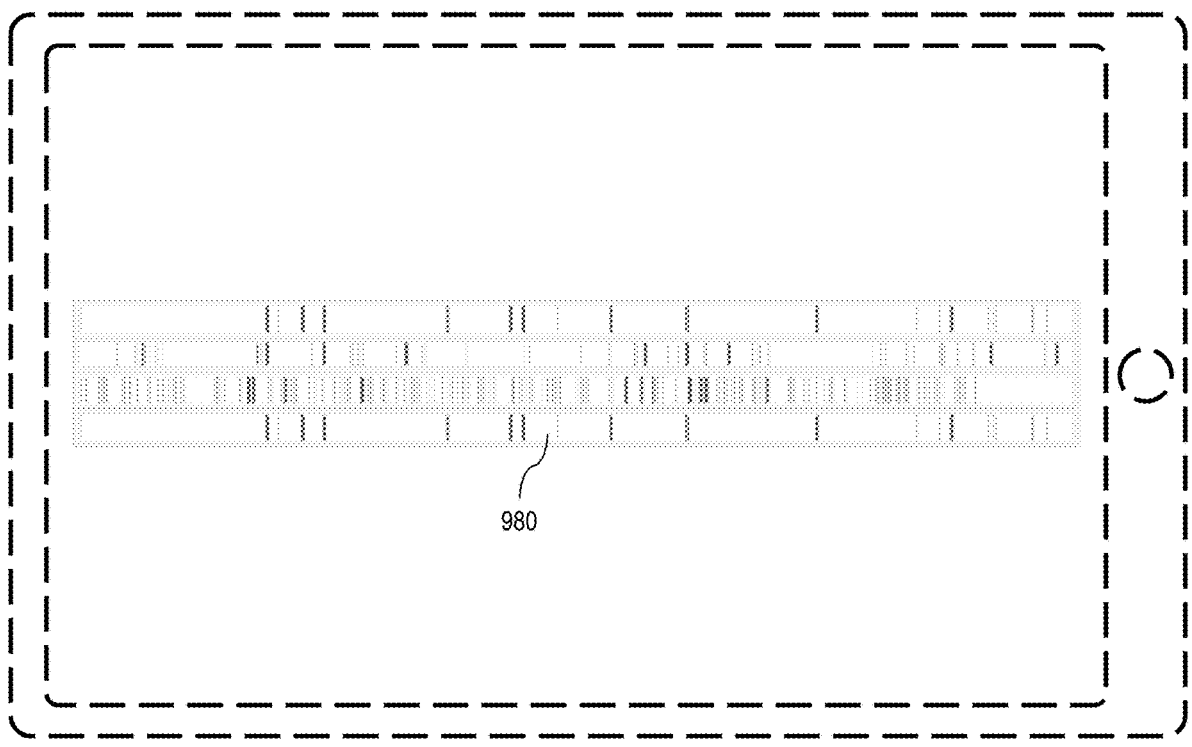

FIGS. 10A-10H show four examples of visualizations, with the respective visualizations shown on a computer monitor (FIG. 10A showing 910, FIG. 10C showing 920, FIG. 10E showing 930, FIG. 10G showing 940) and a tablet (FIG. 10B showing 950, FIG. 10D showing 960, FIG. 10F showing 970, and FIG. 10H showing 980). These visualizations have some similarity with the visualization shown in section 6 of FIG. 9. In these FIGS., visualizations are depicted, respectively on a computer and a tablet display, with the display shown using dotted lines to depict an environment. For example, in an embodiment, a visualization may be generated from network communication flows for a particular network device. A generated visualization may, for example, in an embodiment, graphically depict a vectorized count of processed network flow communication parameters of a set of network communication flow parameters captured over a period of time after having monitored network communication flows for a time period with respect to a particular network device.

For example, as shown, in FIGS. 10A and 10B, an embodiment comprises a display providing a horizontal box with short vertical lines as markers. Thus, for an illustrative embodiment, a marker may represent presence of a relevant characteristic in network communication flows of a network device. In this manner, for example, a network communication flow parameter may be depicted graphically. Shade and thickness of a vertical line may be modified to represent frequency of a characteristic for a vectorized set of samples processed for a network device. Thus, a thick, heavy line in the example shown illustrates a characteristic that is present and frequent, while a light thin line illustrates a characteristic that is present, but not frequent. Shading and thickness may also be employed to represent measured significance of a characteristic, such as previously described. For example, as previously explained, in this context, a low or a relatively low qualitative value for identification of a particular network device with respect to elements or sub-elements of network communication flow parameters refers to a relatively small marginal increase, if any, in accuracy of an otherwise satisfactory performing classifier by including the particular element or particular sub-element relative to omitting the particular element or particular sub-element. This aspect may, for example, be depicted with a light, thin vertical line whereas a higher qualitative value for identification of a characteristic might be depicted as a thick, heavy line. Likewise, color and/or shape may also be employed to call out differences visually, particularly with respect to comparisons of different vectorized sample sets for different network devices, as described below.

Comparisons of visualizations of vectorized sample sets for different network devices, for example, provides a visual mechanism for quickly making similarity and difference assessments. FIGS. 10C and 10D, for example, show three vectorized sample sets of network devices that exhibit similar characteristics and FIGS. 10E and 10F show two vectorized sample sets of network devices that exhibit different characteristics. Finally, FIGS. 10G and 10H show four vectorized sample sets in which two of the four sample sets have similar characteristics. Again, as suggested, for additional visual comparisons, color and/or shape may also call out differences, such as where a characteristic expected to be relatively similar between vectorized sample sets is not, and so forth. Thus, as suggested, similarities and/or differences may be observed visually to relatively quickly form conclusions or at least affect perceptions which may stimulate further investigation, for example.

It is noted that an Appendix is included at the end of the specification, before the claims, that provides illustrative examples of network devices that may be identified using an embodiment in accordance with claimed subject matter, as previously described. It is noted that claimed subject matter is not intended to be limited to these illustrative examples. Thus, many other network devices other than these devices may likewise be identified using an embodiment in accordance with claimed subject matter, as previously described. Furthermore, it may be that not all of these devices are necessarily identified, or it may even be that none of these examples of network devices ultimately end up being identified using an embodiment in accordance with claimed subject matter. However, these examples are intended to provide illustrations of types of devices that may be identified and, therefore, in an embodiment, for example, may be discovered and/or controlled at least partially.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, Apple Talk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPV6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 6:
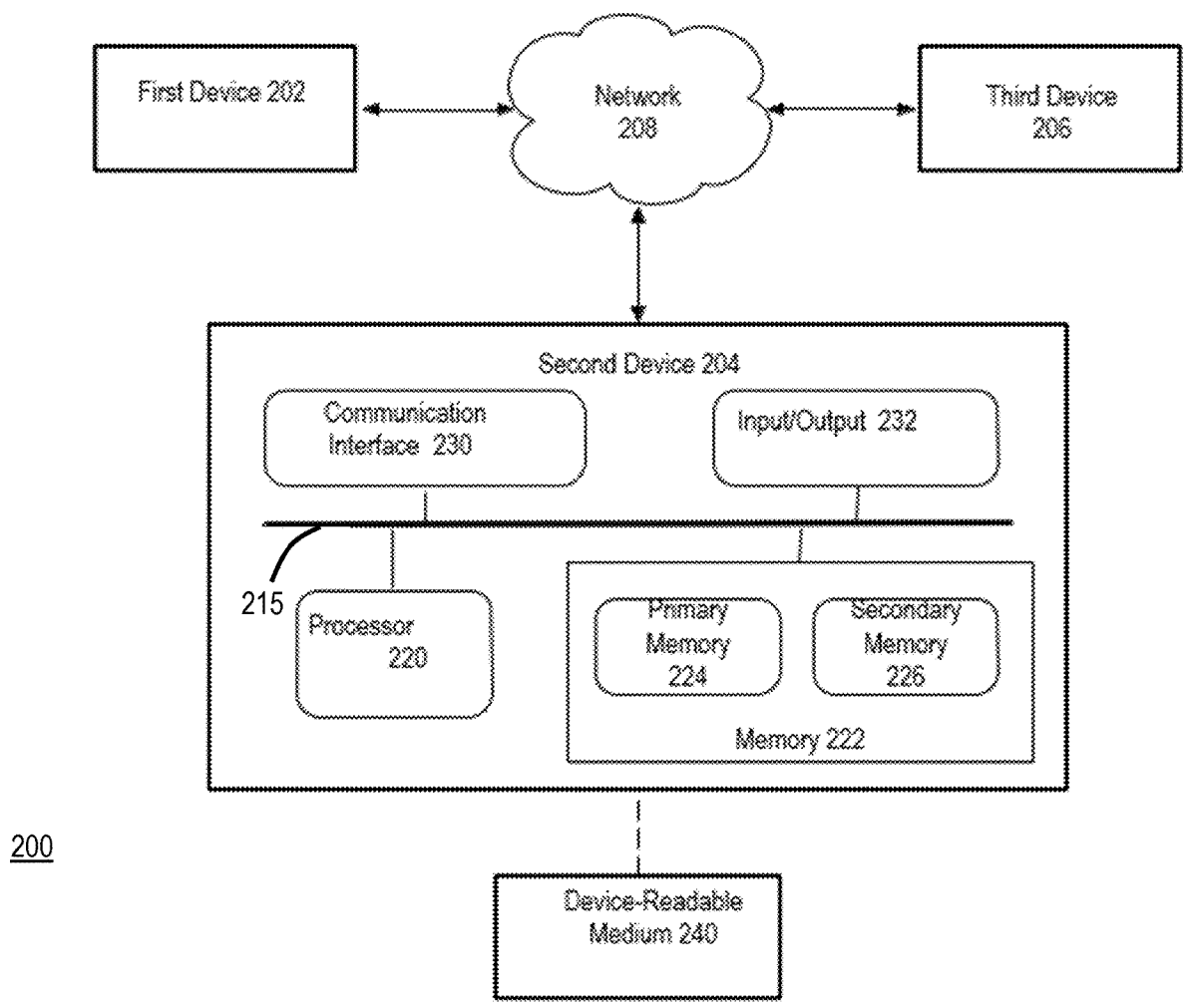
FIG. 6 is a schematic diagram of an illustrative embodiment of a client-server environment, such as may be employed to implement an embodiment of claimed subject matter.

In one example embodiment, as shown in FIG. 6, a system embodiment may comprise a local network (e.g., device 204 and medium 240) and/or another type of network, such as a computing and/or communications network. For purposes of illustration, therefore, FIG. 6 shows an embodiment 200 of a system that may be employed to implement either type or both types of networks. Network 208 may comprise one or more network connections, links, processes, services, applications, and/or resources to facilitate and/or support communications, such as an exchange of communication signals, for example, between a computing device, such as 202, and another computing device, such as 206, which may, for example, comprise one or more client computing devices and/or one or more server computing device. By way of example, but not limitation, network 208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1, 3 and 4, and in the text associated with the foregoing FIG.(s) of the present patent application.

Referring now to FIG. 6, in an embodiment, first and third devices 202 and 206 may be capable of rendering a graphical user interface (GUI) for a network device and/or a computing device, for example, so that a user-operator may engage in system use. Device 204 may potentially serve a similar function in this illustration. Likewise, in FIG. 6, computing device 202 ('first device' in FIG.) may interface with computing device 204 ('second device' in FIG.), which may, for example, also comprise features of a client computing device and/or a server computing device, in an embodiment. Processor (e.g., processing device) 220 and memory 222, which may comprise primary memory 224 and secondary memory 226, may communicate by way of a communication bus 215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 204, as depicted in FIG. 6, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, Linkedin, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 6, computing device 202 may provide one or more sources of executable computer instructions in the form physical states and/or signals (e.g., stored in memory states), for example. Computing device 202 may communicate with computing device 204 by way of a network connection, such as via network 208, for example. As previously mentioned, a connection, while physical, may not necessarily be tangible. Although computing device 204 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 222 may comprise any non-transitory storage mechanism. Memory 222 may comprise, for example, primary memory 224 and secondary memory 226, additional memory circuits, mechanisms, or combinations thereof may be used. Memory 222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 222 may be utilized to store a program of executable computer instructions. For example, processor 220 may fetch executable instructions from memory and proceed to execute the fetched instructions. Memory 222 may also comprise a memory controller for accessing device readable-medium 240 that may carry and/or make accessible digital content, which may include code, and/or instructions, for example, executable by processor 220 and/or some other device, such as a controller, as one example, capable of executing computer instructions, for example. Under direction of processor 220, a non-transitory memory, such as memory cells storing physical states (e.g., memory states), comprising, for example, a program of executable computer instructions, may be executed by processor 220 and able to generate signals to be communicated via a network, for example, as previously described. Generated signals may also be stored in memory, also previously suggested.

Memory 222 may store electronic files and/or electronic documents, such as relating to one or more users, and may also comprise a computer-readable medium that may carry and/or make accessible content, including code and/or instructions, for example, executable by processor 220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 6, processor 220 may comprise one or more circuits, such as digital circuits, to perform at least a portion of a computing procedure and/or process. By way of example, but not limitation, processor 220 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 204 as including a component 232 operable with input/output devices, for example, so that signals and/or states may be appropriately communicated between devices, such as device 204 and an input device and/or device 204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

§ 2.0 Example Cloud-Based System Architecture

Figure 11:
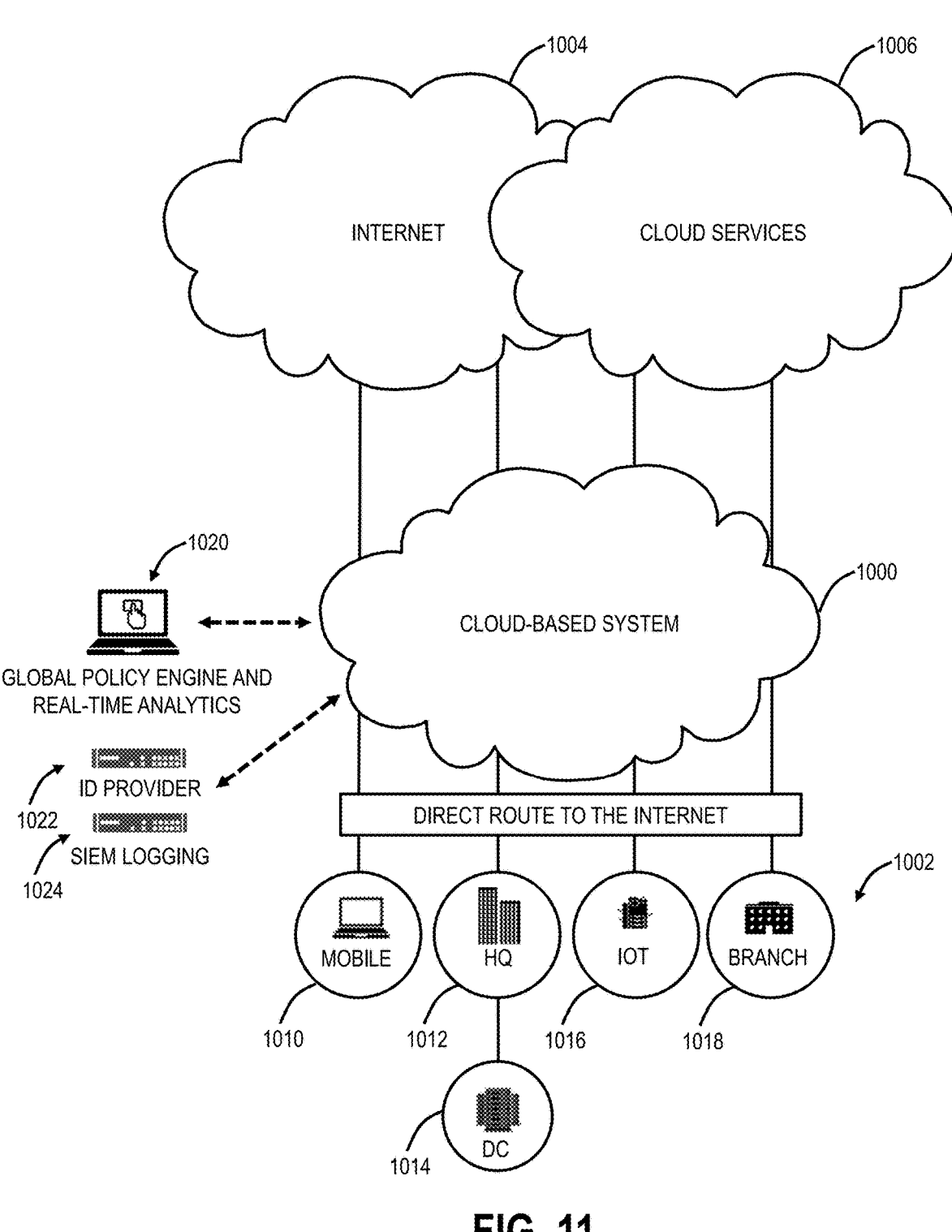
FIG. 11 is a network diagram of a cloud-based system offering security as a service.

FIG. 11 is a network diagram of a cloud-based system 1000 offering security as a service. Specifically, the cloud-based system 1000 can offer a Secure Internet and Web Gateway as a service to various users 1002, as well as other cloud services. In this manner, the cloud-based system 1000 is located between the users 1002 and the Internet as well as any cloud services 106 (or applications) accessed by the users 1002. As such, the cloud-based system 1000 provides inline monitoring inspecting traffic between the users 1002, the Internet 1004, and the cloud services 1006, including Secure Sockets Layer (SSL) traffic. The cloud-based system 1000 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. Threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 1000 is multi-tenant and can service a large volume of the users 1002. As such, newly discovered threats can be promulgated throughout the cloud-based system 1000 for all tenants practically instantaneously. The antivirus protection can include antivirus, antispyware, anti-malware, etc. protection for the users 1002, using signatures sourced and constantly updated. The DNS security can identify and route command-and-control connections to threat detection engines for full content inspection.

The DLP can use standard and/or custom dictionaries to continuously monitor the users 1002, including compressed and/or SSL-encrypted traffic. Again, being in a cloud implementation, the cloud-based system 1000 can scale this monitoring with near-zero latency on the users 1002. The cloud application security can include CASB functionality to discover and control user access to known and unknown cloud services 106. The file type controls enable true file type control by the user, location, destination, etc. to determine which files are allowed or not.

The cloud-based system 1000 can provide other security functions, including, for example, micro-segmentation, workload segmentation, API security, Cloud Security Posture Management (CSPM), user identity management, and the like. That is, the cloud-based system 1000 provides a network architecture that enables delivery of any cloud-based security service, including emerging frameworks.

For illustration purposes, the users 1002 of the cloud-based system 1000 can include a mobile device 1010, a headquarters (HQ) 1012 which can include or connect to a data center (DC) 1014, Internet of Things (IoT) devices 1016, a branch office/remote location 1018, etc., and each includes one or more user devices. The devices 1010, 1016, and the locations 1012, 1014, 1018 are shown for illustrative purposes, and those skilled in the art will recognize there are various access scenarios and other users 1002 for the cloud-based system 1000, all of which are contemplated herein. The users 1002 can be associated with a tenant, which may include an enterprise, a corporation, an organization, etc. That is, a tenant is a group of users who share a common access with specific privileges to the cloud-based system 1000, a cloud service, etc. In an embodiment, the headquarters 1012 can include an enterprise's network with resources in the data center 1014. The mobile device 1010 can be a so-called road warrior, i.e., users that are off-site, on-the-road, etc. Those skilled in the art will recognize a user 1002 has to use a corresponding user device for accessing the cloud-based system 1000 and the like, and the description herein may use the user 1002 and/or the user device interchangeably.

Further, the cloud-based system 1000 can be multi-tenant, with each tenant having its own users 1002 and configuration, policy, rules, etc. One advantage of the multi-tenancy and a large volume of users is the zero-day/zero-hour protection in that a new vulnerability can be detected and then instantly remediated across the entire cloud-based system 1000. The same applies to policy, rule, configuration, etc. changes—they are instantly remediated across the entire cloud-based system 1000. As well, new features in the cloud-based system 1000 can also be rolled up simultaneously across the user base, as opposed to selective and time-consuming upgrades on every device at the locations 1012, 1014, 1018, and the devices 1010, 1016.

Logically, the cloud-based system 1000 can be viewed as an overlay network between users (at the locations 1012, 1014, 1018, and the devices 1010, 1016) and the Internet 1004 and the cloud services 1006. Previously, the IT deployment model included enterprise resources and applications stored within the data center 1014 (i.e., physical devices) behind a firewall (perimeter), accessible by employees, partners, contractors, etc. on-site or remote via Virtual Private Networks (VPNs), etc. The cloud-based system 1000 is replacing the conventional deployment model. The cloud-based system 1000 can be used to implement these services in the cloud without requiring the physical devices and management thereof by enterprise IT administrators. As an ever-present overlay network, the cloud-based system 1000 can provide the same functions as the physical devices and/or appliances regardless of geography or location of the users 1002, as well as independent of platform, operating system, network access technique, network access provider, etc.

There are various techniques to forward traffic between the users 1002 at the locations 1012, 1014, 1018, and via the devices 1010, 1016, and the cloud-based system 1000. Typically, the locations 1012, 1014, 1018 can use tunneling where all traffic is forward through the cloud-based system 1000. For example, various tunneling protocols are contemplated, such as GRE, L2TP, IPsec, customized tunneling protocols, etc. The devices 1010, 1016, when not at one of the locations 1012, 1014, 1018 can use a local application that forwards traffic, a proxy such as via a Proxy Auto-Config (PAC) file, and the like. An application of the local application is an application 1350 described in detail herein as a connector application. A key aspect of the cloud-based system 1000 is all traffic between the users 1002 and the Internet 1004 or the cloud services 1006 is via the cloud-based system 1000. As such, the cloud-based system 1000 has visibility to enable various functions, all of which are performed off the user device in the cloud.

The cloud-based system 1000 can also include a management system 1020 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 1000 can further include connectivity to an Identity Provider (IDP) 1022 for authentication of the users 1002 and to a Security Information and Event Management (SIEM) system 1024 for event logging. The system 1024 can provide alert and activity logs on a per-user 1002 basis.

Figure 12:
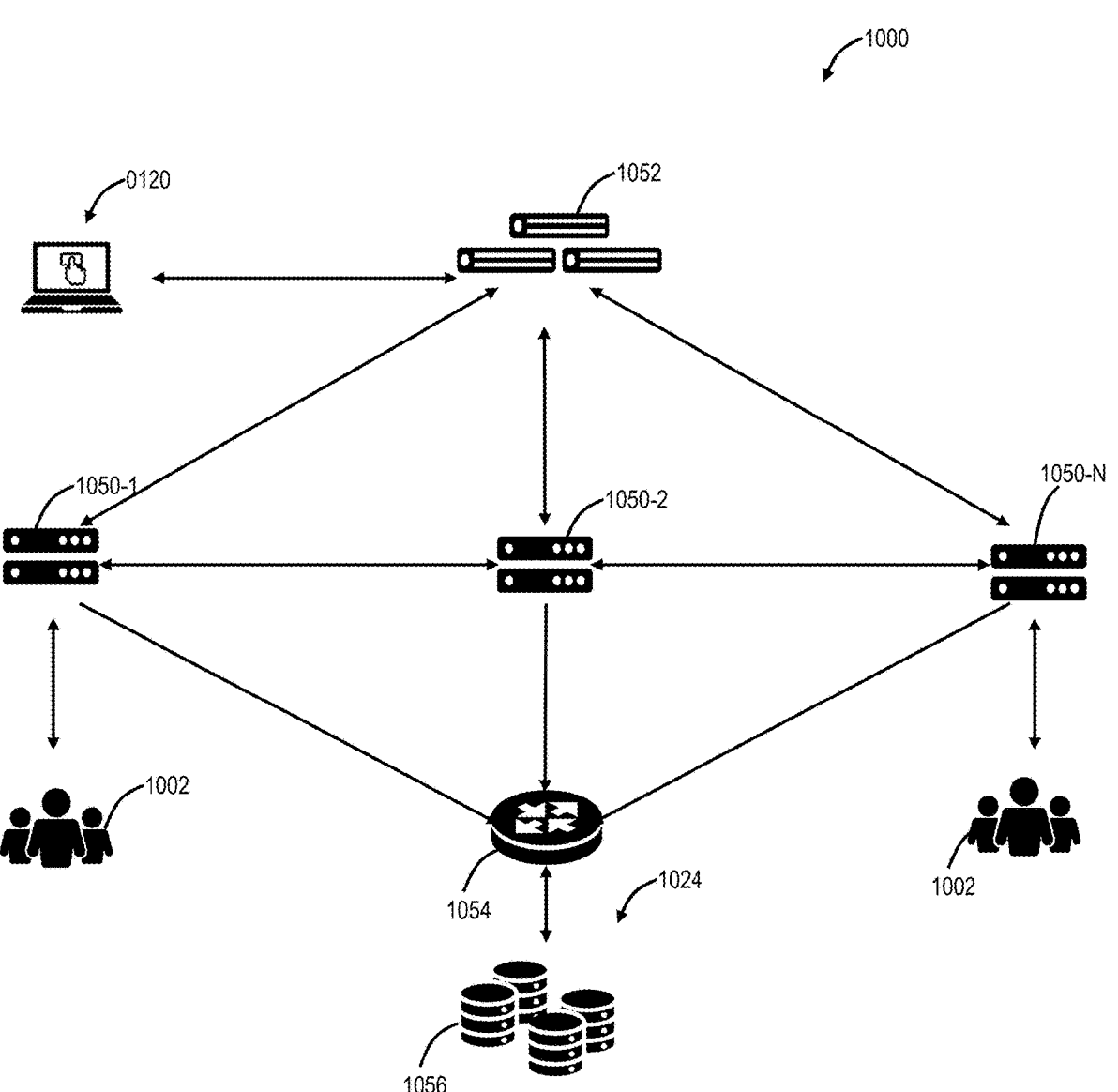
FIG. 12 is a network diagram of an example implementation of the cloud-based system.

FIG. 12 is a network diagram of an example implementation of the cloud-based system 1000. In an embodiment, the cloud-based system 1000 includes a plurality of enforcement nodes (EN) 1050, labeled as enforcement nodes 1050-1, 1050-2, 1050-N, interconnected to one another and interconnected to a central authority (CA) 1052. Note, the nodes 1050 are called "enforcement" nodes 1050 but they can be simply referred to as nodes 1050 in the cloud-based system 1000. Also, the nodes 1050 can be referred to as service edges. The nodes 1050 and the central authority 1052, while described as nodes, can include one or more servers, including physical servers, virtual machines (VM) executed on physical hardware, etc. The cloud-based system 1000 further includes a log router 1054 that connects to a storage cluster 1056 for supporting log maintenance from the enforcement nodes 1050. The central authority 1052 provide centralized policy, real-time threat updates, etc. and coordinates the distribution of this data between the enforcement nodes 1050. The enforcement nodes 1050 provide an onramp to the users 1002 and are configured to execute policy, based on the central authority 1052, for each user 1002. The enforcement nodes 1050 can be geographically distributed, and the policy for each user 1002 follows that user 1002 as he or she connects to the nearest (or other criteria) enforcement node 1050. Of note, the cloud-based system is an external system meaning it is separate from the tenant's private networks (enterprise networks) as well as from networks associated with the devices 1010, 1016, and locations 1012, 1018.

The enforcement nodes 1050 are full-featured secure internet gateways that provide integrated internet security. They inspect all web traffic bi-directionally for malware and enforce security, compliance, and firewall policies, as described herein, as well as various additional functionality. In an embodiment, each enforcement node 1050 has two main modules for inspecting traffic and applying policies: a web module and a firewall module. The enforcement nodes 1050 are deployed around the world and can handle hundreds of thousands of concurrent users with millions of concurrent sessions, or more. Because of this, regardless of where the users 1002 are, they can access the Internet 1004 from any device, and the enforcement nodes 1050 protect the traffic and apply corporate policies. The enforcement nodes 1050 can implement various inspection engines therein, and optionally, send sandboxing to another system. The enforcement nodes 1050 include significant fault tolerance capabilities, such as deployment in active-active mode to ensure availability and redundancy as well as continuous monitoring.

In an embodiment, customer traffic is not passed to any other component within the cloud-based system 1000, and the enforcement nodes 1050 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 1054 that direct the logs to the storage cluster 1056, hosted in the appropriate geographical region, for each organization. In an embodiment, all data destined for or received from the Internet is processed through one of the enforcement nodes 1050. In another embodiment, specific data specified by each tenant, e.g., only email, only executable files, etc., is processed through one of the enforcement nodes 150.

Each of the enforcement nodes 1050 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 1050 may allow the distribution of the content item, preclude distribution of the content item, allow distribution of the content item after a cleaning process, or perform threat detection on the content item. In an embodiment, the actions taken by one of the enforcement nodes 1050 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 1050, any one of the data inspection engines generates an output that results in a classification of "violating."

The central authority 1052 hosts all customer (tenant) policy and configuration settings. It monitors the cloud and provides a central location for software and database updates and threat intelligence. Given the multi-tenant architecture, the central authority 1052 is redundant and backed up in multiple different data centers. The enforcement nodes 1050 establish persistent connections to the central authority 1052 to download all policy configurations. When a new user connects to an enforcement node 1050, a policy request is sent to the central authority 1052 through this connection. The central authority 1052 then calculates the policies that apply to that user 1002 and sends the policy to the enforcement node 1050 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 1020. The policy can be tenant-specific and can include access privileges for users, websites and/or content that is disallowed, restricted domains, DLP dictionaries, etc. When this happens, all of the cached policies are purged, and the enforcement nodes 1050 request the new policy when the user 1002 next makes a request. In an embodiment, the enforcement nodes 1050 exchange "heartbeats" periodically, so all enforcement nodes 1050 are informed when there is a policy change. Any enforcement node 1050 can then pull the change in policy when it sees a new request.

The cloud-based system 1000 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 1000 is illustrated herein as an example embodiment of a cloud-based system, and other implementations are also contemplated.

As described herein, the terms cloud services and cloud applications may be used interchangeably. The cloud service 1006 is any service made available to users on-demand via the Internet, as opposed to being provided from a company's on-premises servers. A cloud application, or cloud app, is a software program where cloud-based and local components work together. The cloud-based system 1000 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 1000, including ones with different architectures and multiple cloud services. The ZIA service can provide the access control, threat prevention, and data protection described above with reference to the cloud-based system 1000. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 1006 are also contemplated. Also, other types of cloud architectures are also contemplated, with the cloud-based system 1000 presented for illustration purposes.

§ 2.1 Private Nodes Hosted by Tenants or Service Providers

The nodes 1050 that service multi-tenant users 1002 may be located in data centers. These nodes 1050 can be referred to as public nodes 1050 or public service edges. In embodiment, the nodes 1050 can be located on-premises with tenants (enterprise) as well as service providers. These nodes can be referred to as private nodes 1050 or private service edges. In operation, these private nodes 1050 can perform the same functions as the public nodes 1050, can communicate with the central authority 1052, and the like. In fact, the private nodes 150 can be considered in the same cloud-based system 1000 as the public nodes 1050, except located on-premises. When a private node 1050 is located in an enterprise network, the private node 1050 can have a single tenant corresponding to the enterprise; of course, the cloud-based system 1000 is still multi-tenant, but these particular nodes are serving only a single tenant. When a private node 1050 is located in a service provider's network, the private node 1050 can be multi-tenant for customers of the service provider. Those skilled in the art will recognize various architectural approaches are contemplated. The cloud-based system 1000 is a logical construct providing a security service.

§ 3.0 User Device Application for Traffic Forwarding and Monitoring

Figure 13:
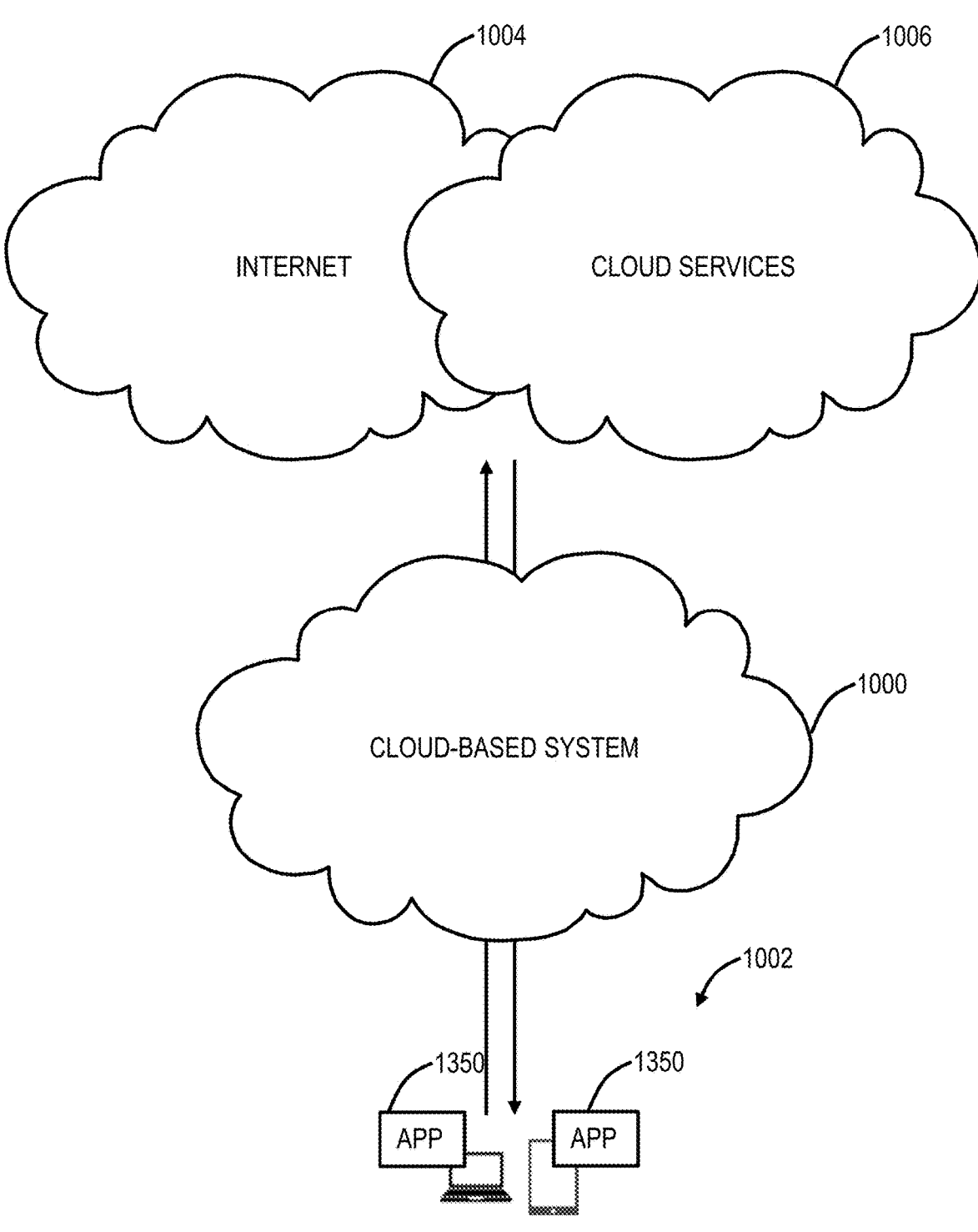
FIG. 13 is a network diagram of the cloud-based system illustrating an application on user devices with users configured to operate through the cloud-based system.

FIG. 13 is a network diagram of the cloud-based system 1000 illustrating an application 1350 on user devices with users 1002 configured to operate through the cloud-based system 1000. Different types of user devices are proliferating, including Bring Your Own Device (BYOD) as well as IT-managed devices. The conventional approach for a user device to operate with the cloud-based system 1000 as well as for accessing enterprise resources includes complex policies, VPNs, poor user experience, etc. The application 1350 can automatically forward user traffic with the cloud-based system 1000 as well as ensuring that security and access policies are enforced, regardless of device, location, operating system, or application. The application 350 automatically determines if a user 1002 is looking to access the open Internet 1004, a SaaS app, or an internal app running in public, private, or the datacenter and routes mobile traffic through the cloud-based system 1000. The application 1350 can support various cloud services, including ZIA, ZPA, ZDX, etc., allowing the best-in-class security with zero trust access to internal apps. As described herein, the application 1350 can also be referred to as a connector application.

The application 1350 is configured to auto-route traffic for seamless user experience. This can be protocol as well as application-specific, and the application 1350 can route traffic with a nearest or best fit enforcement node 1050. Further, the application 1350 can detect trusted networks, allowed applications, etc. and support secure network access. The application 1350 can also support the enrollment of the user device prior to accessing applications. The application 1350 can uniquely detect the users 1002 based on fingerprinting the user device, using criteria like device model, platform, operating system, etc. The application 1350 can support Mobile Device Management (MDM) functions, allowing IT personnel to deploy and manage the user devices seamlessly. This can also include the automatic installation of client and SSL certificates during enrollment. Finally, the application 1350 provides visibility into device and app usage of the user 1002 of the user device.

The application 1350 supports a secure, lightweight tunnel between the user device and the cloud-based system 1000. For example, the lightweight tunnel can be HTTP-based. With the application 1350, there is no requirement for PAC files, an IPsec VPN, authentication cookies, or user 1002 setup.

§ 4.0 Zero Trust Network Access Using the Cloud-Based System

Figure 14:
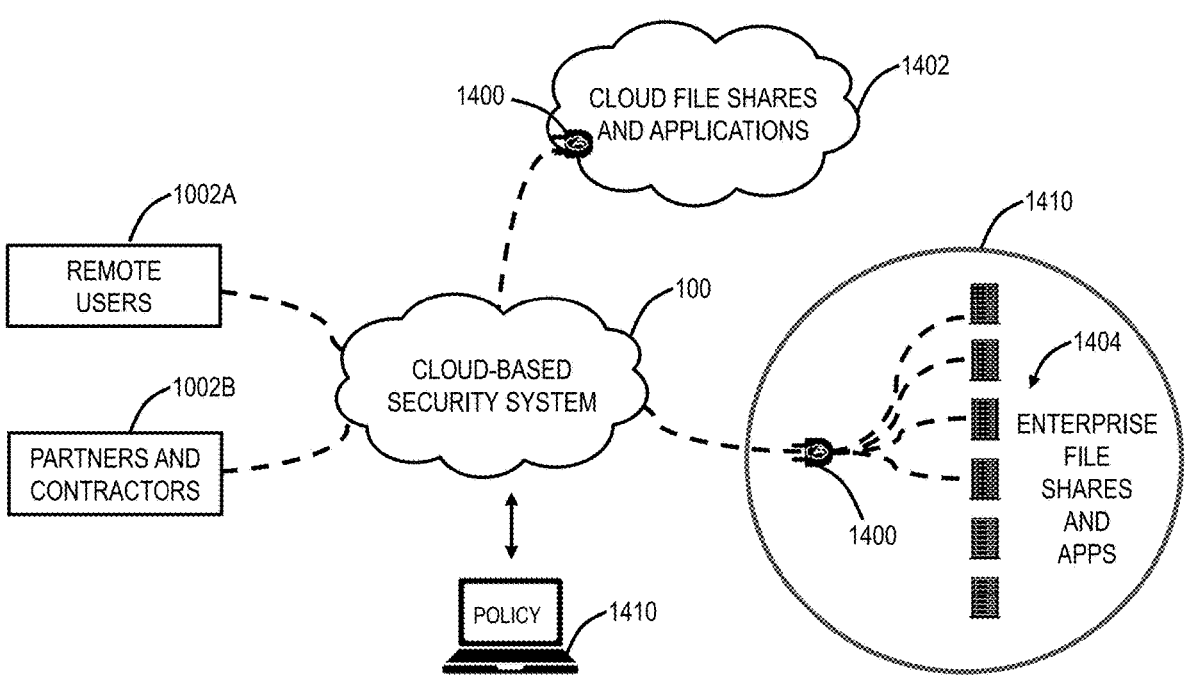
FIG. 14 is a network diagram of a Zero Trust Network Access (ZTNA) application utilizing the cloud-based system of FIGS. 11 and 12.

FIG. 14 is a network diagram of a Zero Trust Network Access (ZTNA) application utilizing the cloud-based system 1000. For ZTNA, the cloud-based system 1000 can dynamically create a connection through a secure tunnel between an endpoint (e.g., users 1002A, 1002B) that are remote and an on-premises connector 1400 that is either located in cloud file shares and applications 1402 and/or in an enterprise network 1410 that includes enterprise file shares and applications 1404. The connection between the cloud-based system 1000 and on-premises connector 1400 is dynamic, on-demand, and orchestrated by the cloud-based system 1000. A key feature is its security at the edge—there is no need to punch any holes in the existing on-premises firewall. The connector 1400 inside the enterprise (on-premises) "dials out" and connects to the cloud-based system 1000 as if too were an endpoint. This on-demand dial-out capability and tunneling authenticated traffic back to the enterprise is a key differentiator for ZTNA. Also, this functionality can be implemented in part by the application 1350 on the user device. Also, the applications 1402, 1404 can include B2B applications. Note, the difference between the applications 1402, 1404 is the applications 1402 are hosted in the cloud, whereas the applications 1404 are hosted on the enterprise network 1410. The B2B service described herein contemplates use with either or both of the applications 1402, 1404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 1402, 1404 from the network, instead of providing access with a connector 1400, in front of the applications 1402, 1404, an application on the user device, a central authority 1052 to push policy, and the cloud-based system 1000 to stitch the applications 1402, 1404 and the software connectors 1400 together, on a per-user, per-application basis.

With the virtual private access, users can only see the specific applications 1402, 1404 allowed by the central authority 1052. Everything else is "invisible" or "dark" to them. Because the virtual private access separates the application from the network, the physical location of the application 1402, 1404 becomes irrelevant—if applications 1402, 1404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 5.0 Auto-Labeling

Section § 1.0 described herein involves grouping or categorizing of network devices based at least in part on some measure of similarity. Sections § 2.0-4.0 describe a cloud-based system and services.

As more and more devices are added, the measure of similarity is useful to group or cluster the same or similar devices. However, there is a need for a meaningful label for each device. The present disclosure utilizes unsupervised learning techniques to derive meaningful data as to the identity of particular network devices. Network traffic flow detail is very good for deriving similarity. For auto-labeling, the present disclosure includes parsing part of the network traffic for anything that looks like meaningful words and filtering out other data. For example, the goal is to find human readable words, e.g., refrigerator, Whirlpool, etc.

In particular, the parsing includes looking for any meaningful words or information from MAC addresses, hostnames, network information (IP address, DNS, etc), etc. The meaningful words can be included in the network traffic, e.g., hostnames, etc., as well as looked up from the network information, e.g., DNS records, etc. The meaningful words can also include model numbers that are recognized from a database of model numbers as well as a pattern of a model number which can be used in a custom search of a search engine or database to validate that it is a relevant model number and to retrieve additional relevant information. This is important for IOT, OT, etc., as well as for electronic devices, computing devices, mobile phones, etc.

FIG. 15 is a flowchart of a process 1500 for auto-labeling of network devices based on monitoring their network communications. The process 1500 can be implemented as a method having steps, via a processing device having one or more processors and memory with instructions that cause the one or more processors to implement the steps, and as instruction stored on a non-transitory computer-readable medium for programming a processing device to perform the steps.

The process 1500 include receiving data associated with monitoring network communication traffic (step 1502). The monitoring can use any of the techniques described herein. The data includes human understandable words, vendor names, model numbers, and the like. Also, in an embodiment, the monitoring step and receiving data step can be combined and performed by a single entity, such as one of the nodes 1050 in the cloud-based system 1000. The data can be obtained via signature detection, i.e., is this a meaningful word to a human, a vendor name, a model number, etc. Also, non-human understandable words of certain patterns can be translated into human readable words. One example is translating MAC addresses into MAC vendor names. Also, of note, IOT devices are typically static, i.e., do not move, and, as such, the MAC addresses of IOT devices are typically not scrambled or randomized.

The process 1500 includes analyzing patterns and frequency of words in the data for various network devices (step 1504), analyzing where the words in the data originate from (step 1506), scoring the words for a given network device based on the patterns, frequency, relevance, and origination (step 1508), and assigning one or more words to a given network device based on the scoring (step 1510), i.e., "auto-labeling." Here, the steps 1504, 1506 provide the ability to extract words from data associated with a given network device. The objective is to score the data to determine the most applicable words for a given network device based on the patterns, frequency, and origination, to assign one or more words to a given network device. For example, device X is a certain brand and model of thermostat. Of course, the possibilities are endless as the number of connected network devices continues to increase. Also, the relevance of the word can be based upon presence in one or more database of relevant words.

The patterns can include determining whether or not a given word is human-readable or not, such as using a Markov model scoring approach. Also, the patterns can be matched across multiple network devices, including network devices already grouped using the similarity measurements. For example, a given group of network devices all have the word thermostat in some data.

The frequency can look at the frequency of words in given data sets from network devices, including grouped network devices, such as using term frequency-inverse document frequency (TF-IDF).

The origination can look at where the words are located in the network traffic. For example, was the data obtained from the MAC address (e.g., OUI data), from a network address (e.g., DNS lookup), or from a user agent on the device? The source of the data can be scored. Data from a user agent is more likely indicative of the type of device, whereas other data may have less value.

Again, the process 1500 contemplates operation with the similarity measurements. In one embodiment, the process 1500 can operate on a single network device to auto-label it. In another embodiment, the process 1500 can operate on grouped network devices where there is significantly more data to analyze and score.

There can also be feedback from users to validate results or identify errors to adjust this approach.

§ 5.1 Auto-Labeling Examples

Maintain a specific database of vendors, brands, product names, model numbers, etc. and look for these terms in the network traffic—e.g., Whirlpool. These terms are scored high based on the frequency of use.

A given word X is seen frequently in network traffic for a group of similar network devices (as determined by the similarity measurements) but is not seen in network traffic for other network devices. This is scored high as well. Examples of this would include specific vendors, brands, product names, model numbers, etc.

A given word X is associated with an address (e.g., MAC, IP, network address, web host, etc.). Again, examples of this can include specific vendors, brands, product names, model numbers, etc.

A given word is associated with a user agent executed on the network device.

Of course, any given implementation can use a combination of all of theses approaches, with a score used to ultimately determine the most relevant results.

§ 6.0 Two Data Sets—Network Communications and Auto-Labels

The present disclosure can include use of the two data sets described herein—i) network communications for similarity measurements and ii) auto-labels with meaningful human understandable words, for detecting and classifying network devices. Of note, these two data sets are from monitoring the same source, i.e., the network devices themselves and can use any of the aforementioned techniques for data monitoring, including the cloud-based system 1000. Also, of note, the similarity measurements can add words to the auto-label process and contribute to the scoring of the auto-label words.

The objective of the similarity measurements is to determine which network devices are the same, e.g., device X and Y are both a same type, brand, and/or model of device, e.g., a certain brand of thermostat. The objective of the auto-labels is to determine the devices X and Y are the certain brand of thermostat. As such, these two techniques can be used together in combination with one another with the similarity measurements used to group devices and the auto-labels used to name the grouped devices. Also, the similarity measurements require data sets from different devices to match grouped devices to one another whereas the auto-labels can operate on a data set from a single device.

FIG. 16 is a flowchart of a process 1550 for identifying network devices via similarity of operation and auto-labeling. The process 1550 can be implemented as a method having steps, via a processing device having one or more processors and memory with instructions that cause the one or more processors to implement the steps, and as instruction stored on a non-transitory computer-readable medium for programming a processing device to perform the steps. In an embodiment, the process 1550 can be implemented by one of the nodes 1050.

The process 1550 includes receiving data associated with monitoring network communication traffic associated with a plurality of network devices (step 1552); analyzing network communication flows of the plurality of network devices to group similar network devices together (step 1554); analyzing patterns, frequency, relevance and origination of words in the network communication traffic to auto-label the plurality of network devices (step 1556); and assigning one or more words to any of a given network device and a group of similar network devices (step 1558). For example, relevance can include boosting words that are likely to describe an Internet connected device. Words like "refrigerator" and "whirlpool" are boosted more than "dog" and "the".

The monitoring can be via a cloud-based system having a plurality of nodes, and wherein the one or more processors are in one of the plurality of nodes. The words can include any of vendor names, brand names, product names, and model numbers. The analyzing of the patterns, frequency, and origination of words can be performed on network communication traffic associated with a group of similar devices.

The assigning can be based on a score for a given word that is determined based on weights for the patterns, frequency, and the origination. The patterns can include words used together indicative of a network device. The frequency can utilize term frequency-inverse document frequency (TF-IDF). The origination can be based on where the words are from including any of user input, an agent, and network addresses including any of Internet Protocol (IP), Media Access Control (MAC), Domain Name System (DNS), Uniform Resource Locator (URL), a hostname, and a web host.

The weights can include higher weighting where a word is used for a particular group of similar devices at a higher frequency than for other groups of similar devices. The weights can include higher weighting where a word is from user input or an agent.

§ 7.0 Sparsely Populated Log Data

In operation, the cloud-based system 1000 as well as other devices, services, etc. can maintain statistics and logs. As described herein, this can be referred to as log data, and can reside in the log or database, as well as being streamed continuously. That is, the term log data can be either stored data or in-transit data. The log data represents activity by a user device in the cloud-based system 1000. As described herein, the term user device can be any processing device that connects to the Internet 1004 and/or cloud services 1006, via the cloud-based system 1000. Also, the user device can be associated with a user 1002, e.g., laptop, desktop, tablet, smart phone, etc., as well as a server or an IoT device.

As described herein, the cloud-based system 1000 can maintain the log data, with records used in a backend data store for queries. A record is a collection of tens of thousands of counters. A counter can be a tuple of an identifier (ID) and value. As described herein, a counter represents some monitored data associated with the cloud-based system 1000. Of note, the log data is referred to as sparsely populated, namely a large number of counters that are sparsely populated (e.g., tens of thousands of counters or more, and possible orders of magnitude or more of which are empty). For example, a record can be stored every time period (e.g., an hour or any other time interval) in the cloud-based system 1000. There can be millions of active users 1002 or more.

Examples of the sparsely populated log data can be the Nanolog system from Zscaler, Inc., the applicant. Also, descriptions of such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

§ 8.0 ML Model to Detect Device Type Using Sparsely Populated Log Data

The present disclosure includes training and deploying a machine learning model for using the sparsely populated log data to detect device type, namely whether a device is a user device or a non-user device. As described herein, a user device is one with an end user 1002, e.g., laptop, desktop, smartphone, tablet, etc. A non-user device can be an IoT device or a server, i.e., IoT devices and servers generally exhibit similar behavior. FIG. 17 are tables listing examples of user devices and non-user devices, with such examples being used to train the machine learning model.

§ 8.1 Training Dataset

Log data from network data monitored by the cloud-based system 1000 is collected and labeled, such as using the examples of user devices and non-user devices in FIG. 17. Again, the objective is to develop and train a machine learning model that can accurately predict whether a device is a user device, or a non-user device based on its behavior characteristics. More particularly, the model can be trained using historic network data collected by the cloud-based system 1000.

By leveraging techniques such as feature engineering, data preprocessing, and machine learning model selection, the accuracy and efficiency of the present systems and methods can be improved. That is, the model's ability to identify and differentiate between user device and non-user device traffic can be greatly improved.

§ 8.2 ML Features

The following are examples of ML Features/Signals used to predict the device type: User or Non-User (IoT/Server)

unq_processed_hostname: Unique processed hostnames count unq_selection_useragent: Unique user agents count unq_selection_protocolname: Unique protocol names count unq_selection_appclass: Unique application class count max_appclass_ratio: Maximum application class ratio top_url_is_sw: True if most frequent URL is a stop URL* else False top_url_ratio: Ratio of records for most frequent URL sw_ratio: Stop URL* record ratio appclass_user: User application class (True/False). True if there is an application class/application that mostly exists in user devices. Example user application classes: ["Social Networking", "Mobile App Download", "Webmail", "IM" etc.]. Example user applications: ["iCloud" "iCloud", "Yahoo Search", "Ask Search", "Live Search", "AOL Search", "Bing Search", "Yandex Search", "DuckDuckGo" etc.]

The unique processed hostnames count includes the number of unique hostnames visited by a device. In various embodiments, the several preprocessing steps are performed to enhance the identification of unique hostnames. Similarly, the systems can identify the number of unique user agents and the number of unique protocols used by the device in question. Additionally, the systems can identify the number of unique application classes visited/utilized by the device. The systems can generate such application class data by utilizing web log data collected by the cloud-based system. For example, a device may be visiting a plurality of hostnames and user agents, utilizing a plurality of protocols. By logging such device data, the systems can identify the number of unique hostnames, unique user agents, unique protocols, and unique application classes associated with the traffic originating from the device. These features are important because typically user devices visit a variety of hostnames, user agents, protocols and application classes when compared to the non-user devices (IoT/Servers).

Using the data generated as described above, the systems can further identify additional features. One feature includes the maximum application class ratio. The maximum application class ratio is determined by taking into account the application class most visited by the device, and identifying the ratio of this most visited application class with respect to other application classes visited by the device. Determining the application class ratio can be crucial when determining a device as being a user device or a non-user device. This is because typically IoT devices visit/utilize the same application class. That is, a non-user device may exhibit an application class ratio of 99%, indicating that the device largely visits the same application class. Alternatively, the application class ratio is typically lower for devices which are associated with an end user 1002. In various embodiments, a threshold value can be utilized for identifying devices based on the features. Referring to the feature of application class ratio, the systems can identify a device as a non-user device based on the application class ratio being above a threshold. In various embodiments, application classes and applications are generated while logging and they are specific to the cloud-based system 1000.

Further, the systems utilize additional features which include the idea and utilization of stop URLs. Stop URLs, as described in the present disclosure, are very common URLs which are visited by many user devices. These stop URLs can include, but are not limited to, www.google.com, www-.facebook.com, etc. That is, a stop URL is a URL that is known to be largely visited by devices associated with an end user 1002. These stop URLs can be identified and logged in the cloud-based system 1000 for the present systems to utilize when performing the identifying of a device.

Based on the various stop URLs, the present systems can determine if a top URL associated with a device is a stop URL. That is, the systems can determine the most visited URL from a device, and determine if this most frequently visited URL is a stop URL. In various embodiments, this determination can lead to the systems identifying a device as a user device. For example, if a device visits a stop URL more frequently than any other URL, the systems can assume that the device is a user device. This is contemplated as the top_url_is_sw feature listed above.

Another useful feature is generating the ratio of the most frequently visited URL with respect to all other URLs visited by the device, i.e., the top URL ratio. That is, from the logged device data, the systems are adapted to determine the ratio of visits to the most frequently visited URL to visits to all other URLs. This is an important feature as IoT devices typically only visit one URL or a small number of URLs while user devices typically visit a large number of URLs. Thus, a high top URL ratio can indicate that a device is a non-user device. Again, in various embodiments, a threshold value can be utilized for identifying devices based on the features. Referring to the feature of top URL ratio, the systems can identify a device as a non-user device based on the top URL ratio being above a threshold. Further, the systems can determine, out of all the visited URLs, how many of these URLs are stop URLs. Based thereon, the systems can determine the stop URL ratio. For stop URL ratio, a higher ratio value indicates that the device is most likely a user device. This is because user devices tend to visit stop URLs more frequently, while non-user devices do not typically visit stop URLs. The systems can identify a device as a non-user device based on the stop URL ratio being below a threshold.

Moreover, the systems can reference a list of user application classes that are application classes that are known to be associated with users. Based thereon, if the systems identify such an application class in a devices log data, the systems can assume that the device is a user device. This is because the application classes included in the user application class list are application classes that would not be visited by a non-user device such as an IoT device.

The various features described herein can be used to identify a device as a user device or a non-user device. This identification can be performed by a machine learning model, where the machine learning model is trained with historical network traffic data based on the described features. Further, the identifying of devices being one of a user device and a non-user device can be performed in real time based on real traffic traversing the cloud-based system 1000. That is, the identifying can be performed in response to receiving data associated with monitoring network communication traffic associated with a plurality of network devices.

Figure 18:
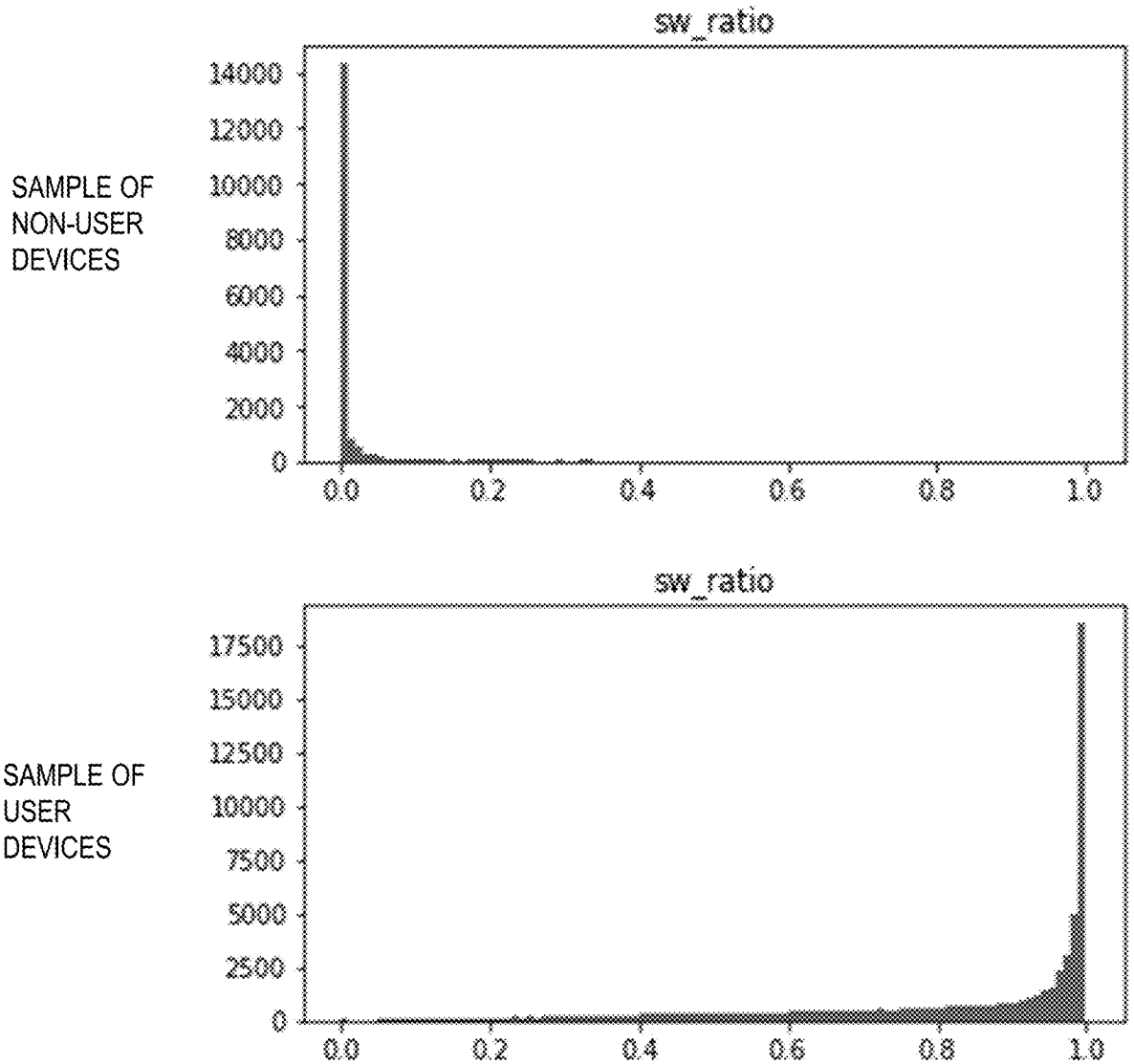
Figure 19:
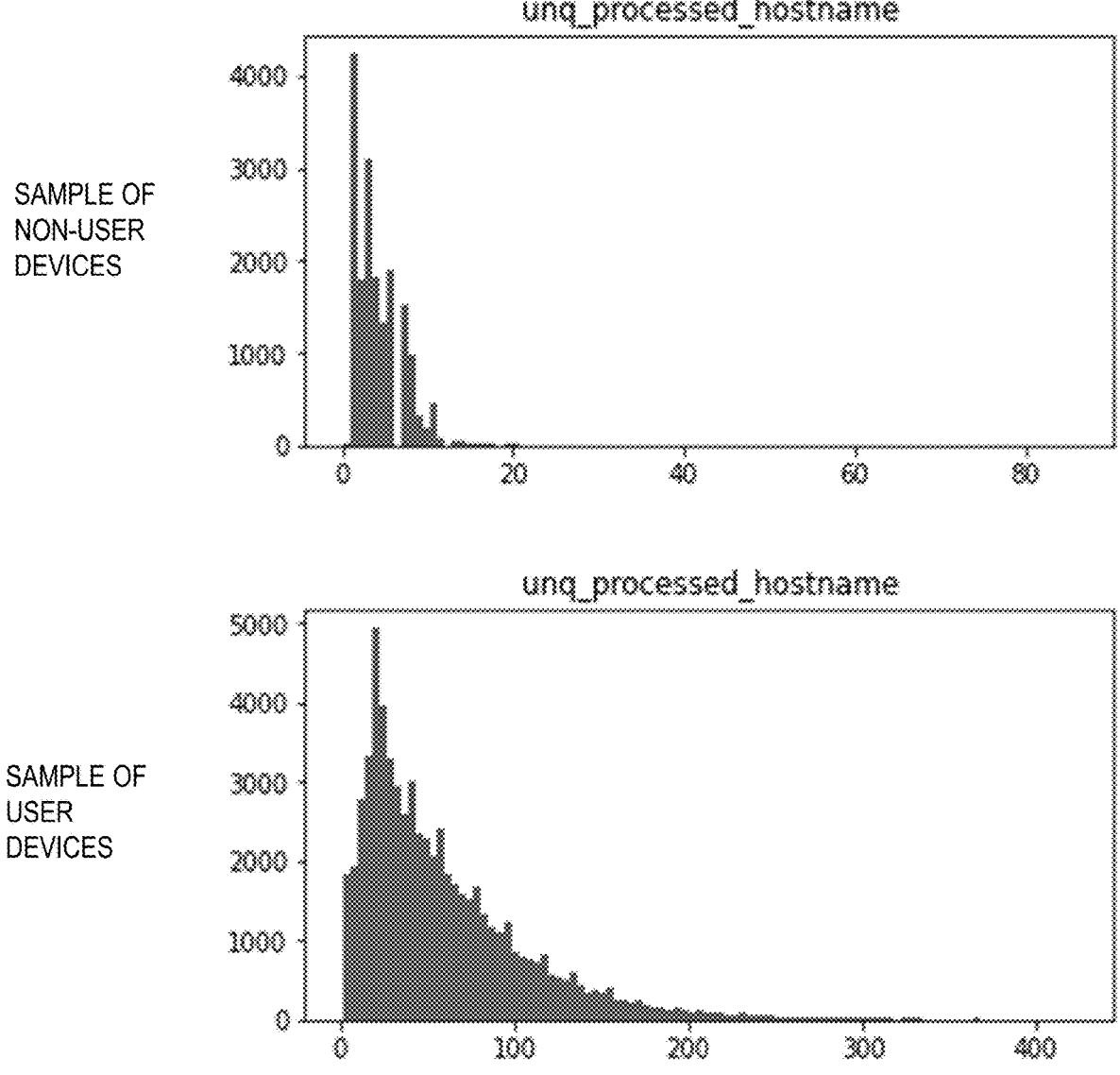
Figure 20:
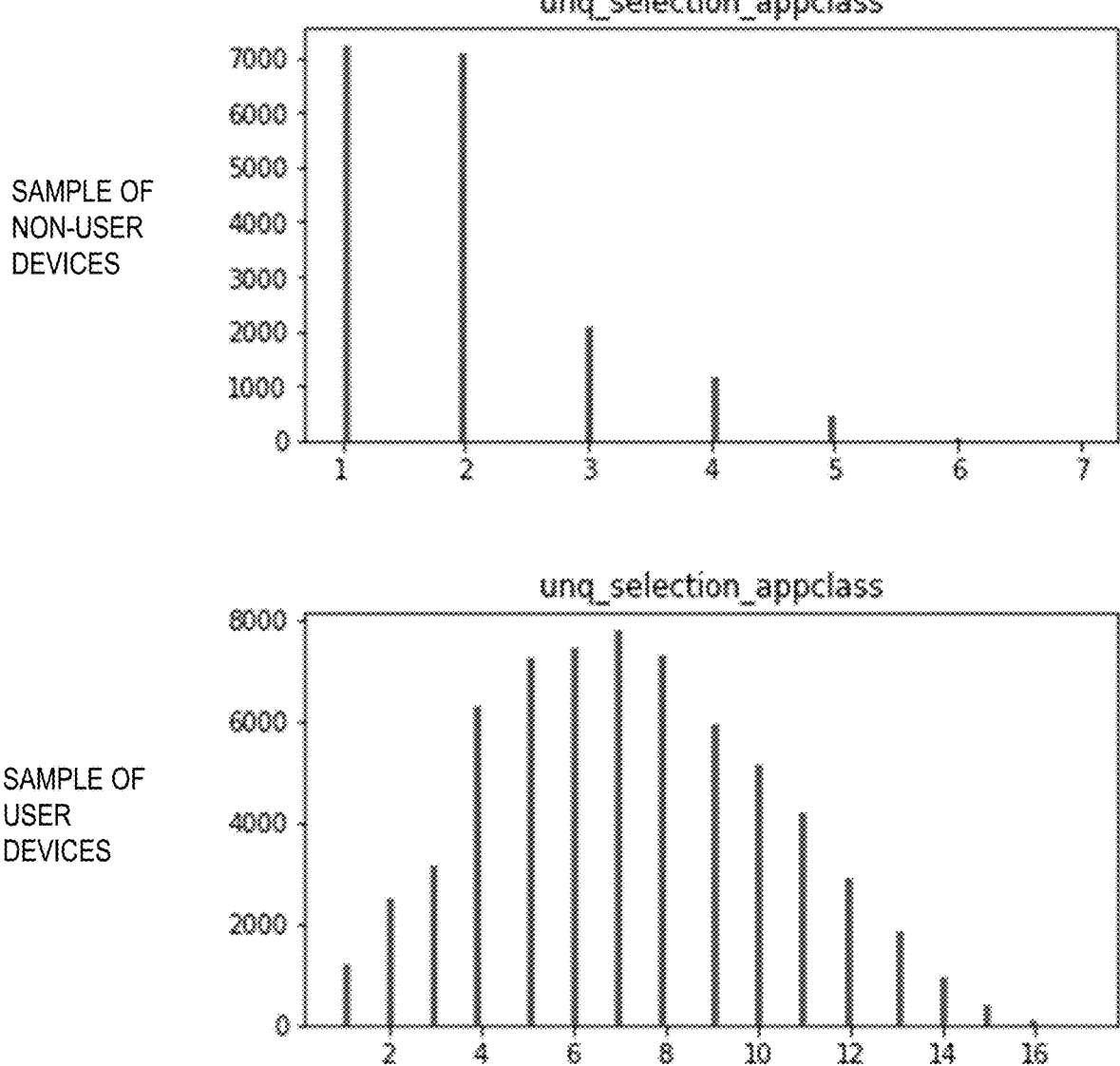
Figure 21:
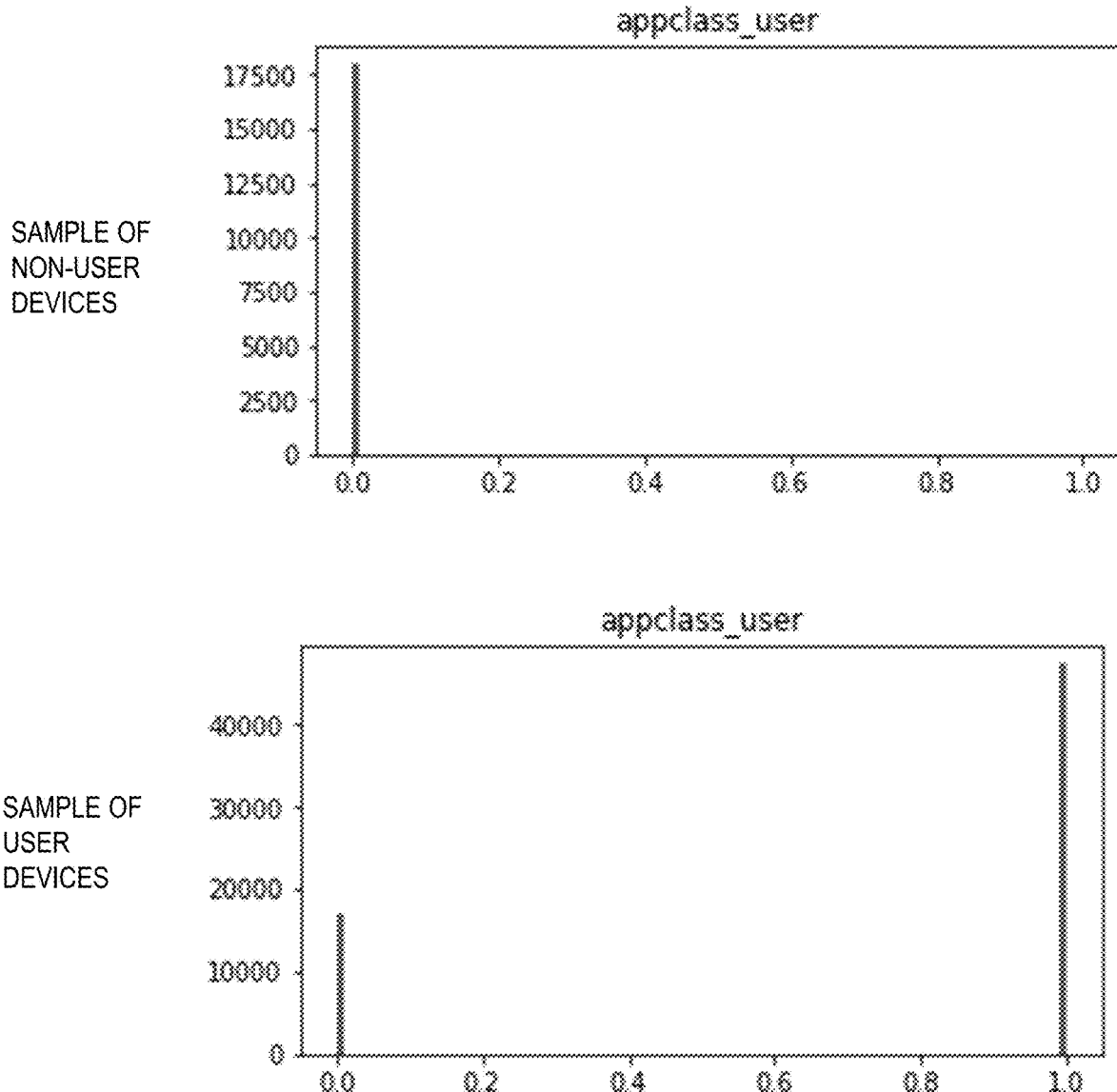
Figure 22:
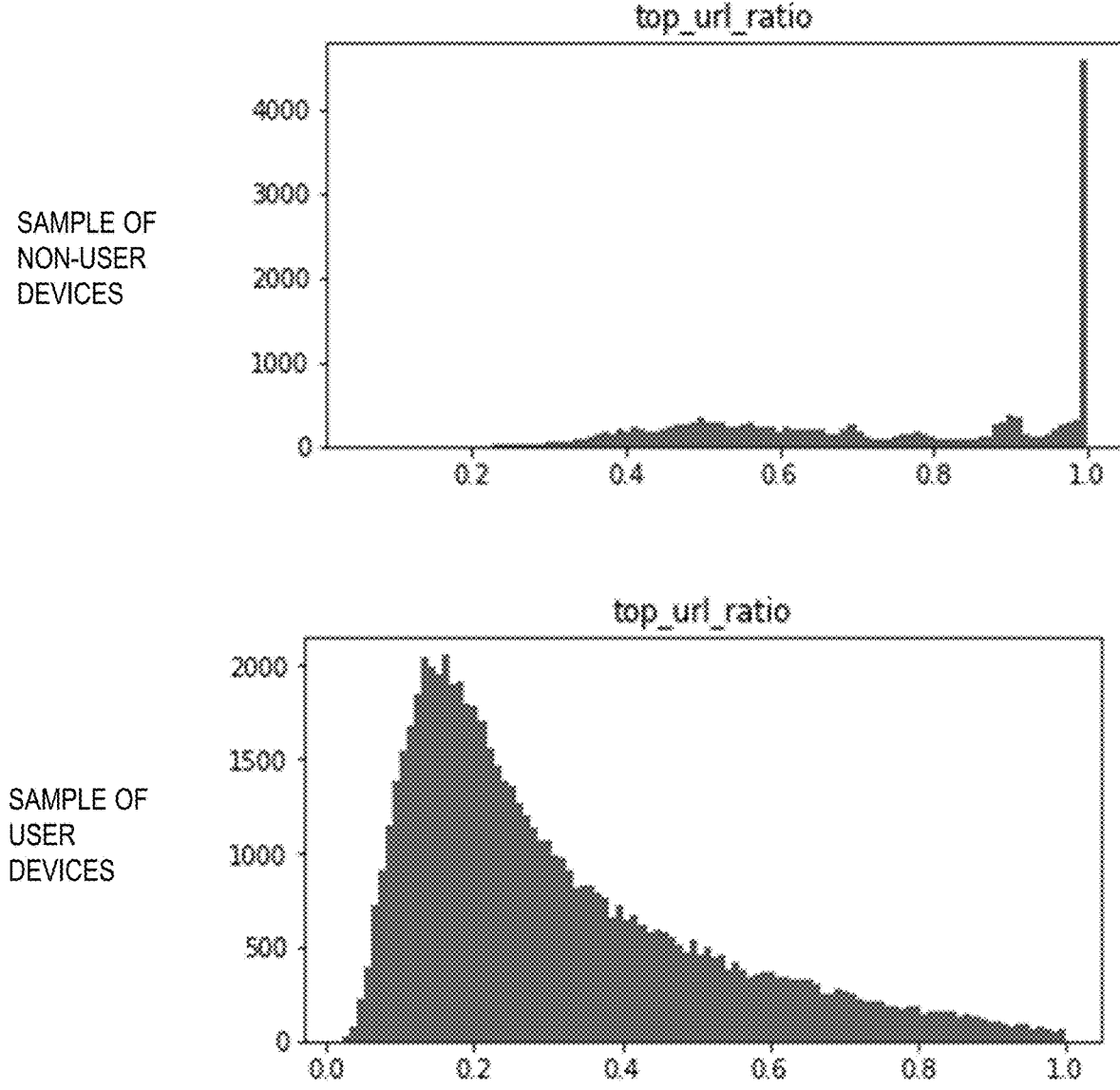
Figure 24:
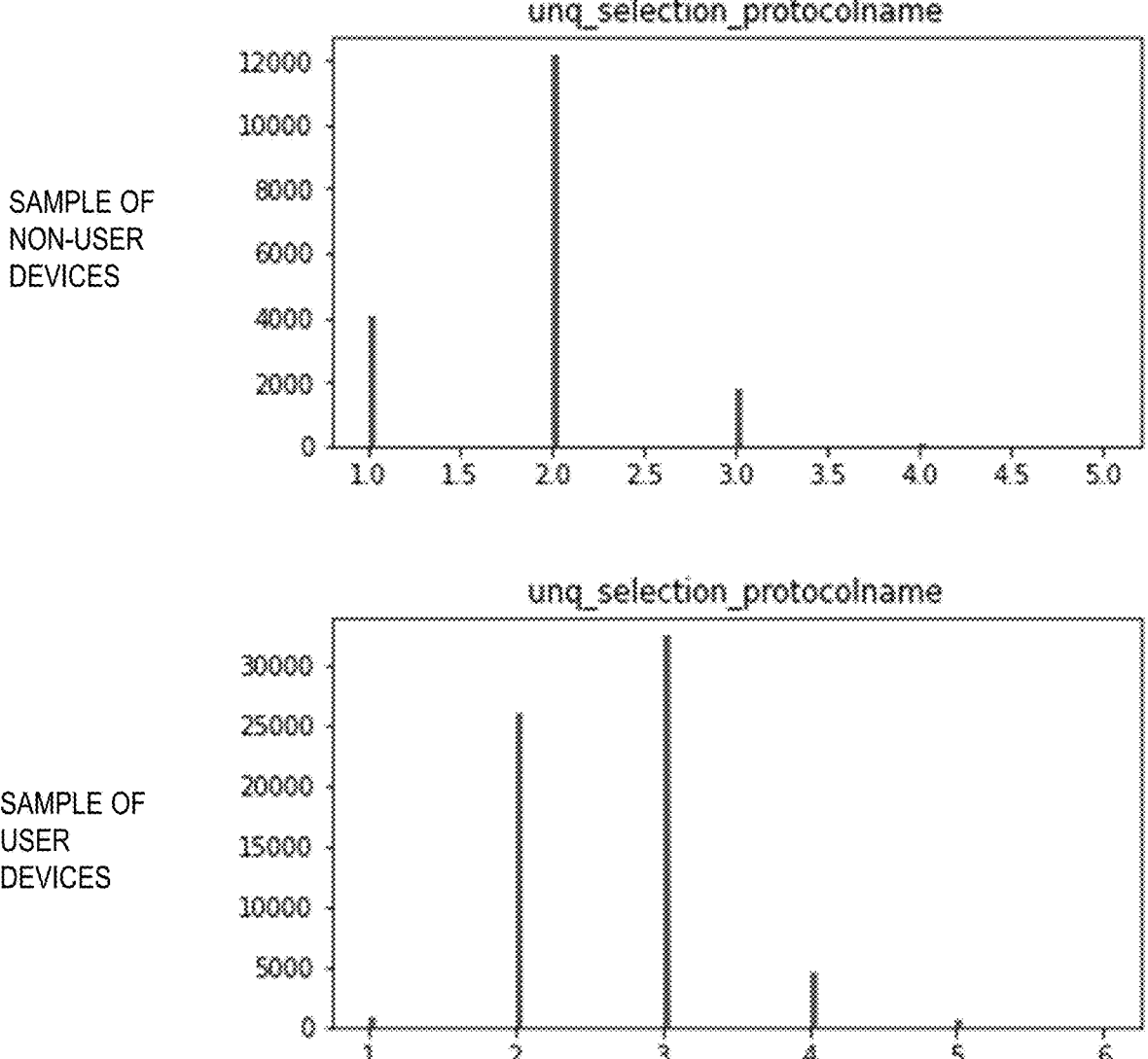
Figure 25:
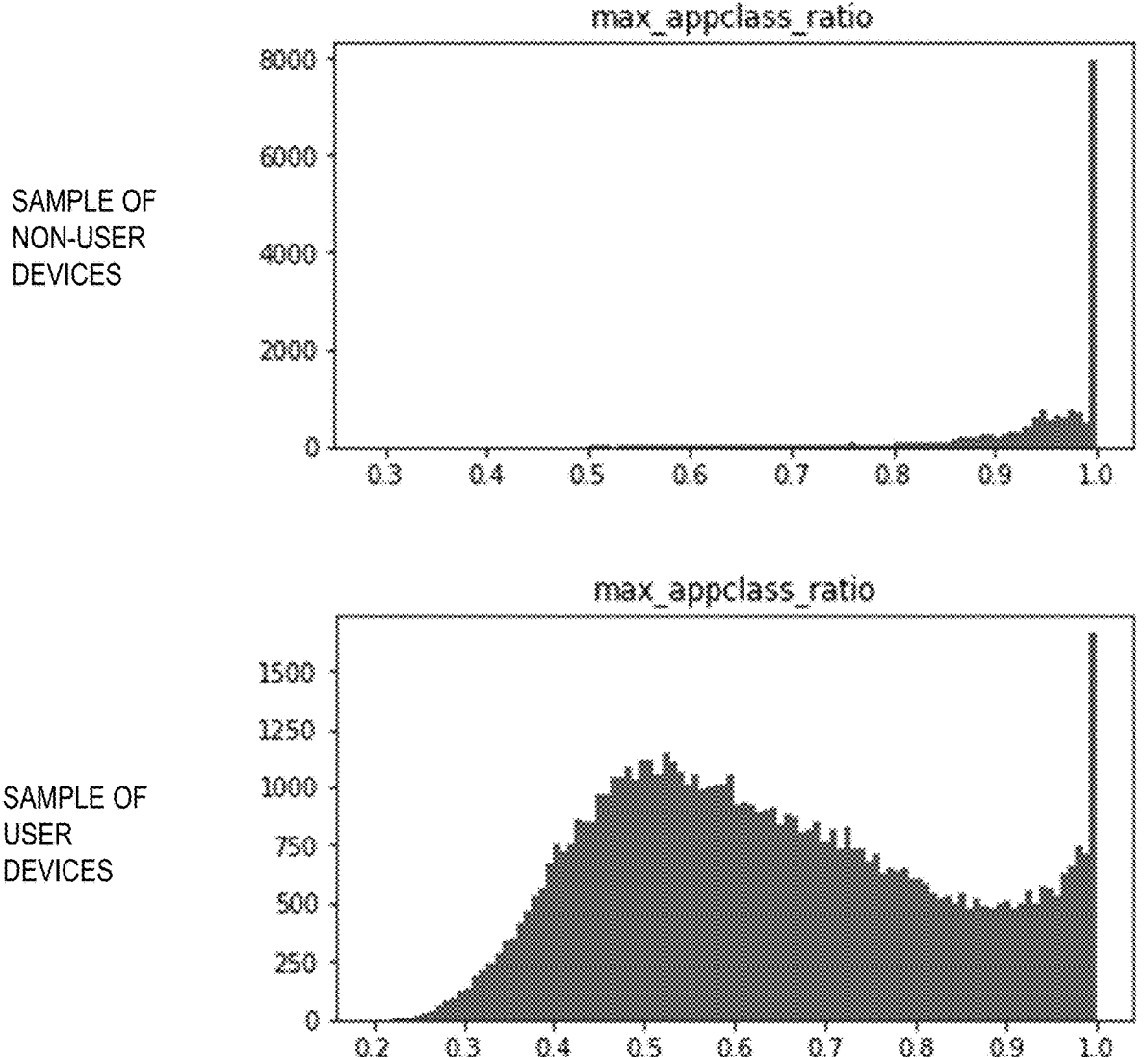
Figure 26:
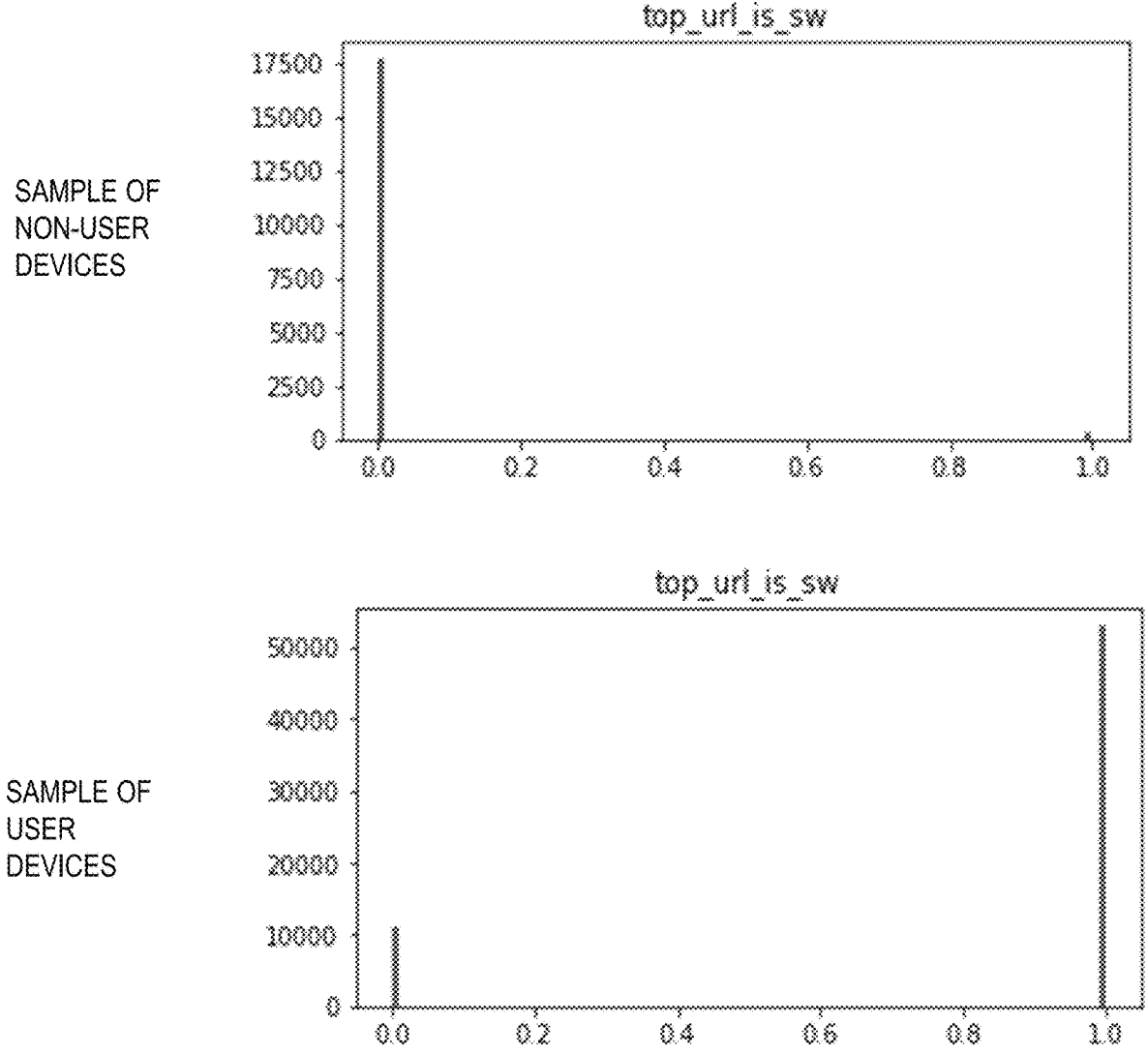

FIGS. 18-26 are graphs of the feature data illustrating the data distribution between sample non-user devices and sample user devices, with FIG. 18 being stop URL ratio, FIG. 19 being unique hostname count, FIG. 20 being unique application class, FIG. 21 being application class if it exists, FIG. 22 being ratio of records for most frequent URL, FIG. 23 being unique user agents count, FIG. 24 being unique protocol names count, FIG. 25 being maximum application class ratio, and FIG. 26 being true (1) if most frequent URL is a stop URL, else false (0). It shall be noted that the results shown in FIGS. 18-26 show features associated with sample sets of user devices and non-user devices. That is, such data can be utilized for training the present system to label devices as either user devices or non-user devices in production environments.

Of note, and as seen in FIGS. 18-26, these features are helpful in differentiating the device type, namely user devices tend to visit many different common URLs whereas servers/IoT devices tend to visit few common URLs. Also, the distribution of unique hostname count is distinct as is the distribution of unique applications. Additionally, user devices tend to have a higher stop URL ratio and tend to visit more application classes. Note, these features may or may not be present in the log data, which enables differentiation as well, since the log data is sparsely populated.

In an embodiment, the machine learning model is a Trained XGBoost Algorithm based binary classification model using Ground Truth Data.

As described, "Stop URL ratio" is a very important feature followed by "unique # of hostnames" and "user application class". That is, the "Stop URL ratio" in IoT and Server devices will be minimum (mostly zeros), while the "Stop URL ratio" in user devices will be higher (closer to 1). This can be seen in the graphs depicted in FIG. 18.

Figure 27:
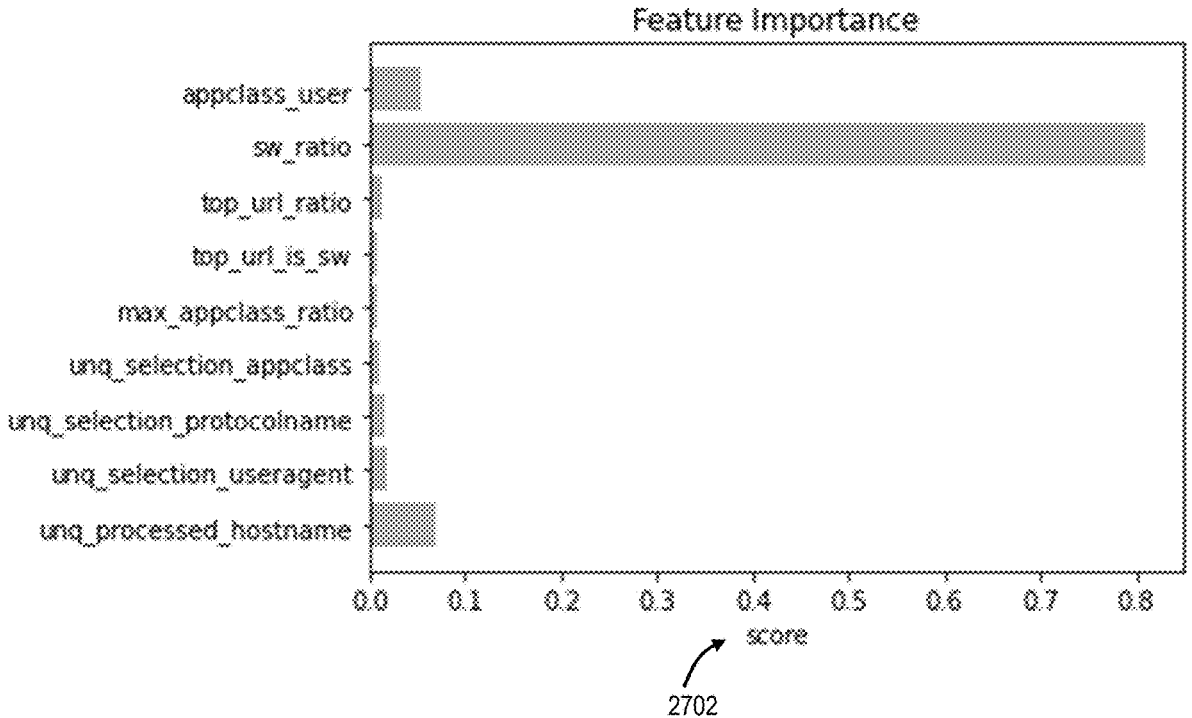
FIG. 27 is a graph of feature importance.

FIG. 27 is a graph of feature importance. As shown, the various features described herein utilized to determine the device type are indications to the present systems that a device is either a user device or a non-user device. As depicted in FIG. 27, each feature can be assigned an importance score 2702, where an importance score 2702 closer to 0 indicates less importance and an importance score 2702 closer to 1 indicates a higher importance. This importance score 2702 can be utilized as a weight in determining, based on the various features, whether a device is a user device or a non-user device.

Figure 28:
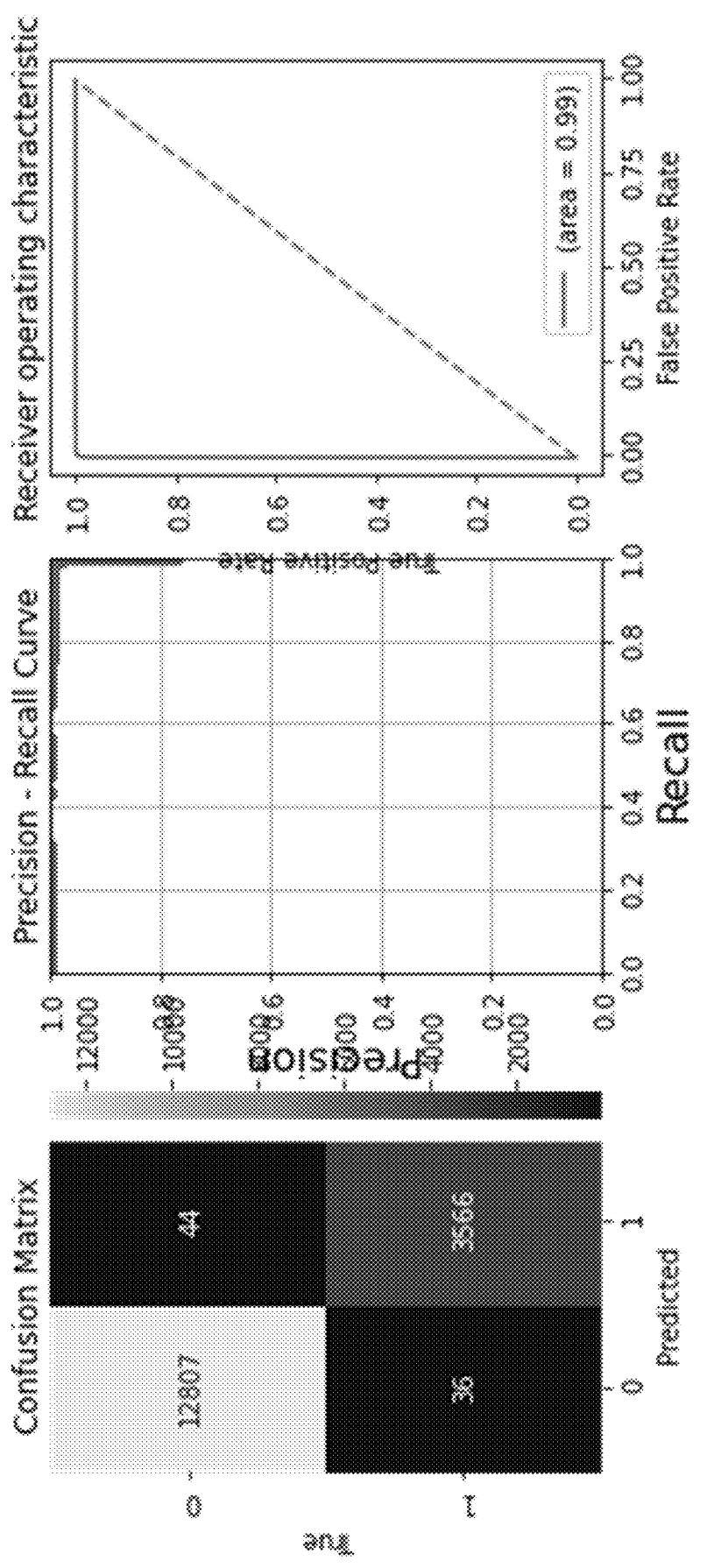
FIG. 28 is a graph of model performance, Model Evaluation Metrics: Recall=0.990, Precision=0.988, F1=0.989.

FIG. 28 is a graph of model performance determined in a test using the present systems to label a plurality of devices as user devices and non-user devices. In response to the test performed, the present model performed the labeling with a recall of 0.990, a precision of 0.988, and an F1 of 0.989.

It will be appreciated that the present systems and methods for labeling devices can be performed in combination with any of the labeling processes described herein. That is, in response to the present systems labeling a device or group of devices as non-user devices, the present systems can include performing the steps described herein for auto-labeling devices such as IoT devices. Further, the identification of a device as a user device or a non-user device can be based on a combination of the various features described herein. For example, the various ratios described herein can be combined to provide a holistic view of a device's traffic behaviors, allowing the systems to make more accurate decisions.

§ 8.3 Process for Detecting Device Type

Figure 29:
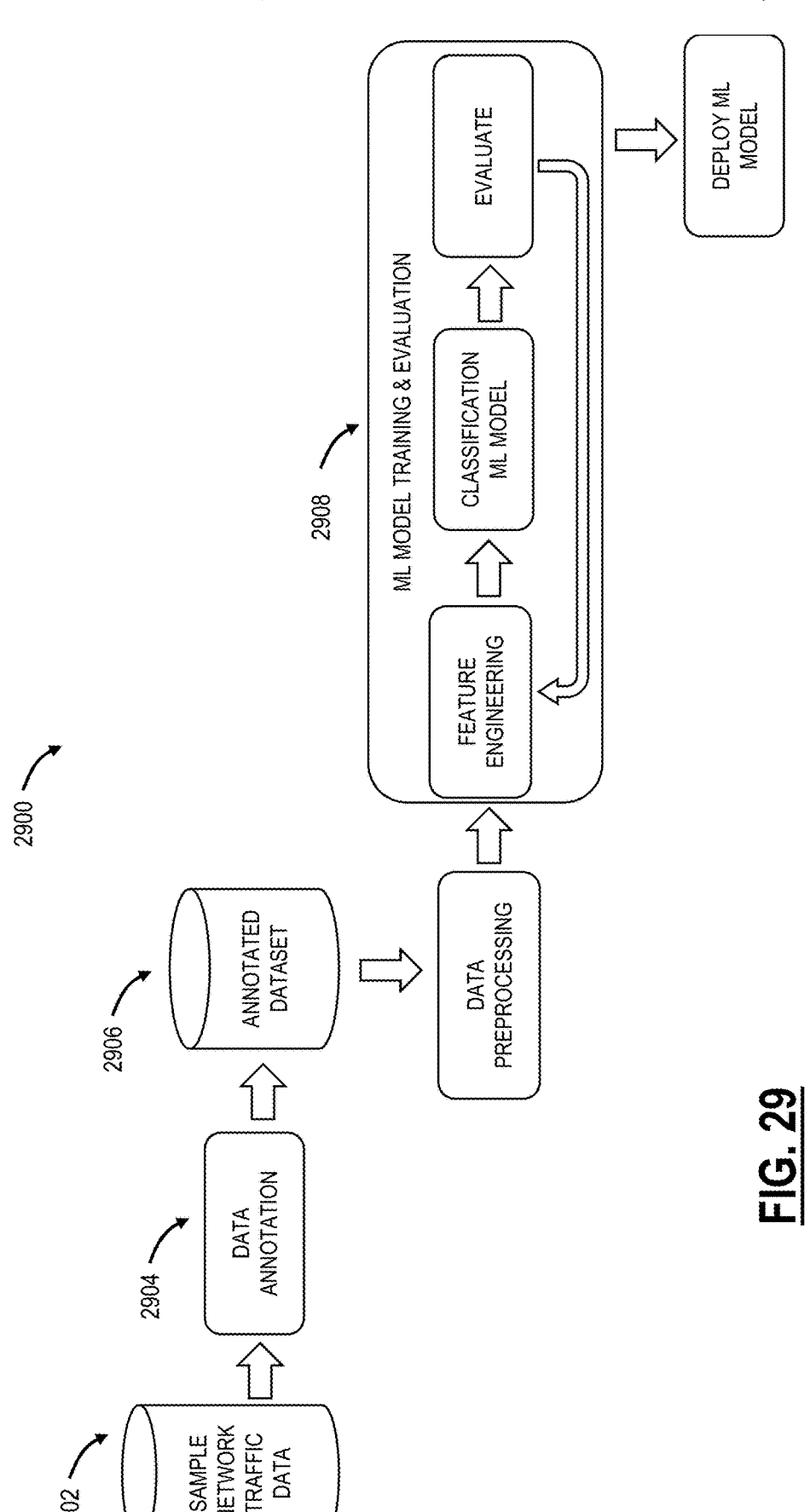
FIG. 29 is a diagram of a system for training and deploying the machine learning model.

FIG. 29 is a diagram of a system for training and deploying the machine learning model. As described, the present systems and methods include utilizing historical device logs collected by the cloud-based system. This historic data can be contemplated as the sample network traffic data 2902 of FIG. 29. This sample network traffic data 2902 can then be annotated 2904 as to provide additional information to the model for training, resulting in an annotated dataset 2906. Responsive to preprocessing the data as described herein, the training process 2900 includes a training and evaluation cycle 2908 to fine tune the model for its purpose of labeling devices as either user devices or non-user devices. Again, this involves utilization of the features described herein. Once training is completed, the trained machine learning model is deployed to label devices as one of a user device or a non-user device in customer environments. This labeling can be performed upon request, i.e., from a network administrator, or in real time as devices communicate through the cloud-based system 1000.

Further, once a device is identified as one of a user device or a non-user device, the cloud-based system 1000 can perform the auto-labeling described herein and enforce policy based thereon. Additionally, the systems can provide a UI showing all devices associated with a network, wherein the devices are labeled as user devices or non-user devices.

The machine learning model contemplates use with the cloud-based system 1000 for various purposes, such as for User Interface (UI) displays (i.e., showing different icons for user devices vs. IoT devices/servers), for augmenting the log data (i.e., adding the device type), as well as for security monitoring and policy (e.g., different policies for user devices vs. IoT devices/servers).

FIG. 30 is a flowchart of a process 3000 for identifying device type. The process 3000 includes receiving data associated with monitoring network communication traffic associated with a plurality of devices (step 3002); analyzing the data of the plurality of devices, wherein the analyzing includes identifying one or more features of the data of each of the plurality of devices (step 3004); and labeling each of the plurality of devices as one of a user device and a non-user device based on the one or more features (step 3006).

The process 3000 can further include wherein a user device is a device with an end user, and wherein a non-user device is one of an Internet-of-Things (IoT) device and a server. The monitoring can be via a cloud-based system having a plurality of nodes, and wherein the one or more processors are in one of the plurality of nodes. The one or more features can include an application class ratio, wherein the steps further comprise responsive to the application class ratio of a device being above a threshold value, labeling the device as a non-user device. The one or more features can include a top Uniform Resource Locator (URL) ratio, wherein the steps further comprise responsive to the top URL ratio of a device being above a threshold value, labeling the device as a non-user device. The one or more features can include a stop Uniform Resource Locator (URL) ratio, wherein the steps further comprise responsive to the stop URL ratio of a device being below a threshold value, labeling the device as a non-user device. The analyzing can include determining a top Uniform Resource Locator (URL), wherein the steps further comprise responsive to the top URL of a device being a stop URL, labeling the device as a user device. The analyzing can include identifying, within network communication traffic associated with a device of the plurality of devices, traffic to an application within a user application class, wherein the labeling includes labeling the device as a user device based thereon. The analyzing can be performed by a trained machine learning model. The steps can further include training the machine learning model with historical network communication traffic data based on the one or more features.

§ 9.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause one or more processors to perform steps of:

receiving data associated with monitoring network communication traffic associated with a plurality of devices as sparsely populated log data;

analyzing the data of the plurality of devices with a trained machine learning model comprising a trained binary classification model trained using ground truth data, wherein the analyzing includes identifying one or more features of the data of each of the plurality of devices, wherein the one or more features includes a top Uniform Resource Locator (URL) ratio or a stop URL ratio; and labeling each of the plurality of devices as one of a user device and a non-user device based on the one or more features, wherein a device is labeled as a non-user device when the top URL ratio is above a threshold value or when the stop URL ratio is below another threshold value and augmenting the sparsely populated log data with the label and enforcing, by a cloud-based enforcement node, a security or firewall policy based on the label.

2. The non-transitory computer-readable medium of claim 1, wherein a user device is a device with an end user, and wherein a non-user device is one of an Internet-of-Things (IoT) device and a server.

3. The non-transitory computer-readable medium of claim 1, wherein the monitoring is via a cloud-based system having a plurality of nodes, and wherein the one or more processors are in one of the plurality of nodes.

4. The non-transitory computer-readable medium of claim 1, wherein the one or more features includes an application class ratio, and wherein the steps further comprise:
responsive to the application class ratio of a device being above a threshold value, labeling the device as a non-user device.

5. The non-transitory computer-readable medium of claim 1, wherein the analyzing includes determining a top Uniform Resource Locator (URL), and wherein the steps further comprise:
responsive to the top URL of a device being a stop URL, labeling the device as a user device.

6. The non-transitory computer-readable medium of claim 1, wherein the analyzing includes identifying, within network communication traffic associated with a device of the plurality of devices, traffic to an application within a user application class, and wherein the labeling includes labeling the device as a user device based thereon.

7. The non-transitory computer-readable medium of claim 1, wherein the steps comprise:
training the machine learning model with historical network communication traffic data based on the one or more features.

8. A method comprising steps of:
receiving data associated with monitoring network communication traffic associated with a plurality of devices as sparsely populated data;
analyzing the data of the plurality of devices with a trained machine learning model comprising a trained binary classification model trained using ground truth data, wherein the analyzing includes identifying one or more features of the data of each of the plurality of devices, wherein the one or more features includes a top Uniform Resource Locator (URL) ratio or a stop URL ratio; and
labeling each of the plurality of devices as one of a user device and a non-user device based on the one or more features, wherein a device is labeled as a non-user device when the top URL ratio is above a threshold value or when the stop URL ratio is below another threshold value and, at a cloud-based enforcement node, enforcing a security or firewall policy for the device based on whether the device is labeled as the user device or the non-user device.

9. The method of claim 8, wherein a user device is a device with an end user, and wherein a non-user device is one of an Internet-of-Things (IoT) device and a server.

10. The method of claim 8, wherein the monitoring is via a cloud-based system having a plurality of nodes.

11. The method of claim 8, wherein the one or more features includes an application class ratio, and wherein the steps further comprise:
responsive to the application class ratio of a device being above a threshold value, labeling the device as a non-user device.

12. The method of claim 8, wherein the analyzing includes determining a top Uniform Resource Locator (URL), and wherein the steps further comprise:
responsive to the top URL of a device being a stop URL, labeling the device as a user device.

13. The method of claim 8, wherein the analyzing includes identifying, within network communication traffic associated with a device of the plurality of devices, traffic to an application within a user application class, and wherein the labeling includes labeling the device as a user device based thereon.

14. The method of claim 8, wherein the steps comprise:
training the machine learning model with historical network communication traffic data based on the one or more features.

15. A method comprising steps of:
receiving data associated with monitoring network communication traffic associated with a plurality of devices as sparsely populated log data;
analyzing the data of the plurality of devices with a trained machine learning model comprising a trained binary classification model trained using ground truth data, wherein the analyzing includes identifying one or more features of the data of each of the plurality of devices, wherein the analyzing includes determining a top Uniform Resource Locator (URL); and
labeling each of the plurality of devices as one of a user device and a non-user device based on the one or more features, and, responsive to the top URL of a device being a stop URL, labeling the device as a user device and augmenting the sparsely populated log data with the label and enforcing, by a cloud-based enforcement node, a security or firewall policy based on the label.

16. The method of claim 15, wherein a user device is a device with an end user, and wherein a non-user device is one of an Internet-of-Things (IoT) device and a server.

17. The method of claim 15, wherein the monitoring is via a cloud-based system having a plurality of nodes.

18. The method of claim 15, wherein the one or more features includes an application class ratio, and wherein the steps further comprise:
responsive to the application class ratio of a device being above a threshold value, labeling the device as a non-user device.

19. The method of claim 15, wherein the analyzing includes identifying, within network communication traffic associated with a device of the plurality of devices, traffic to an application within a user application class, and wherein the labeling includes labeling the device as a user device based thereon.

20. The method of claim 15, wherein the steps comprise:
training the machine learning model with historical network communication traffic data based on the one or more features.

* * * * *